(12) United States Patent
Peng

(10) Patent No.: US 12,250,335 B2
(45) Date of Patent: Mar. 11, 2025

(54) BLUETOOTH CONNECTION METHOD, DEVICE, AND SYSTEM

(71) Applicant: Huawei Technologies Co., Ltd., Shenzhen (CN)

(72) Inventor: Bin Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 553 days.

(21) Appl. No.: 17/604,604

(22) PCT Filed: Apr. 14, 2020

(86) PCT No.: PCT/CN2020/084578
§ 371 (c)(1),
(2) Date: Oct. 18, 2021

(87) PCT Pub. No.: WO2020/211733
PCT Pub. Date: Oct. 22, 2020

(65) Prior Publication Data
US 2022/0201113 A1    Jun. 23, 2022

(30) Foreign Application Priority Data

Apr. 18, 2019   (CN) .......................... 201910314715.7

(51) Int. Cl.
*H04M 1/60* (2006.01)
*H04M 1/72409* (2021.01)
(Continued)

(52) U.S. Cl.
CPC ... *H04M 1/6066* (2013.01); *H04M 1/724097* (2022.02); *H04W 76/10* (2018.02); *H04W 84/18* (2013.01)

(58) Field of Classification Search
CPC ......... H04M 1/6066; H04M 1/724097; H04M 1/72442; H04M 2250/02; H04R 1/1016;
(Continued)

(56) References Cited

U.S. PATENT DOCUMENTS 10,104,218 B2    10/2018   Yim et al.
2003/0223604 A1  12/2003   Nakagawa
(Continued)

FOREIGN PATENT DOCUMENTS

CN    102237897 A    11/2011
CN    105517186 A    4/2016
(Continued)

OTHER PUBLICATIONS

WO 2020024180 A1 with english translation (Year: 2020).*
(Continued)

*Primary Examiner* — Nader Bolourchi
(74) *Attorney, Agent, or Firm* — Conley Rose, P.C.

(57) ABSTRACT

A BLUETOOTH connection system includes a BLUETOOTH headset, and a first electronic device and a second electronic device that have been paired with the BLUETOOTH headset. The BLUETOOTH headset is configured to establish a first connection to the first electronic device, where the first connection includes an asynchronous connection-oriented link (ACL) connection. The BLUETOOTH headset is further configured to send a BLUETOOTH Low Energy (BLE) broadcast message. The second electronic device is configured to establish a second connection to the BLUETOOTH headset after receiving the BLE broadcast message.

20 Claims, 41 Drawing Sheets

(51) Int. Cl.
*H04W 76/10* (2018.01)
*H04W 84/18* (2009.01)

(58) Field of Classification Search
CPC ................ H04R 2420/07; H04W 4/80; H04W 52/0229; H04W 52/0241; H04W 52/0245; H04W 52/0251; H04W 52/0254; H04W 76/10; H04W 76/15; H04W 8/005; H04W 84/18; Y02D 30/70
See application file for complete search history.

(56) References Cited

U.S. PATENT DOCUMENTS

| | | |
|---|---|---|
| 2008/0125186 A1 | 5/2008 | Chen et al. |
| 2014/0273858 A1 | 9/2014 | Panther et al. |
| 2015/0094097 A1 | 4/2015 | Fraccaroli |
| 2015/0134552 A1 | 5/2015 | Engels et al. |
| 2015/0334488 A1 | 11/2015 | Kim et al. |
| 2016/0080896 A1 | 3/2016 | Song et al. |
| 2016/0105924 A1 | 4/2016 | Baek et al. |
| 2016/0359925 A1 | 12/2016 | Song |
| 2017/0078786 A1 | 3/2017 | Schobel et al. |
| 2017/0139847 A1 | 5/2017 | Lim et al. |
| 2017/0164420 A1 | 6/2017 | Tan et al. |
| 2017/0208639 A1 | 7/2017 | Lee et al. |
| 2017/0230810 A1 | 8/2017 | Banerjea |
| 2017/0289738 A1 | 10/2017 | Jepson et al. |
| 2018/0152891 A1 | 5/2018 | Xie et al. |
| 2022/0201453 A1* | 6/2022 | Liu ................... H04W 4/80 |

FOREIGN PATENT DOCUMENTS

| | | | |
|---|---|---|---|
| CN | 106162531 A | 11/2016 | |
| CN | 106341516 A | 1/2017 | |
| CN | 106658366 A | 5/2017 | |
| CN | 106658678 A | 5/2017 | |
| CN | 107885478 A | 4/2018 | |
| CN | 108293175 A | 7/2018 | |
| CN | 108377482 A | 8/2018 | |
| CN | 108924706 A | 11/2018 | |
| CN | 109495850 A | 3/2019 | |
| CN | 110191442 A | 8/2019 | |
| EP | 2605493 A1 | 6/2013 | |
| EP | 3537734 A1 | 11/2019 | |
| JP | 2017034654 A | 2/2017 | |
| WO | WO-2020024180 A1 * | 2/2020 | ........ H04M 1/72415 |
| WO | WO-2020132818 A1 * | 7/2020 | ............. G06F 3/048 |

OTHER PUBLICATIONS

WO 2020132818 A1 with english translation (Year: 2020).*
European Patent Register, "EP 3934292 amendment with annotations", Jun. 28, 2023, online: https://register.epo.org/application?documentId=LJFJP5CT1XWIM5L&number=EP20791523&lng=en&npl=false (Year: 2023).*
"Advanced Audio Distribution, Bluetooth Profile Specification," A2DP v1.3.2, Audio, Telephony, and Automotive Working Group, Jan. 21, 2019, 73 pages.
"Hands-Free Profile, 1.7.1, Bluetooth Profile Specification," Telephony Working Group, Dec. 15, 2015, 144 pages.
"Headset Profile," HSP_SPEC_V12r00, Car WG, Dec. 18, 2008, 27 pages.

* cited by examiner

BLUETOOTH CONNECTION METHOD, DEVICE, AND SYSTEM

CROSS-REFERENCE TO RELATED APPLICATIONS

This application is a U.S. National Stage of International Patent Application No. PCT/CN2020/084578 filed on Apr. 14, 2020, which claims priority to Chinese Patent application Ser. No. 20/191,0314715.7 filed on Apr. 18, 2019. Both of the aforementioned applications are hereby incorporated by reference in their entireties.

TECHNICAL FIELD

Embodiments of this application relate to the field of wireless communications technologies, and in particular, to a Bluetooth connection method, a device, and a system.

BACKGROUND

As users have higher requirements for portability, Bluetooth headsets are favored by more users. A Bluetooth headset may be wirelessly connected to an electronic device such as a mobile phone, so as to cooperate with the electronic device to play music, receive/make a call, or the like for a user.

To facilitate work and life, a user usually needs to use a plurality of electronic devices, such as a mobile phone and a tablet computer. However, a user usually has only one Bluetooth headset, or usually carries only one Bluetooth headset. How to process services of a plurality of electronic devices by using one Bluetooth headset is an important problem that needs to be resolved at present.

SUMMARY

Embodiments of this application provide a Bluetooth connection method, a device, and a system, so that a Bluetooth headset can automatically switch, through a virtual connection, between audio services of a plurality of electronic devices for processing, and power consumption of the Bluetooth headset and the electronic devices can be reduced.

To achieve the foregoing objective, the following technical solutions are used in the embodiments of this application.

According to one aspect, an embodiment of this application provides a Bluetooth communications system, including a Bluetooth headset, and a first electronic device and a second electronic device that have been paired with the Bluetooth headset. The Bluetooth headset is configured to establish a first connection to the first electronic device, where the first connection includes an asynchronous connection-oriented link ACL connection. The first electronic device is configured to display connection information of the Bluetooth headset on an interface after establishing the first connection to the Bluetooth headset. The Bluetooth headset is further configured to send a Bluetooth Low Energy BLE broadcast message, where the Bluetooth Low Energy BLE broadcast message includes status information of the Bluetooth headset. The second electronic device is configured to: establish a second connection to the Bluetooth headset after receiving the Bluetooth Low Energy BLE broadcast message sent by the Bluetooth headset, and display connection information of the Bluetooth headset on an interface based on the status information of the Bluetooth headset.

The first connection may be a physical connection, and the second connection may be a virtual connection. Compared with the first connection, the second connection established between the Bluetooth headset and the electronic device can reduce power consumption.

In this solution, the Bluetooth headset may establish a physical connection to one electronic device, and establish a virtual connection to another electronic device, thereby saving battery power of the Bluetooth headset and the electronic device. The second connection may be further switched to a first connection subsequently, so that the Bluetooth headset can process audio services of different electronic devices based on first connections between the Bluetooth headset and the different electronic devices.

In a possible design, the status information of the Bluetooth headset includes at least one of the following: a device name, a device type, a device model, a battery level, a connection status, a wearing status, or a service status of the Bluetooth headset.

In this way, the electronic device may display, based on the status information of the Bluetooth headset, the connection information such as the device name, the device type, the device model, the battery level, the connection status, the wearing status, or the service status of the Bluetooth headset.

In another possible design, the Bluetooth headset periodically sends a BLE broadcast message.

In this way, an electronic device within a Bluetooth communication distance range of the Bluetooth headset may continuously receive the BLE broadcast message sent by the Bluetooth headset, and may establish a second connection to the paired Bluetooth headset based on the BLE broadcast message.

In another possible design, the first electronic device is an electronic device that has most recently established a first connection to the Bluetooth headset.

The electronic device that has most recently established a first connection to the Bluetooth headset is an electronic device that has most recently been used by a user, and is likely to be used again by the user. Therefore, the Bluetooth headset may preferentially establish a first connection to the electronic device that has most recently established a first connection to the Bluetooth headset, so as to process an audio service of the electronic device based on the first connection.

In another possible design, the first electronic device is an electronic device with a high priority.

The electronic device with a high priority is usually a main device of the user, or is usually used to process an important service of the user. Therefore, the Bluetooth headset may preferentially establish a first connection to the electronic device with a high priority, so as to preferentially and quickly process an audio service of the electronic device with a high priority based on the first connection.

In another possible design, the Bluetooth headset is specifically configured to: send a page request message to each of the first electronic device and the second electronic device; receive a page response message sent by each of the first electronic device and the second electronic device; establish a first connection to each of the first electronic device and the second electronic device; and release the first connection between the Bluetooth headset and the second electronic device, and retain the first connection between the Bluetooth headset and the first electronic device. The second electronic device is specifically configured to: after the first connection between the second electronic device and the Bluetooth headset is released, establish a second connection to the Bluetooth headset if the Bluetooth Low Energy BLE broadcast message sent by the Bluetooth headset is received.

In this solution, the Bluetooth headset may successfully establish first connections to electronic devices, to determine that the electronic devices are within a Bluetooth communication range of the Bluetooth headset, and may establish a first connection or a second connection. Then the Bluetooth headset retains a first connection to one electronic device within the Bluetooth communication range, and maintains a second connection to another electronic device.

In another possible design, the Bluetooth headset is further configured to: when the first electronic device has a first audio service, process the first audio service of the first electronic device based on the first connection between the Bluetooth headset and the first electronic device. The second electronic device is further configured to: when the second electronic device has a second audio service, send connection request information to the Bluetooth headset if it is determined, based on the status information of the Bluetooth headset, that the Bluetooth headset is processing the first audio service, and if a priority of the second audio service is higher than a priority of the first audio service. The Bluetooth headset is further configured to: after receiving the connection request information sent by the second electronic device, establish a first connection to the second electronic device, and release the first connection between the Bluetooth headset and the first electronic device; process the second audio service based on the first connection between the Bluetooth headset and the second electronic device; and send the Bluetooth Low Energy BLE broadcast message. The first electronic device is further configured to: after the first connection between the first electronic device and the Bluetooth headset is released, establish a second connection to the Bluetooth headset if the Bluetooth Low Energy BLE broadcast message sent by the Bluetooth headset is received.

In this solution, the Bluetooth headset may process an audio service of an electronic device based on an established first connection. In addition, when processing an audio service of one electronic device, if another electronic device has an audio service with a higher priority, the Bluetooth headset may switch to establishing a first connection to the another electronic device, so that the Bluetooth headset preferentially processes the audio service with a higher priority based on the first connection established after switching.

In another possible design, that the Bluetooth headset is configured to establish a first connection to the second electronic device, and release the first connection between the Bluetooth headset and the first electronic device includes: first establishing the first connection to the second electronic device, and then releasing the first connection between the Bluetooth headset and the first electronic device; or first releasing the first connection between the Bluetooth headset and the first electronic device, and then establishing the first connection to the second electronic device.

In other words, when switching the first connection, the Bluetooth headset may first release the first connection between the Bluetooth headset and one electronic device, and then establish a first connection to another electronic device; or first establish a first connection to the another electronic device, and then release the first connection between the Bluetooth headset and the electronic device.

In another possible design, the Bluetooth headset is further configured to: send connection request information to the first electronic device after completing processing of the second audio service; establish a first connection to the first electronic device; continue to process the first audio service based on the first connection between the Bluetooth headset and the first electronic device; release the first connection between the Bluetooth headset and the second electronic device; and send the Bluetooth Low Energy BLE broadcast message. The second electronic device is further configured to: after the first connection between the second electronic device and the Bluetooth headset is released, establish a second connection to the Bluetooth headset if the Bluetooth Low Energy BLE broadcast message is received.

In other words, when processing an audio service of an electronic device, if the Bluetooth headset is interrupted by an audio service with a higher priority of another electronic device, the Bluetooth headset may continue to process the audio service of the electronic device after the interruption ends.

In another possible design, the second electronic device is configured to send connection request information to the Bluetooth headset when the second electronic device has a third audio service. The Bluetooth headset is configured to: after receiving the connection request information sent by the second electronic device, establish a first connection to the second electronic device if the Bluetooth headset currently does not process an audio service; process the third audio service based on the first connection between the Bluetooth headset and the second electronic device; release the first connection between the Bluetooth headset and the first electronic device; and send the Bluetooth Low Energy BLE broadcast message. The first electronic device is configured to: after the first connection between the first electronic device and the Bluetooth headset is released, establish a second connection to the Bluetooth headset if the Bluetooth Low Energy BLE broadcast message is received.

In this solution, if the Bluetooth headset establishes a first connection to an electronic device and is currently in an idle state, when another electronic device has an audio service, the Bluetooth headset may switch to establishing a first connection to the another electronic device, and process an audio service of the another electronic device based on the first connection.

In another possible design, when the first electronic device is an electronic device with a high priority, the Bluetooth headset is further configured to: send connection request information to the first electronic device when a first connection is currently established between the Bluetooth headset and the second electronic device and when the Bluetooth headset does not process an audio service within first preset duration; establish a first connection to the first electronic device; release the first connection between the Bluetooth headset and the second electronic device; and send the Bluetooth Low Energy BLE broadcast message. The second electronic device is configured to: after the first connection between the second electronic device and the Bluetooth headset is released, establish a second connection to the Bluetooth headset if the Bluetooth Low Energy BLE broadcast message is received.

In this solution, when the Bluetooth headset is in an idle state, the Bluetooth headset may switch to establishing a first connection to an electronic device with a high priority, so that an important service on the electronic device with a high priority can be processed in a timely, fast, and convenient manner.

In another possible design, the Bluetooth headset is further configured to: after establishing a first connection to the first electronic device or the second electronic device, release the first connection between the Bluetooth headset and the first electronic device or the second electronic device if the Bluetooth headset does not process an audio service within second preset duration; and send the Bluetooth Low Energy BLE broadcast message. The first electronic device and the second electronic device each are configured to: after the first connection to the Bluetooth headset is released, establish a second connection to the Bluetooth headset if the Bluetooth Low Energy BLE broadcast message is received.

In this solution, when the Bluetooth headset is idle, the Bluetooth headset may release the first connection between the Bluetooth headset and the electronic device, so that a second connection is established between the Bluetooth headset and each electronic device, and battery power of the Bluetooth headset and the electronic device are saved.

According to another aspect, an embodiment of this application provides a Bluetooth headset, including one or more processors, a memory, and one or more computer programs. The one or more computer programs are stored in the memory, the one or more computer programs include instructions, and when the instructions are executed by the Bluetooth headset, the Bluetooth headset is enabled to perform the following operations: The Bluetooth headset establishes a first connection to a first electronic device, where the first connection includes an asynchronous connection-oriented link ACL connection; the Bluetooth headset sends a Bluetooth Low Energy BLE broadcast message, where the Bluetooth Low Energy BLE broadcast message is used by a second electronic device to establish a second connection to the paired Bluetooth headset, and the Bluetooth Low Energy BLE broadcast message includes status information of the Bluetooth headset, and the Bluetooth headset establishes the second connection to the paired second electronic device.

The first connection may be a physical connection, and the second connection may be a virtual connection. Compared with the first connection, the second connection established between the Bluetooth headset and the electronic device can reduce power consumption.

In this solution, the Bluetooth headset may establish a physical connection to one electronic device, and establish a virtual connection to another electronic device, thereby saving battery power of the Bluetooth headset and the electronic device. The second connection may be further switched to a first connection subsequently, so that the Bluetooth headset can process audio services of different electronic devices based on first connections between the Bluetooth headset and the different electronic devices.

In a possible design, that the Bluetooth headset establishes a first connection to a first electronic device includes: The Bluetooth headset sends a page request message to each of the first electronic device and the second electronic device; the Bluetooth headset receives a page response message sent by each of the first electronic device and the second electronic device; the Bluetooth headset establishes a first connection to each of the first electronic device and the second electronic device; and the Bluetooth headset releases the first connection between the Bluetooth headset and the second electronic device, and retains the first connection between the Bluetooth headset and the first electronic device.

In another possible design, when the instructions are executed by the Bluetooth headset, the Bluetooth headset is further enabled to perform the following operations: When the first electronic device has a first audio service, the Bluetooth headset processes the first audio service of the first electronic device based on the first connection between the Bluetooth headset and the first electronic device; after receiving connection request information sent by the second electronic device, the Bluetooth headset establishes a first connection to the second electronic device, and releases the first connection between the Bluetooth headset and the first electronic device; the Bluetooth headset processes a second audio service based on the first connection between the Bluetooth headset and the second electronic device; and the Bluetooth headset sends the Bluetooth Low Energy BLE broadcast message.

In another possible design, that the Bluetooth headset establishes a first connection to the second electronic device, and releases the first connection between the Bluetooth headset and the first electronic device includes: The Bluetooth headset first establishes the first connection to the second electronic device, and then releases the first connection between the Bluetooth headset and the first electronic device; or the Bluetooth headset first releases the first connection between the Bluetooth headset and the first electronic device, and then establishes the first connection to the second electronic device.

In another possible design, when the instructions are executed by the Bluetooth headset, the Bluetooth headset is further enabled to perform the following operations: After receiving connection request information sent by the second electronic device, the Bluetooth headset establishes a first connection to the second electronic device if the Bluetooth headset currently does not process an audio service; the Bluetooth headset processes a third audio service of the second electronic device based on the first connection between the Bluetooth headset and the second electronic device; the Bluetooth headset releases the first connection between the Bluetooth headset and the first electronic device; and the Bluetooth headset sends the Bluetooth Low Energy BLE broadcast message.

In another possible design, the first electronic device is an electronic device with a high priority, and when the instructions are executed by the Bluetooth headset, the Bluetooth headset is further enabled to perform the following operations: The Bluetooth headset sends connection request information to the first electronic device when the Bluetooth headset currently has established a first connection to the second electronic device and does not process an audio service within first preset duration; the Bluetooth headset establishes a first connection to the first electronic device; the Bluetooth headset releases the first connection between the Bluetooth headset and the second electronic device; and the Bluetooth headset sends the Bluetooth Low Energy BLE broadcast message.

In another possible design, when the instructions are executed by the Bluetooth headset, the Bluetooth headset is further enabled to perform the following operations: After establishing a first connection to the first electronic device or the second electronic device, the Bluetooth headset releases the first connection between the Bluetooth headset and the first electronic device or the second electronic device if the Bluetooth headset does not process an audio service within second preset duration; and the Bluetooth headset sends the Bluetooth Low Energy BLE broadcast message.

According to another aspect, an embodiment of this application provides an electronic device, including one or more processors, a memory, a plurality of applications, and one or more computer programs. The one or more computer programs are stored in the memory, and the one or more computer programs include instructions. When the instructions are executed by the electronic device, the electronic device is enabled to perform the following steps: The electronic device establishes a second connection to a paired Bluetooth headset after receiving a Bluetooth Low Energy BLE broadcast message sent by the Bluetooth headset, where the Bluetooth Low Energy BLE broadcast message includes status information of the Bluetooth headset; the electronic device displays connection information of the Bluetooth headset on an interface based on the status information of the Bluetooth headset; and the electronic device displays connection information of the Bluetooth headset on an interface after establishing a first connection to the Bluetooth headset.

In this solution, the electronic device may establish a second connection to the paired Bluetooth headset, and display, based on the second connection, information indicating that the Bluetooth headset is connected. Establishing the second connection can reduce power consumption compared with establishing the first connection. The second connection may be switched to a first connection subsequently, so that the Bluetooth headset can process an audio service of the electronic device based on the first connection.

In a possible design, that the electronic device establishes a second connection to a paired Bluetooth headset after receiving a Bluetooth Low Energy BLE broadcast message sent by the Bluetooth headset includes: The electronic device establishes a first connection to the paired Bluetooth headset; the electronic device releases the first connection between the electronic device and the Bluetooth headset; and the electronic device establishes the second connection to the Bluetooth headset if the electronic device receives the Bluetooth Low Energy BLE broadcast message sent by the Bluetooth headset.

In another possible design, when the instructions are executed by the electronic device, the electronic device is further enabled to perform the following operation: After the electronic device establishes the second connection to the Bluetooth headset, the electronic device sends connection request information to the Bluetooth headset when the electronic device has a first audio service.

In another possible design, that the electronic device sends connection request information to the Bluetooth headset when the electronic device has a first audio service includes: When the electronic device has the first audio service, the electronic device sends the connection request information to the Bluetooth headset if the electronic device determines, based on the status information of the Bluetooth headset, that the Bluetooth headset is processing a second audio service, and if a priority of the first audio service is higher than a priority of the second audio service.

According to another aspect, an embodiment of this application provides a Bluetooth connection method, including: A Bluetooth headset establishes a first connection to a first electronic device, where the first connection includes an asynchronous connection-oriented link ACL connection; the Bluetooth headset sends a Bluetooth Low Energy BLE broadcast message, where the Bluetooth Low Energy BLE broadcast message is used by a second electronic device to establish a second connection to the paired Bluetooth headset, and the Bluetooth Low Energy BLE broadcast message includes status information of the Bluetooth headset; and the Bluetooth headset establishes the second connection to the paired second electronic device.

The first connection may be a physical connection, and the second connection may be a virtual connection. Compared with the first connection, the second connection established between the Bluetooth headset and the electronic device can reduce power consumption. The Bluetooth headset may establish a physical connection to one electronic device, and establish a virtual connection to another electronic device, thereby saving battery power of the Bluetooth headset and the electronic device. The second connection may be further switched to a first connection subsequently, so that the Bluetooth headset can process audio services of different electronic devices based on first connections between the Bluetooth headset and the different electronic devices.

In a possible design, that the Bluetooth headset establishes a first connection to a first electronic device includes: The Bluetooth headset sends a page request message to each of the first electronic device and the second electronic device; the Bluetooth headset receives a page response message sent by each of the first electronic device and the second electronic device; the Bluetooth headset establishes a first connection to each of the first electronic device and the second electronic device; and the Bluetooth headset releases the first connection between the Bluetooth headset and the second electronic device, and retains the first connection between the Bluetooth headset and the first electronic device.

In another possible design, the method further includes: When the first electronic device has a first audio service, the Bluetooth headset processes the first audio service of the first electronic device based on the first connection between the Bluetooth headset and the first electronic device; after receiving connection request information sent by the second electronic device, the Bluetooth headset establishes a first connection to the second electronic device, and releases the first connection between the Bluetooth headset and the first electronic device; the Bluetooth headset processes a second audio service based on the first connection between the Bluetooth headset and the second electronic device; and the Bluetooth headset sends the Bluetooth Low Energy BLE broadcast message.

In another possible design, that the Bluetooth headset establishes a first connection to the second electronic device, and releases the first connection between the Bluetooth headset and the first electronic device includes: The Bluetooth headset first establishes the first connection to the second electronic device, and then releases the first connection between the Bluetooth headset and the first electronic device; or the Bluetooth headset first releases the first connection between the Bluetooth headset and the first electronic device, and then establishes the first connection to the second electronic device.

In another possible design, the method further includes: After receiving connection request information sent by the second electronic device, the Bluetooth headset establishes a first connection to the second electronic device if the Bluetooth headset currently does not process an audio service; the Bluetooth headset processes a third audio service of the second electronic device based on the first connection between the Bluetooth headset and the second electronic device; the Bluetooth headset releases the first connection between the Bluetooth headset and the first electronic device; and the Bluetooth headset sends the Bluetooth Low Energy BLE broadcast message.

In another possible design, the first electronic device is an electronic device with a high priority, and the method further includes: The Bluetooth headset sends connection request information to the first electronic device when the Bluetooth headset currently has established a first connection to the second electronic device and does not process an audio service within first preset duration; the Bluetooth headset establishes a first connection to the first electronic device; the Bluetooth headset releases the first connection between the Bluetooth headset and the second electronic device; and the Bluetooth headset sends the Bluetooth Low Energy BLE broadcast message.

In another possible design, the method further includes: After establishing a first connection to the first electronic device or the second electronic device, the Bluetooth headset releases the first connection between the Bluetooth headset and the first electronic device or the second electronic device if the Bluetooth headset does not process an audio service within second preset duration; and the Bluetooth headset sends the Bluetooth Low Energy BLE broadcast message.

According to another aspect, an embodiment of this application provides a Bluetooth connection method. The method may include: The electronic device establishes a second connection to a paired Bluetooth headset after receiving a Bluetooth Low Energy BLE broadcast message sent by the Bluetooth headset, where the Bluetooth Low Energy BLE broadcast message includes status information of the Bluetooth headset; the electronic device displays connection information of the Bluetooth headset on an interface based on the status information of the Bluetooth headset; and the electronic device displays connection information of the Bluetooth headset on an interface after establishing a first connection to the Bluetooth headset.

In this solution, the electronic device may establish a second connection to the paired Bluetooth headset, and display, based on the second connection, information indicating that the Bluetooth headset is connected. Establishing the second connection can reduce power consumption compared with establishing the first connection. The second connection may be switched to a first connection subsequently, so that the Bluetooth headset can process an audio service of the electronic device based on the first connection.

In a possible design, that the electronic device establishes a second connection to a paired Bluetooth headset after receiving a Bluetooth Low Energy BLE broadcast message sent by the Bluetooth headset includes: The electronic device establishes a first connection to the paired Bluetooth headset; the electronic device releases the first connection between the electronic device and the Bluetooth headset; and the electronic device establishes the second connection to the Bluetooth headset if the electronic device receives the Bluetooth Low Energy BLE broadcast message sent by the Bluetooth headset.

In another possible design, the method further includes: After the electronic device establishes the second connection to the Bluetooth headset, the electronic device sends connection request information to the Bluetooth headset when the electronic device has a first audio service.

In another possible design, that the electronic device sends connection request information to the Bluetooth headset when the electronic device has a first audio service includes. When the electronic device has the first audio service, the electronic device sends the connection request information to the Bluetooth headset if the electronic device determines, based on the status information of the Bluetooth headset, that the Bluetooth headset is processing a second audio service, and if a priority of the first audio service is higher than a priority of the second audio service.

According to another aspect, an embodiment of this application provides a Bluetooth communications system, including a Bluetooth headset, and a first electronic device and a second electronic device that have been paired with the Bluetooth headset. The Bluetooth headset is configured to send a Bluetooth Low Energy BLE broadcast message, where the Bluetooth Low Energy BLE broadcast message includes status information of the Bluetooth headset. The first electronic device and the second electronic device each are configured to: establish a second connection to the Bluetooth headset after receiving the first BLE broadcast message sent by the Bluetooth headset, and display connection information of the Bluetooth headset on an interface based on the status information of the Bluetooth headset. The first electronic device and the second electronic device are further configured to send connection request information to the Bluetooth headset when the first electronic device and the second electronic device have audio services. The Bluetooth headset is further configured to: after receiving connection request information sent by the first electronic device or the second electronic device, establish a first connection to the first electronic device or the second electronic device based on the connection request information; and process an audio service of the first electronic device or the second electronic device based on the first connection. The first electronic device and the second electronic device each are further configured to display connection information of the Bluetooth headset on an interface after establishing the first connection to the Bluetooth headset.

In this solution, a second connection is established between the Bluetooth headset and each electronic device in the communications system, so that battery power of the Bluetooth headset and the electronic devices can be saved. The second connection may be further switched to a first connection subsequently, so that the Bluetooth headset can process audio services of different electronic devices based on first connections between the Bluetooth headset and the different electronic devices.

In a possible design, the Bluetooth headset is specifically configured to: establish a first connection to each of the first electronic device and the second electronic device; release the first connection between the Bluetooth headset and each of the first electronic device and the second electronic device; and send the Bluetooth Low Energy BLE broadcast message. The first electronic device and the second electronic device each are specifically configured to: after the first connection to the Bluetooth headset is released, establish a second connection to the Bluetooth headset if the first BLE broadcast message sent by the Bluetooth headset is received.

In another possible design, the second electronic device is further configured to: when the second electronic device has a first audio service, send connection request information to the Bluetooth headset if it is determined, based on the status information of the Bluetooth headset, that the Bluetooth headset is processing a second audio service, and if a priority of the first audio service is higher than a priority of the second audio service. The Bluetooth headset is further configured to: after receiving the connection request information sent by the second electronic device, establish a first connection to the second electronic device; process the first audio service based on the first connection between the Bluetooth headset and the second electronic device; release the first connection between the Bluetooth headset and the first electronic device; and send the Bluetooth Low Energy BLE broadcast message.

In another possible design, the Bluetooth headset is further configured to: after establishing a first connection to the first electronic device or the second electronic device, release the first connection between the Bluetooth headset and the first electronic device or the second electronic device if the Bluetooth headset does not process an audio service within preset duration; and send the Bluetooth Low Energy BLE broadcast message. The first electronic device and the second electronic device each are configured to: after the first connection to the Bluetooth headset is released, establish a second connection to the Bluetooth headset if the Bluetooth Low Energy BLE broadcast message is received.

In other words, when the Bluetooth headset is idle, the Bluetooth headset may release the first connection between the Bluetooth headset and each electronic device in the communications system, and maintain a second connection to each electronic device, so as to reduce power consumption.

According to another aspect, an embodiment of this application provides a Bluetooth headset, including one or more processors, a memory, and one or more computer programs. The one or more computer programs are stored in the memory, and the one or more computer programs include instructions. When the instructions are executed by the Bluetooth headset, the Bluetooth headset is enabled to perform the following operations: The Bluetooth headset sends a Bluetooth Low Energy BLE broadcast message, where the Bluetooth Low Energy BLE broadcast message includes status information of the Bluetooth headset; the Bluetooth headset establishes a second connection to each of a first electronic device and a second electronic device; the Bluetooth headset receives connection request information sent by the paired first electronic device or second electronic device; the Bluetooth headset establishes a first connection to the first electronic device or the second electronic device based on the connection request information; and the Bluetooth headset processes an audio service of the first electronic device or the second electronic device based on the first connection.

In this solution, a second connection is established between the Bluetooth headset and each electronic device in a communications system, so that battery power of the Bluetooth headset and the electronic devices can be saved. The second connection may be further switched to a first connection subsequently, so that the Bluetooth headset can process audio services of different electronic devices based on first connections between the Bluetooth headset and the different electronic devices.

In a possible design, that the Bluetooth headset sends a Bluetooth Low Energy BLE broadcast message includes: The Bluetooth headset establishes a first connection to each of the first electronic device and the second electronic device;

the Bluetooth headset releases the first connection between the Bluetooth headset and each of the first electronic device and the second electronic device; and the Bluetooth headset sends the Bluetooth Low Energy BLE broadcast message.

In another possible design, when the instructions are executed by the Bluetooth headset, the Bluetooth headset is further enabled to perform the following operations: After receiving connection request information sent by the second electronic device, the Bluetooth headset establishes a first connection to the second electronic device; the Bluetooth headset processes a first audio service based on the first connection between the Bluetooth headset and the second electronic device; and the Bluetooth headset releases the first connection between the Bluetooth headset and the first electronic device; and the Bluetooth headset sends the Bluetooth Low Energy BLE broadcast message.

In another possible design, when the instructions are executed by the Bluetooth headset, the Bluetooth headset is further enabled to perform the following operations: After establishing a first connection to the first electronic device or the second electronic device, the Bluetooth headset releases the first connection between the Bluetooth headset and the first electronic device or the second electronic device if the Bluetooth headset does not process an audio service within preset duration; and the Bluetooth headset sends the Bluetooth Low Energy BLE broadcast message.

According to another aspect, an embodiment of this application provides a communications system, including a Bluetooth headset, and a first electronic device, a second electronic device, and a third electronic device that have been paired with the Bluetooth headset. The Bluetooth headset is configured to establish a first connection to each of the first electronic device and the second electronic device, where the first connection includes an asynchronous connection-oriented link ACL connection. The first electronic device and the second electronic device each are configured to display connection information of the Bluetooth headset on an interface after establishing the first connection to the Bluetooth headset. The Bluetooth headset is further configured to send a Bluetooth Low Energy BLE broadcast message, where the Bluetooth Low Energy BLE broadcast message includes status information of the Bluetooth headset. The third electronic device is configured to: establish a second connection to the Bluetooth headset after receiving the Bluetooth Low Energy BLE broadcast message sent by the Bluetooth headset, and display connection information of the Bluetooth headset on an interface based on the status information of the Bluetooth headset. The Bluetooth headset is further configured to: when the first electronic device has a first audio service, process the first audio service based on the first connection between the Bluetooth headset and the first electronic device; and when the second electronic device has a second audio service, process the second audio service based on the first connection between the Bluetooth headset and the second electronic device. The third electronic device is further configured to send connection request information to the Bluetooth headset when the third electronic device has a third audio service. The Bluetooth headset is further configured to: after receiving the connection request information sent by the third electronic device, establish a first connection to the third electronic device; process the third audio service based on the first connection between the Bluetooth headset and the third electronic device; release the first connection between the Bluetooth headset and the first electronic device; and send the Bluetooth Low Energy BLE broadcast message. The first electronic device is further configured to: after the first connection between the first electronic device and the Bluetooth headset is released, establish a second connection to the Bluetooth headset if the Bluetooth Low Energy BLE broadcast message sent by the Bluetooth headset is received.

The first connection may be a physical connection, and the second connection may be a virtual connection. The virtual connection consumes less power than the physical connection.

In this solution, the Bluetooth headset does not need to maintain physical connections to all electronic devices, but can reduce power consumption by combining physical connections and a virtual connection, and the Bluetooth headset can process audio services of a plurality of electronic devices in a direct and timely manner based on the physical connections between the Bluetooth headset and the plurality of electronic devices, thereby reducing a processing delay. The second connection may further be switched to a first connection, so that the Bluetooth headset can process an audio service of the electronic device based on the first connection established after switching.

According to another aspect, an embodiment of this application provides a Bluetooth device configured to implement the foregoing communications system and method. The Bluetooth device may be the Bluetooth headset, or the communications apparatus may be the electronic device. The Bluetooth device includes a corresponding module, unit, or means (means) for implementing the foregoing method. The module, unit, or means may be implemented by hardware or software, or implemented by hardware executing corresponding software. The hardware or the software includes one or more modules or units corresponding to the functions, for example, a sending unit/module, an establishment unit/module, a disconnection unit/module, a processing unit/module, and the like.

According to another aspect, an embodiment of this application provides a Bluetooth device, including a processor and a memory. The memory is configured to store computer instructions, and when the processor executes the instructions, the Bluetooth device is enabled to perform the method in any one of the foregoing aspects. The Bluetooth device may be the foregoing Bluetooth headset or electronic device.

According to another aspect, an embodiment of this application provides a Bluetooth device, including a processor. The processor is configured to: after being coupled to a memory and reading instructions in the memory, perform the method in any one of the foregoing aspects according to the instructions. The Bluetooth device may be the foregoing Bluetooth headset or electronic device.

According to another aspect, an embodiment of this application provides a computer-readable storage medium. The computer-readable storage medium stores instructions. When the instructions are run on a computer, the computer is enabled to perform the method in any one of the foregoing aspects and the possible designs.

According to another aspect, an embodiment of this application provides a computer program product including instructions. When the computer program product runs on a computer, the computer is enabled to perform the method in any one of the foregoing aspects and the possible designs.

According to another aspect, an embodiment of this application provides a Bluetooth device (for example, the Bluetooth device may be a chip or a chip system). The Bluetooth device includes a processor, configured to implement functions in any one of the foregoing aspects and the possible designs. In a possible design, the Bluetooth device further includes a memory. The memory is configured to store necessary program instructions and necessary data. When the Bluetooth device is a chip system, the Bluetooth device may include a chip, or may include a chip and another discrete component.

It may be understood that the Bluetooth device, the computer-readable storage medium, the computer program product, or the method provided above are all used in the communications system provided above. Therefore, for beneficial effects that can be achieved by the Bluetooth device, the computer-readable storage medium, the computer program product, the method, and the like, refer to beneficial effects in the corresponding communications system.

These aspects or other aspects of this application are clearer and easier to understand in descriptions of the following embodiments.

DESCRIPTION OF EMBODIMENTS

Figure 1:
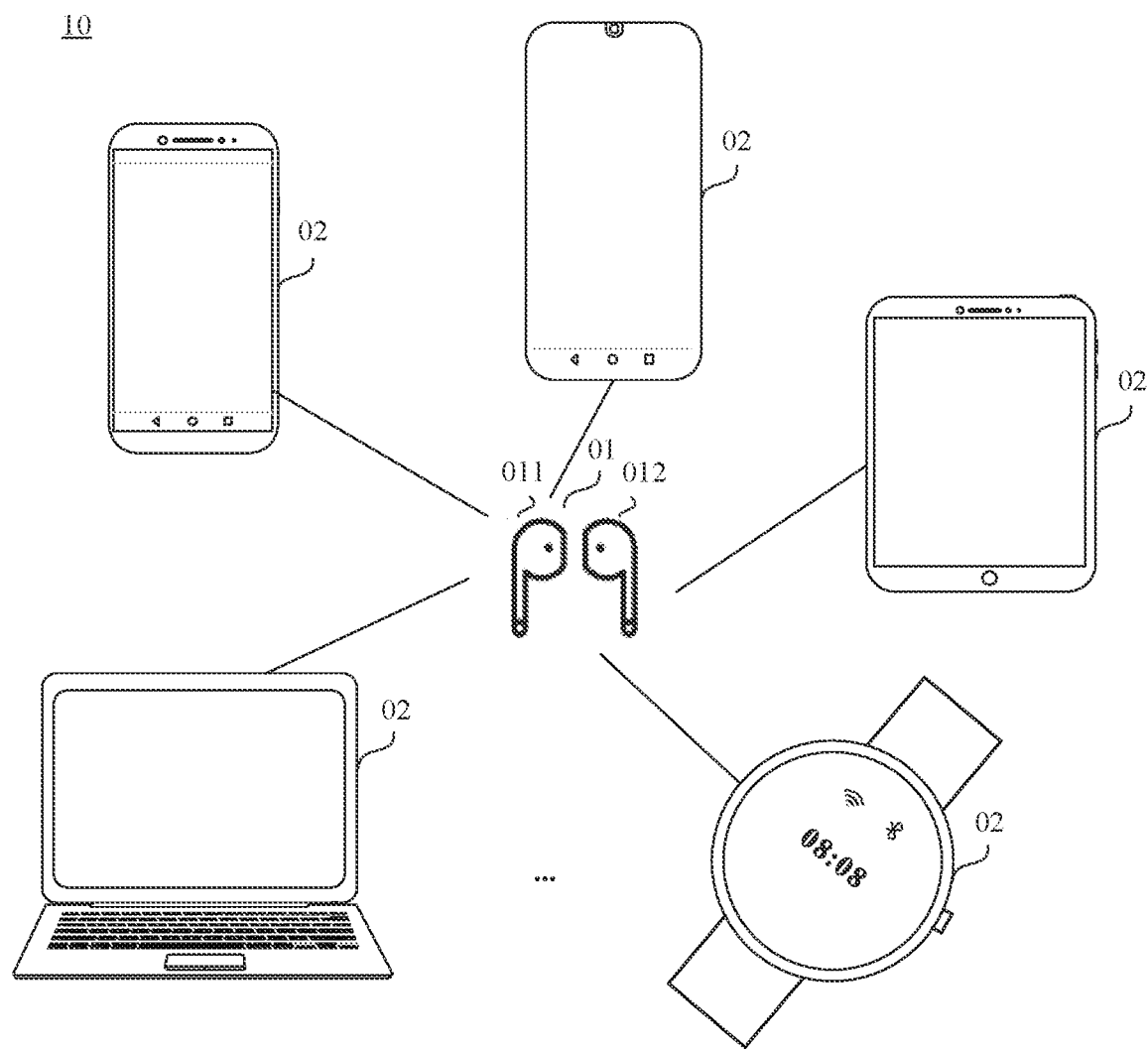
FIG. 1 is a schematic diagram of a system according to an embodiment of this application.

The following describes the technical solutions in embodiments of this application with reference to the accompanying drawings in the embodiments of this application. In the descriptions of the embodiments of this application, unless otherwise specified, "/" means "or". For example, A/B may represent A or B. In this specification, "and/or" describes only an association for describing associated objects and represents that three relationships may exist. For example, A and/or B may represent the following three cases: Only A exists, both A and B exist, and only B exists. In addition, in the descriptions of the embodiments of this application, "a plurality of" means two or more than two.

When a user uses a plurality of electronic devices in cooperation with one Bluetooth headset, in an existing solution, if the Bluetooth headset has established a physical connection to an electronic device 1, when an electronic device 2 has an audio service, the user may first manually release the physical connection between the Bluetooth headset and the electronic device 1, and then manually indicate to establish a physical connection between the Bluetooth headset and the electronic device 2. Then, the Bluetooth headset may process the audio service of the electronic device 2. This solution requires the user to manually indicate disconnection and connection, resulting in complex operations and poor user experience.

The physical connection may include an asynchronous connection-oriented link (asynchronous connection-oriented link. ACL) connection.

In another existing solution, if the Bluetooth headset has established a physical connection to the electronic device 1, when the electronic device 2 has an audio service, the user may manually indicate to establish a physical connection between the Bluetooth headset and the electronic device 2, and the Bluetooth headset automatically releases the physical connection between the Bluetooth headset and the electronic device 1. Then, the Bluetooth headset may process the audio service of the electronic device 2. This solution requires the user to manually indicate connection, resulting in relatively complex operations and poor user experience.

In another existing solution, the Bluetooth headset establishes physical connections to both the electronic device 1 and the electronic device 2; when the electronic device 1 has an audio service, the Bluetooth headset automatically processes the audio service of the electronic device 1; and when the electronic device 2 has an audio service, the Bluetooth headset automatically processes the audio service of the electronic device 2. In this solution, two physical connections need to be established and maintained continuously, and this results in high power consumption and short use time of the Bluetooth headset.

In addition, a currently used Bluetooth chip usually cannot support more physical connections. Therefore, the Bluetooth headset cannot simultaneously maintain physical connections to a plurality of electronic devices, and cannot automatically process audio services of the plurality of electronic devices.

An embodiment of this application provides a wireless device 01. The wireless device 01 may be applied to the communications system 10 shown in FIG. 1. The communications system 10 may include the wireless device 01 and two or more electronic devices 02. For example, there may be two, three, five, or ten electronic devices 02 in the communications system 10. The wireless device 01 may be a device such as a wireless headset shown in FIG. 1, a wireless sound box, a wireless band, a wireless vehicle-mounted device, wireless smart glasses, a wireless watch, or an augmented reality (augmented reality, AR)/virtual reality (virtual reality, VR) device. The electronic device 02 may be a device such as a mobile phone, a media player (for example, an MP3 or an MP4), a tablet computer, a notebook computer, an ultra-mobile personal computer (ultra-mobile personal computer, UMPC), a personal digital assistant (personal digital assistant, PDA), a television set, or a smartwatch. Device types of the wireless device 01 and the electronic device 02 are not specifically limited in this embodiment of this application.

The wireless device 01 may simultaneously maintain wireless connections to two or more electronic devices 02 by using a wireless communications technology. The wireless connection may be a physical connection or a virtual connection. The physical connection is a connection based on a physical link. The virtual connection requires no physical link. Compared with the physical connection, the virtual connection can save power of the wireless device and the electronic device 02, and prolong use duration of the wireless device and the electronic device 02. For example, the wireless communications technology may be Bluetooth (Bluetooth, BT): conventional Bluetooth or Bluetooth Low Energy BLE, or may be a wireless local area network (wireless local area network, WLAN) (for example, a wireless fidelity (wireless fidelity, Wi-Fi) network), Zigbee, frequency modulation (frequency modulation, FM), near field communication (near field communication, NFC), an infrared (infrared, IR) technology, a general 2.4G/5G frequency band wireless communications technology, or the like. The wireless connection is a connection established by using the wireless communications technology. A type of the wireless communications technology is not specifically limited in this embodiment of this application.

When an electronic device in the communications system has an audio service, if a physical connection is established between the electronic device and the wireless device, the wireless device may automatically process the audio service of the electronic device based on the physical connection. If the wireless device currently has established a physical connection to another electronic device, the wireless device may automatically switch from the physical connection between the wireless device and the another electronic device to the physical connection between the wireless device and the electronic device, so as to process the audio service of the electronic device based on the physical connection. Therefore, by switching between the physical connections, the wireless device can automatically switch between audio services of a plurality of electronic devices (which may be more than two electronic devices) for processing, and the plurality of electronic devices may share one wireless device. In addition, the user does not need to manually indicate to establish or release a connection between the wireless device and the electronic device. Therefore, manual operations of the user can be reduced, and use experience of the user can be improved.

The audio service may be of a plurality of types. For example, the audio service may be a media service or a call service. The media service may be an audio service such as playing music, a recording, a sound in a video file, background music in a game, or an incoming call prompt tone for the user. The call service may be: in a scenario such as a phone call, a WeChat voice message, an audio call, a video call, a game, or a voice assistant, playing voice data of a peer end for the user, collecting voice data of the user and sending the voice data to a peer end, or the like.

In this embodiment of this application, an example in which the wireless device is a wireless headset is used for description. The wireless headset may be of a plurality of types, for example, may be a wireless headset of an earplug type, an in-ear type, an over-ear type, an earmuff type, or an ear hook type. The wireless headset may include a first part and a second part that are respectively worn on the left ear and the right ear of a user. The first part and the second part may be connected by using a connection cable, for example, the wireless headset is a flex-form wireless headset. Alternatively, the first part and the second part may be independent of each other, for example, the wireless headset is a true wireless stereo (true wireless stereo, TWS) headset. For example, when the wireless headset is a TWS headset, as shown in FIG. 1, the first part 011 and the second part 012 may be a left earbud and a right earbud that are respectively worn on the left ear and the right ear of a user.

Figure 2A:
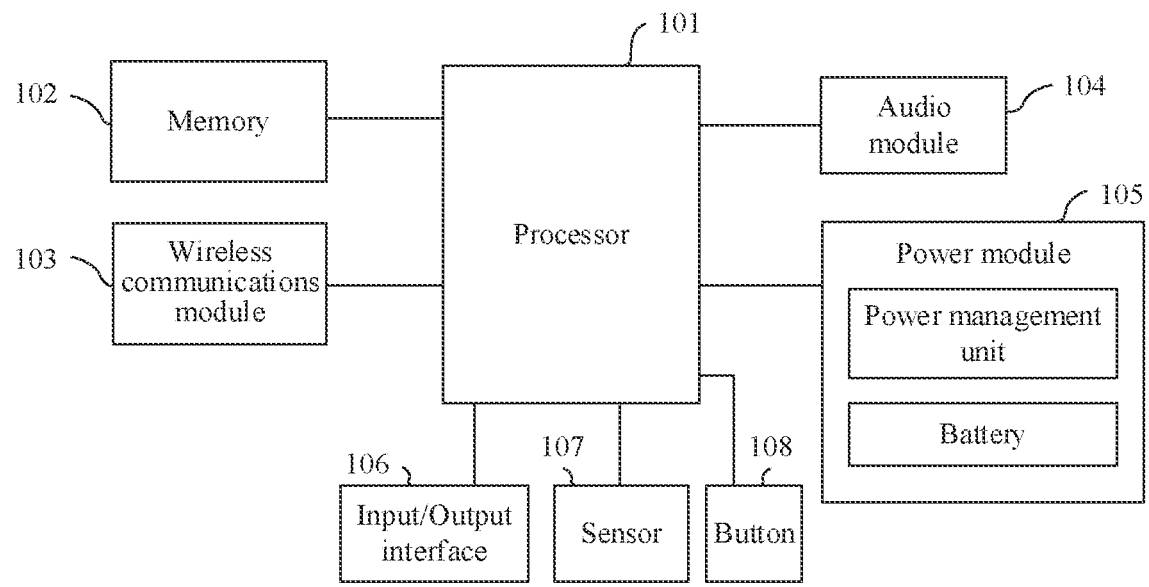
FIG. 2A is a schematic diagram of a structure of a wireless headset according to an embodiment of this application.

For example, FIG. 2A is a schematic diagram of a structure of a wireless headset 100. The wireless headset 100 may include at least one processor 101, at least one memory 102, a wireless communications module 103, an audio module 104, a power module 105, an input/output interface 106, and the like. The processor may include one or more interfaces for connecting to other components of the wireless headset 100. The wireless headset 100 is housed in a headset box.

The memory 102 may be configured to store program code, for example, program code used to establish virtual connections or physical connections between the wireless headset 100 and a plurality of electronic devices, switch between physical connections between the wireless headset 100 and electronic devices, process an audio service (for example, playing music, or receiving/making a call) of an electronic device, charge the wireless headset 100, or perform wireless pairing connection between the wireless headset 100 and another electronic device. The memory 102 may be further configured to store other information, for example, priorities of the electronic devices.

The processor 101 may be configured to execute the foregoing application program code, and invoke related modules to implement functions of the wireless headset 100 in this embodiment of this application. The functions are, for example, implementing virtual connections or physical connections between the wireless headset 100 and a plurality of electronic devices, audio playing, receiving/making a call, and switching between physical connections between the wireless headset 100 and different electronic devices based on device priorities. For another example, a service preemption function is supported. For example, when the Bluetooth headset establishes a physical connection to an electronic device 1 and is processing an audio service 1 (for example, playing music) of the electronic device 1, if the Bluetooth headset receives connection request information of an electronic device 2, the Bluetooth headset may switch to establishing a physical connection to the electronic device 2, and process an audio service 2 (for example, receiving/making a call) of the electronic device 2 based on the physical connection established after switching, to implement a service preemption function of the audio service 1 of the electronic device 2. In addition, the Bluetooth headset releases the physical connection between the Bluetooth headset and the electronic device 1, and switches from the physical connection to a virtual connection.

The processor 101 may include one or more processing units. Different processing units may be independent components, or may be integrated into one or more processors 101. The processor 101 may be specifically an integrated control chip, or may include a circuit including various active components and/or passive components, and the circuit is configured to perform the functions that belong to the processor 101 and that are described in this embodiment of this application.

The wireless communications module 103 may be configured to support data exchange between the wireless headset 100 and another electronic device or the headset box in wireless communication implemented through BT, WLAN (for example, Wi-Fi), Zigbee. FM, NFC, IR, a universal 2.4G/5G wireless communications technology, or the like.

In some embodiments, the wireless communications module 103 may be a Bluetooth chip. The wireless headset 100 may be paired with a Bluetooth chip of an electronic device by using the Bluetooth chip and establish a wireless connection to the electronic device, so as to implement wireless communication between the wireless headset 100 and the electronic device and service processing through the wireless connection. The wireless connection may be a physical connection or a virtual connection. Generally, the Bluetooth chip may support basic rate (basic rate, BR)/enhanced data rate (enhanced data rate, EDR) Bluetooth and BLE, for example, may receive/send page (page) information and receive/send a BLE broadcast message.

In addition, the wireless communications module 103 may further include an antenna. The wireless communications module 103 receives an electromagnetic wave through the antenna, performs frequency modulation and filtering processing on an electromagnetic wave signal, and sends a processed signal to the processor 101. The wireless communications module 103 may further receive a to-be-sent signal from the processor 101, perform frequency modulation and amplification on the to-be-sent signal, and convert the signal into an electromagnetic wave for radiation through the antenna.

The audio module 104 may be configured to manage audio data, and implement input and output of audio signals by the wireless headset 100. For example, the audio module 104 may obtain an audio signal from the wireless communications module 103, or transfer an audio signal to the wireless communications module 103, to implement functions such as receiving/making a call, playing music, enabling/disabling a voice assistant of an electronic device connected to the headset, and receiving/sending voice data of a user by using the Bluetooth headset. The audio module 104 may include a speaker (or referred to as an earpiece or a receiver) component configured to output an audio signal, a microphone (or referred to as a mike), a microphone radio circuit cooperating with the microphone, and the like. The speaker may be configured to convert an audio electrical signal into a sound signal and play the sound signal. The microphone may be configured to convert a sound signal into an audio electrical signal.

The power module 105 may be configured to provide a system power supply of the wireless headset 100 and supply power to each module of the wireless headset 100, and support the wireless headset 100 in receiving a charging input and the like. The power module 105 may include a power management unit (power management unit, PMU) and a battery. The power management unit may receive an external charging input, perform voltage transformation on an electrical signal input from a charging path and provide a transformed electrical signal to the battery for charging, and perform voltage transformation on an electrical signal provided by the battery and provide a transformed electrical signal to other modules such as the audio module 104 and the wireless communications module 103, so as to prevent battery overcharge, overdischarge, a short circuit, overcurrent, or the like. In some embodiments, the power module 105 may further include a wireless charging coil, configured to wirelessly charge the wireless headset 100. In addition, the power management unit may be further configured to monitor parameters such as a battery capacity, a battery cycle count, and a battery health status (electric leakage or impedance).

The plurality of input/output interfaces 106 may be configured to provide a wired connection for charging or communication between the wireless headset 100 and the headset box. In some embodiments, the input/output interface may be a USB port. In some other embodiments, the input/output interface 106 may be an electrical headset connector. When the wireless headset 100 is placed in the headset box, the wireless headset 100 may establish an electrical connection to an electrical connector in the headset box by using the electrical headset connector, so as to charge the battery in the wireless headset 100. In some other embodiments, after the electrical connection is established, the wireless headset 100 may further perform data communication with the headset box, for example, may receive a pairing instruction from the headset box.

In addition, the wireless headset 100 may further include a sensor 107. For example, the sensor 107 may be a distance sensor or an optical proximity sensor, and may be configured to determine whether the wireless headset 100 is worn by the user. For example, the wireless headset 100 may detect, by using the distance sensor, whether there is an object near the wireless headset 100, so as to determine whether the wireless headset 100 is worn by the user. When it is determined that the wireless headset 100 is worn, the wireless headset 100 may turn on the speaker.

For another example, the sensor 107 may further include a bone conduction sensor, to form a bone conduction headset. By using the bone conduction sensor, the wireless headset 100 may obtain a vibration signal of a vibration bone block of a vocal part of a human body, obtain a voice signal through parsing, and implement a voice function, so as to receive a voice instruction of the user. The wireless headset 100 may further perform voice authentication based on a user voice signal obtained by the bone conduction headset, to attempt to authenticate a user identity in a service scenario such as a payment transaction scenario.

For another example, the sensor 107 may further include: a touch sensor, configured to detect a touch operation of a user; a fingerprint sensor, configured to detect a user fingerprint, identify a user identity, and the like; an ambient optical sensor, configured to adaptively adjust some parameters (such as volume) based on perceived luminance of ambient light; and a number of other sensors.

In some embodiments, the touch sensor may detect a touch operation of the user such as single-tap, double-tap, multi-tap, touch and hold, and heavy press, and may further perform fingerprint recognition for the user, so as to attempt to authenticate a user identity in a service scenario such as a payment transaction scenario.

It may be understood that a structure shown in this embodiment of this application does not constitute a specific limitation on the wireless headset 100. The wireless headset 100 may have more or fewer components than those shown in FIG. 2A, may combine two or more components, or may have a different component configuration. For example, an outer surface of the wireless headset 100 may further include components such as a button 108, an indicator light (which may indicate a battery level, an incoming/outgoing call, a pairing mode, and the like), a display (which may prompt user related information), and a dust filter (which may be used together with the receiver). The button 108 may be a physical button, a touch button (used in cooperation with the touch sensor), or the like, and is configured to trigger operations such as power-on, power-off, pause, play, record, start pairing, and reset.

The various components shown in FIG. 2A may be implemented in hardware, software, or a combination of hardware and software that includes one or more signal processing or application-specific integrated circuits.

Figure 2B:
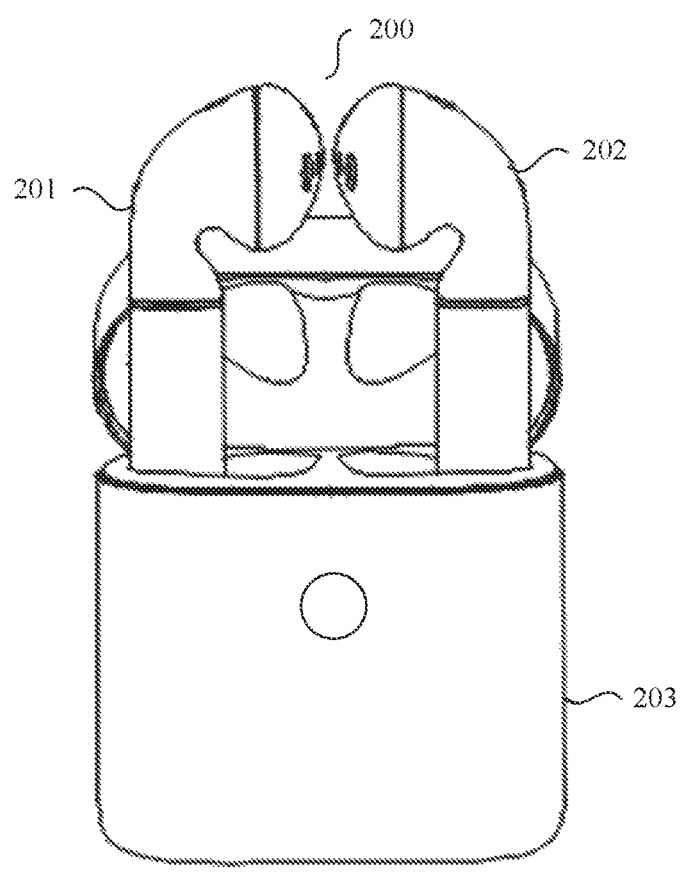
FIG. 2B is a schematic diagram of a wireless headset and a headset box according to an embodiment of this application.

For example, when the wireless headset is a TWS headset, as shown in FIG. 2B, the wireless headset 200 may include an earphone body 201 (also referred to as a left earbud or a first part) worn on a left ear and an earphone body 202 (also referred to as a right earbud or a second part) worn on a right ear. The earphone body may include a housing and an inner part. The inner part is disposed in a cavity formed by the housing. The inner part may include components in modules such as the audio module, the power module, and the wireless communications module.

When the wireless headset is a TWS headset, the user may use the TWS headset in a binaural mode or an uniaural mode. In the uniaural mode, a user wears the left earbud or the right earbud to perform an audio service such as listening to music or answering/making a call. In the binaural mode, the user may wear the two earbuds to listen to music or perform another audio service. In the binaural mode, the two earbuds include a primary earbud and a secondary earbud. In addition, in a process of using the TWS headset, the primary and secondary roles of the two earbuds may be switched.

In some embodiments, the TWS headset may exchange control information, for example, connection control information or service control information, with an electronic device by using the primary earbud. In this way, the TWS headset may establish or release a physical connection and a virtual connection between the TWS headset and the electronic device based on the connection control information; and perform operations such as service action control (for example, pausing, playing, and switching to a previous song) based on the service control information.

In a case, a wireless connection is established between the primary earbud and an electronic device, and wireless communication may be performed between the primary earbud and the electronic device to exchange control information and audio data. A wireless connection is also established between the primary earbud and the secondary earbud, and the primary earbud may indicate the secondary earbud to perform status synchronization, for example, establish/release a physical connection or a virtual connection to the electronic device. The secondary earbud may receive, in a manner such as forwarding by the primary earbud, monitoring, near field magnetic induction (near field magnetic induction, NFMI), or the like, audio data sent by the electronic device.

In the monitoring solution, the electronic device establishes a Bluetooth connection to the primary earbud, completes sending of audio data to the primary earbud, and completes service actions triggered by the electronic device and the TWS headset (for example, playing, pausing, switching to a previous song, and turning up the volume). A Bluetooth connection is established between the two earbuds to complete information synchronization between the two earbuds, and the secondary earbud obtains audio data by monitoring a Bluetooth link between the primary earbud and the electronic device.

In the forwarding solution, the electronic device establishes a Bluetooth connection to the primary earbud, completes sending of audio data to the primary earbud, and completes service actions triggered by the electronic device and the TWS headset. A Bluetooth connection is established between the two earbuds to complete information synchronization between the two earbuds, and the primary earbud forwards audio data to the secondary earbud by using a Bluetooth link between the primary earbud and the secondary earbud.

In the NFMI solution, the electronic device establishes a Bluetooth connection to the primary earbud, completes sending of audio data to the primary earbud, and completes service actions triggered by the electronic device and the TWS headset. An NFMI connection is established between the two earbuds to complete information synchronization between the two earbuds, and the primary earbud forwards audio data to the secondary earbud by using an NFMI link between the primary earbud and the secondary earbud.

In another case, the primary and secondary earbuds may establish a dual-transmission connection with the electronic device. In the dual-transmission solution, the electronic device establishes a Bluetooth connection to each of the two earbuds of the TWS headset. In some embodiments, the electronic device exchanges audio data, service control information, and the like with the two earbuds of the TWS headset by using a Bluetooth link between the electronic device and each of the two earbuds, to implement operations such as audio data playing and service action control. The TWS headset may also include a primary earbud and a secondary earbud. The primary earbud exchanges connection control information with the electronic device, and the primary earbud indicates the secondary earbud to perform connection status synchronization.

In addition, in a use process, because the primary and secondary roles of the two earbuds of the TWS headset may be switched, the primary earbud may synchronize, to the secondary ear, related information required for establishing or releasing a physical connection and a virtual connection between the primary earbud and the electronic device, so that after the secondary ear and the primary ear are switched, a physical connection and a virtual connection to the electronic device may be established or released based on the related information. For example, the related information may include historical pairing information of the electronic device, historical connection information, device priority information, service priority information, and the like.

In some other embodiments, in the dual-transmission solution, the electronic device establishes a Bluetooth connection to each of the two earbuds of the TWS headset. The electronic device exchanges connection control information, audio data, and service control information by using a Bluetooth link between the electronic device and each of the two earbuds of the TWS headset.

In addition, FIG. 2B further shows a schematic diagram of a headset box 203 used to house the wireless headset 200. In some embodiments, the headset box may have one or more magnets inside, so as to attract the headset body into a cavity in the headset box. The headset box may include a battery and a plurality of input/output interfaces. In some embodiments, the input/output interface may be a box electrical connector. After a pair of box electrical connectors in the headset box establish electrical connections to two electrical headset connectors in the headset body, the headset box may charge the battery in the headset body by using the battery of the headset box.

In some other embodiments, at least one touch control may be disposed on the headset box, and may be configured to trigger a function such as pairing reset of the wireless headset or charging the wireless headset. The headset box may further be provided with one or more battery level indicators, so as to prompt the user a power level of the battery in the headset box and a power level of a battery in each headset body in the headset box.

In some other embodiments, the headset box may further include components such as a processor and a memory. The memory may be configured to store application program code, and the processor of the headset box controls the application program code to be executed, to implement functions of the headset box. For example, the processor of the headset box executes the application program code stored in the memory to charge the wireless headset or the like after detecting that the wireless headset is put into the headset box and a cover of the headset box is closed.

In addition, a charging interface may be further disposed on the headset box, to charge the battery of the headset box. The headset box may further include a wireless charging coil, configured to wirelessly charge the battery of the headset box. It can be understood that the headset box may further include other components, and details are not described herein.

Figure 3:
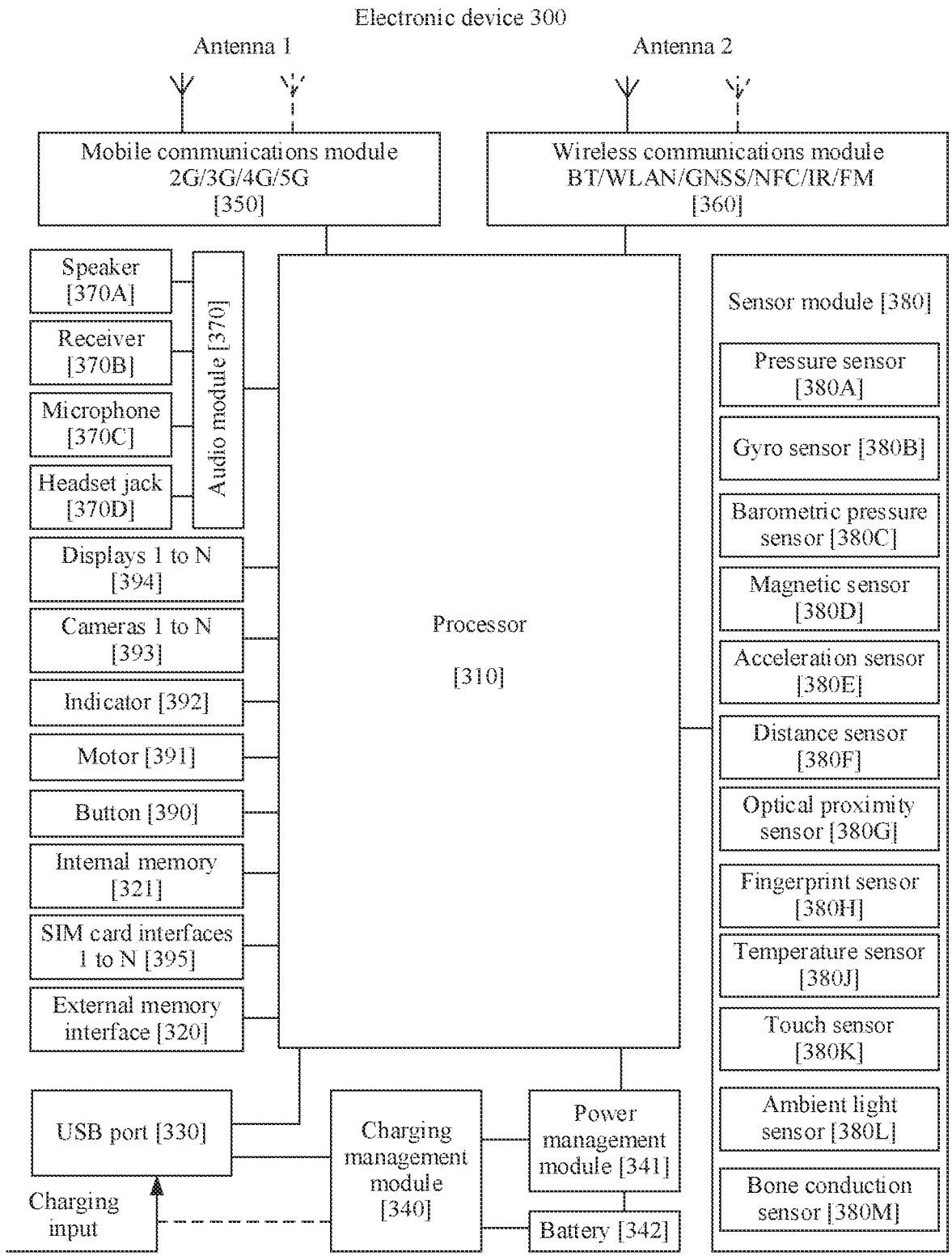
FIG. 3 is a schematic diagram of a structure of an electronic device according to an embodiment of this application.

A structure of the electronic device:

For example, FIG. 3 is a schematic diagram of a structure of an electronic device 300. The electronic device 300 may include a processor 310, an external memory interface 320, an internal memory 321, a universal serial bus (universal serial bus, USB) port 330, a charging management module 340, a power management unit 341, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a button 390, a motor 391, an indicator 392, a camera 393, a display 394, a subscriber identification module (subscriber identification module, SIM) card interface 395, and the like. The sensor module 380 may include a pressure sensor 380A, a gyro sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It may be understood that the structure shown in this embodiment of this application does not constitute a specific limitation on the electronic device 300. In some other embodiments of this application, the electronic device 300 may include more or fewer components than those shown in the figure, or some components may be combined, or some components may be split, or different component arrangements may be used. The components shown in the figure may be implemented by using hardware, software, or a combination of software and hardware.

The processor 310 may include one or more processing units. For example, the processor 310 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 300. The controller may generate an operation control signal based on instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data that is just used or cyclically used by the processor 310. If the processor 310 needs to use the instruction or the data again, the processor 310 may directly invoke the instruction or the data from the memory. This avoids repeated access and reduces a waiting time of the processor 310. Therefore, system efficiency is improved.

In some embodiments, the processor 310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter. UART) interface, a mobile industry processor interface (mobile industry processor interface. MIPI), a general-purpose input/output (general-purpose input/output, GPIO) interface, a subscriber identity module (subscriber identity module, SIM) interface, a universal serial bus (universal serial bus, USB) port, and/or the like.

The I2S interface may be used for audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may transmit an audio signal to the wireless communications module 360 through the I2S interface, to implement a function of answering a call through a Bluetooth headset.

The PCM interface may also be configured to: perform audio communication, and sample, quantize, and code an analog signal. In some embodiments, the audio module 370 may be coupled to the wireless communications module 360 through the PCM bus interface. In some embodiments, the audio module 370 may transmit an audio signal to the wireless communications module 360 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 310 to the wireless communications module 360. For example, the processor 310 communicates with a Bluetooth module in the wireless communications module 36) through the UART interface, to implement a Bluetooth function. In some embodiments, the audio module 370 may transmit an audio signal to the wireless communications module 360 through the UART interface, to implement a function of playing music through a Bluetooth headset.

It can be understood that an interface connection relationship between modules illustrated in this embodiment of this application is merely an example for description, and does not constitute a limitation on the structure of the electronic device 300. In some other embodiments of this application, the electronic device 300 may alternatively use an interface connection manner different from the interface connection manner in this embodiment, or a combination of a plurality of interface connection manners.

The charging management module 340 is configured to receive a charging input from the charger. The charger may be a wireless charger or a wired charger. In some embodiments of wired charging, the charging management module 340 may receive a charging input from the wired charger through the USB port 330. In some embodiments of wireless charging, the charging management module 340 may receive a wireless charging input through a wireless charging coil of the electronic device 300. The charging management module 340 may further supply power to the electronic device through the power management unit 341 while charging the battery 342.

The power management unit 341 is configured to connect the battery 342 and the charging management module 340 to the processor 310. The power management unit 341 receives an input of the battery 342 and/or the charging management module 340, and supplies power to the processor 310, the internal memory 321, an external memory, the display 394, the camera 393, the wireless communications module 360, and the like. The power management unit 341 may be further configured to monitor parameters such as a battery capacity, a battery cycle count, and a battery health status (electric leakage or impedance). In some other embodiments, the power management unit 341 may alternatively be disposed in the processor 310. In some other embodiments, the power management unit 341 and the charging management module 340 may alternatively be disposed in a same device.

A wireless communication function of the electronic device 300 may be implemented through the antenna 1, the antenna 2, the mobile communications module 350, the wireless communications module 360, a modem processor, a baseband processor, and the like.

The antenna 1 and the antenna 2 are configured to transmit and receive electromagnetic wave signals. Each antenna in the electronic device 300 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 350 may provide a wireless communication solution that includes 2G/3G/4G/5G or the like and that is applied to the electronic device 300. The mobile communications module 350 may include at least one filter, a switch, a power amplifier, a low noise amplifier (low noise amplifier, LNA), and the like. The mobile communications module 350 may receive an electromagnetic wave by using the antenna 1, perform processing such as filtering or amplification on the received electromagnetic wave, and transmit the electromagnetic wave to the modem processor for demodulation. The mobile communications module 350 may further amplify a signal modulated by the modem processor, and convert the signal into an electromagnetic wave for radiation by using the antenna 1. In some embodiments, at least some functional modules in the mobile communications module 350 may be disposed in the processor 310. In some embodiments, at least some functional modules in the mobile communications module 350 and at least some modules in the processor 310 may be disposed in a same device.

The modem processor may include a modulator and a demodulator. The modulator is configured to modulate a to-be-sent low frequency baseband signal into a medium and high frequency signal. The demodulator is configured to demodulate a received electromagnetic wave signal into a low-frequency baseband signal. Then, the demodulator transfers the low-frequency baseband signal obtained through the demodulation to the baseband processor for processing. The baseband processor processes the low-frequency baseband signal, and then transfers an obtained signal to the application processor. The application processor outputs a sound signal through an audio device (which is not limited to the speaker 370A, the receiver 370B, or the like), or displays an image or a video through the display 394. In some embodiments, the modem processor may be an independent device. In some other embodiments, the modem processor may be independent of the processor 310, and is disposed in a same device as the mobile communications module 350 or another functional module.

The wireless communications module 360 may provide a wireless communications solution that is applied to the electronic device 300 and includes a WLAN (for example, Wi-Fi), BT, a global navigation satellite system (global navigation satellite system, GNSS), FM, NFC, IR, or a universal 2.4G/5G wireless communications technology. The wireless communications module 360 may be one or more components integrating at least one communications processor module. The wireless communications module 360 receives an electromagnetic wave by using the antenna 2, performs frequency modulation and filtering processing on the electromagnetic wave signal, and sends a processed signal to the processor 310. The wireless communications module 360 may further receive a to-be-sent signal from the processor 310, perform frequency modulation and amplification on the signal, and convert the signal into an electromagnetic wave for radiation by using the antenna 2.

In some embodiments, the wireless communications module 360 may be a Bluetooth chip. The electronic device 300 may be paired with and establish a wireless connection to a Bluetooth chip of an electronic device such as a wireless headset by using the Bluetooth chip, to implement wireless communication and service processing between the electronic device 300 and another electronic device by using the wireless connection. The wireless connection may be a physical connection or a virtual connection. The Bluetooth chip generally can support BR/EDR Bluetooth and BLE.

In some embodiments, the antenna 1 and the mobile communications module 350 in the electronic device 300 are coupled, and the antenna 2 and the wireless communications module 360 are coupled, so that the electronic device 300 can communicate with a network and another device through a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 300 implements a display function through the GPU, the display 394, the application processor, and the like. The GPU is a microprocessor for image processing, and connects the display 394 to the application processor. The GPU is configured to: perform mathematical and geometric calculation, and render an image. The processor 310 may include one or more GPUs that execute program instructions to generate or change display information.

The display 394 is configured to display an image, a video, and the like. The display 394 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a Mini-LED, a Micro-LED, a Micro-OLED, a quantum dot light emitting diode (quantum dot light emitting diode, QLED), or the like. In some embodiments, the electronic device 300 may include one or N displays 394, where N is a positive integer greater than 1.

The electronic device 300 may implement a photographing function through the ISP, the camera 393, the video codec, the GPU, the display 394, the application processor, and the like.

The ISP is configured to process data fed back by the camera 393. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 393.

The camera 393 is configured to capture a static image or a video. An optical image of an object is generated by using the lens, and is projected onto a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 300 may include one or N cameras 393, where N is a positive integer greater than 1.

The digital signal processor is configured to process a digital signal, and may process another digital signal in addition to the digital image signal. For example, when the electronic device 300 selects a frequency, the digital signal processor is configured to perform Fourier transform or the like on frequency energy.

The video codec is configured to: compress or decompress a digital video. The electronic device 300 may support one or more video codecs. In this way, the electronic device 300 may play or record videos in a plurality of coding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 300 may be implemented through the NPU, for example, image recognition, facial recognition, speech recognition, and text understanding.

The external memory interface 320 may be configured to connect to an external memory card, for example, a micro SD card, to extend a storage capability of the electronic device 300. The external storage card communicates with the processor 310 through the external memory interface 320, to implement a data storage function. For example, files such as music and a video are stored in the external storage card.

The internal memory 321 may be configured to store computer executable program code, and the computer executable program code includes instructions. The processor 310 performs various function applications of the electronic device 300 and data processing by running the instructions stored in the internal memory 321. The internal memory 321 may include a program storage area and a data storage area. The program storage area may store an operating system, an application required by at least one function (for example, a sound playing function or an image playing function), and the like. The data storage area may store data (such as audio data and a phone book) created when the electronic device 300 is used, and the like. In addition, the internal memory 321 may include a high-speed random access memory, and may further include a nonvolatile memory, for example, at least one magnetic disk storage device, a flash memory device, or a universal flash storage (universal flash storage, UFS).

The processor 310 may be configured to execute the foregoing program code, and invoke related modules to implement functions of the electronic device in the embodiments of this application. The functions include, for example, pairing with a wireless headset; when there is an audio service, sending connection request information to the wireless headset based on a priority of the audio service; and establishing/releasing a physical or virtual connection between the electronic device and the wireless headset.

The electronic device 300 may implement audio functions, for example, music playing and recording, by using the audio module 370, the speaker 370A, the receiver 370B, the microphone 370C, the headset jack 370D, the application processor, and the like.

The audio module 370 is configured to convert digital audio information into an analog audio signal output, and is also configured to convert an analog audio input into a digital audio signal. The audio module 370 may be further configured to: code and decode an audio signal. In some embodiments, the audio module 370 may be disposed in the processor 310, or some functional modules in the audio module 370 are disposed in the processor 310.

The speaker 370A, also referred to as a "horn", is configured to convert an audio electrical signal into a sound signal. The electronic device 300 may listen to music or answer a hands-free call through the speaker 370A.

The receiver 370B, also referred to as an "earpiece", is configured to convert an audio electrical signal into a sound signal. When the electronic device 300 answers a call or receives a voice message, the receiver 370B may be placed close to a human ear to listen to a voice.

The microphone 370C, also referred to as a "mike" or a "microphone", is configured to convert a sound signal into an electrical signal. When making a call or sending a voice message, a user may place the mouth of the user near the microphone 370C to make a sound, to input a sound signal to the microphone 370C. At least one microphone 370C may be disposed in the electronic device 300. In some other embodiments, two microphones 370C may be disposed in the electronic device 300, to collect a sound signal and implement a noise reduction function. In some other embodiments, three, four, or more microphones 370C may alternatively be disposed in the electronic device 300, to collect a sound signal, reduce noise, identify a sound source, implement a directional recording function, and the like.

The headset jack 370D is configured to connect to a wired headset. The headset jack 370D may be the USB port 330, or may be a 3.5 mm open mobile terminal platform (open mobile terminal platform, OMTP) standard interface or a Cellular Telecommunications Industry Association of the USA (Cellular Telecommunications Industry Association of the USA, CTIA) standard interface.

The pressure sensor 380A is configured to sense a pressure signal, and can convert the pressure signal into an electrical signal. In some embodiments, the pressure sensor 380A may be disposed in the display 394. There are many types of pressure sensors 380A, for example, a resistive pressure sensor, an inductive pressure sensor, and a capacitive pressure sensor. The capacitive pressure sensor may include at least two parallel plates made of conductive materials. When a force is applied to the pressure sensor 380A, capacitance between electrodes changes. The electronic device 300 determines pressure intensity based on the capacitance change. When a touch operation is performed on the display 394, the electronic device 300 detects intensity of the touch operation through the pressure sensor 380A. The electronic device 300 may also calculate a touch location based on a detection signal of the pressure sensor 380A. In some embodiments, touch operations that are performed at a same touch location but have different touch operation strength may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 380B may be configured to determine a motion posture of the electronic device 300. In some embodiments, an angular velocity of the electronic device 300 around three axes (namely, x, y, and z axes) may be determined through the gyro sensor 380B. The gyro sensor 380B may be configured to implement image stabilization during photographing. For example, when the shutter is opened, the gyro sensor 380B detects an angle at which the electronic device 300 jitters, obtains, through calculation based on the angle, a distance for which a lens module needs to compensate, and allows the lens to cancel the jitter of the electronic device 300 through reverse motion, to implement the image stabilization. The gyro sensor 380B may also be used in a navigation scenario and a somatic game scenario.

The barometric pressure sensor 380C is configured to measure barometric pressure. In some embodiments, the electronic device 300 calculates an altitude based on a value of the barometric pressure measured by the barometric pressure sensor 380C, to assist positioning and navigation.

The magnetic sensor 380D includes a Hall sensor. The electronic device 300 may detect opening/closing of a flip leather case through the magnetic sensor 380D. In some embodiments, when the electronic device 300 is a clamshell phone, the electronic device 300 may detect opening/closing of a flip cover through the magnetic sensor 380D. Further, a feature such as automatic unlocking upon opening of the flip cover is set based on a detected opening or closing state of the leather case or a detected opening or closing state of the flip cover.

The acceleration sensor 380E may detect magnitude of accelerations of the electronic device 300 in various directions (usually on three axes), and may detect magnitude and a direction of the gravity when the electronic device 300 is still. The acceleration sensor 380E may be further configured to identify, a posture of the electronic device, and is used in an application such as switching between landscape mode and portrait mode or a pedometer.

The distance sensor 380F is configured to measure a distance. The electronic device 300 may measure the distance through infrared or a laser. In some embodiments, in a photographing scenario, the electronic device 300 may measure a distance through the distance sensor 380F to implement quick focusing.

For example, the proximity sensor 380G may include a light-emitting diode (LED) and an optical detector, for example, a photodiode. The light-emitting diode may be an infrared light-emitting diode. The electronic device 300 emits infrared light through the light-emitting diode. The electronic device 300 detects infrared reflected light from a nearby object through the photodiode. When detecting sufficient reflected light, the electronic device 300 may determine that there is an object near the electronic device 300. When detecting insufficient reflected light, the electronic device 300 may determine that there is no object near the electronic device 300. The electronic device 300 can detect, through the proximity sensor 380G, that the user holds the electronic device 300 close to an ear to make a call, and then can automatically turn off a screen for power saving. The proximity sensor 380G may also be used in a smart cover mode or a pocket mode to automatically perform screen unlocking or locking.

The ambient light sensor 380L is configured to sense ambient light brightness. The electronic device 300 may adaptively adjust brightness of the display 394 based on the sensed ambient light brightness. The ambient light sensor 380L may also be configured to automatically adjust white balance during photographing. The ambient light sensor 380L may also cooperate with the proximity sensor 380G to detect whether the electronic device 300 is in a pocket, to avoid an accidental touch.

The fingerprint sensor 380H is configured to collect a fingerprint. The electronic device 300 may use a feature of the collected fingerprint to implement fingerprint-based unlocking, application lock access, fingerprint-based photographing, fingerprint-based call answering, and the like.

The temperature sensor 380J is configured to detect a temperature. In some embodiments, the electronic device 300 executes a temperature processing policy based on the temperature detected by the temperature sensor 380J. For example, when the temperature reported by the temperature sensor 380J exceeds a threshold, the electronic device 300 lowers performance of a processor located near the temperature sensor 380J, to reduce power consumption to implement thermal protection. In some other embodiments, when the temperature is less than another threshold, the electronic device 300 heats the battery 342 to prevent the electronic device 300 from being shut down abnormally because of a low temperature. In some other embodiments, when the temperature is less than still another threshold, the electronic device 300 boosts an output voltage of the battery 342 to avoid abnormal shutdown caused by a low temperature.

The touch sensor 380K may also be referred to as a "touch panel". The touch sensor 380K may be disposed in the display 394. The touch sensor 380K and the display 394 form a touchscreen, which is also referred to as a "touchscreen". The touch sensor 380K is configured to detect a touch operation on or near the touch sensor 380K. The touch sensor may transfer the detected touch operation to the application processor, to determine a type of a touch event. A visual output related to the touch operation may be provided by using the display 394. In some other embodiments, the touch sensor 380K may alternatively be disposed on a surface of the electronic device 300 at a location different from that of the display 394.

The bone conduction sensor 380M may obtain a vibration signal. In some embodiments, the bone conduction sensor 380M may obtain a vibration signal of a vibration bone of a human vocal-cord part. The bone conduction sensor 380M may also contact a body pulse to receive a blood pressure beating signal. In some embodiments, the bone conduction sensor 380M may also be disposed in the headset, to form a bone conduction headset. The audio module 370 may obtain a speech signal through parsing based on the vibration signal that is of the vibration bone of the vocal-cord part and that is obtained by the bone conduction sensor 380M, to implement a speech function. The application processor may parse heart rate information based on the blood pressure beating signal obtained by the bone conduction sensor 380M, to implement a heart rate detection function.

The button 390 includes a power button, a volume button, and the like. The button 390 may be a mechanical button, or may be a touch button. The electronic device 300 may receive a button input, and generate a button signal input related to user settings and function control of the electronic device 300.

The motor 391 may generate a vibration prompt. The motor 391 may be configured to provide an incoming call vibration prompt and a touch vibration feedback. For example, touch operations performed on different applications (for example, photographing and audio playing) may correspond to different vibration feedback effects. The motor 391 may also correspond to different vibration feedback effects for touch operations performed on different regions of the display 394. Different application scenarios (for example, a time reminder, information receiving, an alarm clock, and a game) may also correspond to different vibration feedback effects. A touch vibration feedback effect may be further customized.

The indicator 392 may be an indicator light, and may be configured to indicate a charging status and a power change, or may be configured to indicate a message, a missed call, a notification, and the like.

The SIM card interface 395 is configured to connect to a SIM card. The SIM card may be inserted into the SIM card interface 395 or detached from the SIM card interface 395, to implement contact with or separation from the electronic device 300. The electronic device 300 may support one or N SIM card interfaces, where N is a positive integer greater than 1. The SIM card interface 395 may support a nano-SIM card, a micro SIM card, a SIM card, and the like. A plurality of cards may be inserted into a same SIM card interface 395 at the same time. The plurality of cards may be of a same type or different types. The SIM card interface 395 may be compatible with different types of SIM cards. The SIM card interface 395 may also be compatible with an external memory card. The electronic device 300 interacts with a network through the SIM card, to implement functions such as conversation and data communication. In some embodiments, the electronic device 300 uses an eSIM, namely, an embedded SIM card. The eSIM card may be embedded into the electronic device 300, and cannot be separated from the electronic device 300.

Bluetooth Protocol Architecture:

In this embodiment of this application, an example in which the wireless headset and the electronic device include Bluetooth modules, and the wireless headset and the electronic device are wirelessly connected by using Bluetooth is used for description.

Figure 4A:
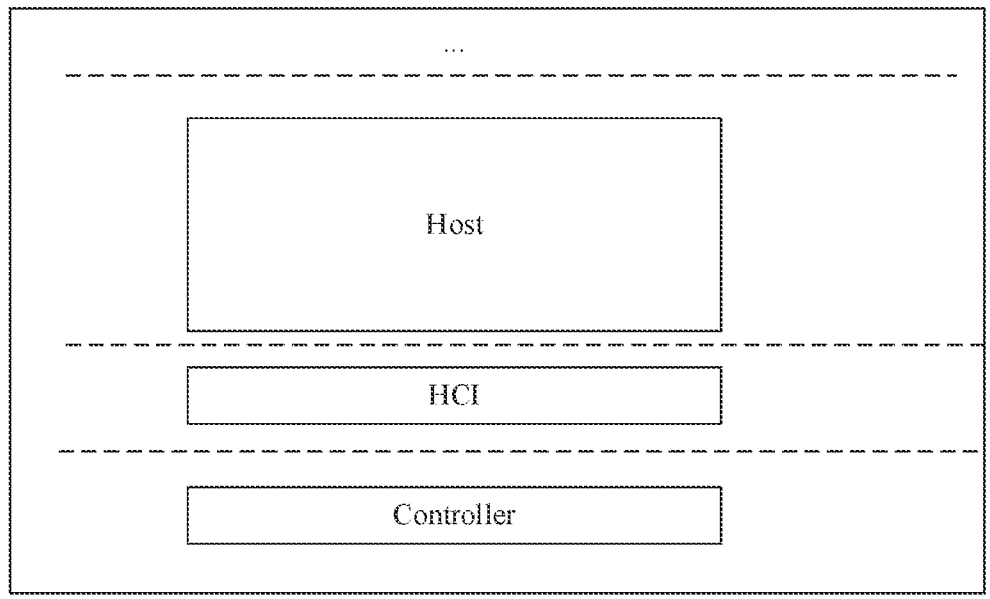
FIG. 4A is a schematic diagram of a Bluetooth protocol framework according to an embodiment of this application.

As shown in FIG. 4A, an embodiment of this application provides a Bluetooth protocol framework of an electronic device, including but not limited to a controller (controller), a host controller interface (host controller interface, HCI), a host (host), a Bluetooth service, and the like.

The Bluetooth service defines corresponding message formats and application rules. To implement interconnection and interworking between different devices on different platforms, the Bluetooth protocol has formulated specifications for various possible and universal application scenarios. The specifications include, for example, the advanced audio distribution profile (advanced audio distribution profile, A2DP), the headset profile (headset profile, HSP), and the hands-free profile (hands-free profile, HFP).

The host (host) defines a core protocol (protocol), including but not limited to the service discovery protocol (service discovery protocol, SDP), the logical link control and adaptation protocol (logical link control and adaptation protocol, L2CAP), and the like. The core protocol is essential to the Bluetooth protocol stack.

The HCI provides an upper-layer protocol with a unified interface for entering a link manager and a unified manner for entering a baseband. There are several transport layers between the host core protocol stack and the controller. These transport layers are transparent and complete a task of transmitting data. The Bluetooth special interest group (Bluetooth Special Interest Group, SIG) defines four physical bus modes to connect to hardware, that is, four HCI transport layers: USB, RS232, UART, and PC card.

The controller defines an underlying hardware part, including radio frequency (radio frequency, RF), baseband (baseband, BB), link manager (link manager, LM), link control (link control, LC), and the like. The RF layer filters and transmits data bitstreams through microwaves in the 2.4 GHz unlicensed ISM band, and mainly defines conditions that a Bluetooth transceiver needs to meet to work normally in this band. The baseband is responsible for frequency hopping and transmission of Bluetooth data and information frames. The link manager is responsible for connection, establishment, and disconnection of links, and security control. The LM layer is a link management layer protocol of the Bluetooth protocol stack, and is responsible for translating an upper-layer HCI command into an operation acceptable to the baseband, establishing an ACL and a synchronous connection (synchronous connection-oriented/extended, SCO), enabling the Bluetooth device to enter a working mode of an energy-saving state, and the like. The LC layer is responsible for responding to an upper-layer LM command during transmission of a batch of data packets (for example, executing LM commands for establishing a transmission link of a data packet and maintaining the link).

The Bluetooth framework protocol used in this embodiment of this application may adaptively modify a Bluetooth service or a Bluetooth host in an existing Bluetooth protocol, to implement the connection method provided in the embodiments of this application.

In some other embodiments, the Bluetooth service and the host (host) protocol stack may be configured in a same module. The Bluetooth framework protocol used in this embodiment of this application may modify the module, to implement the connection method provided in the embodiments of this application.

Operating System Architecture:

A software system of the electronic device 300 may use a layered architecture, an event-driven architecture, a micro kernel architecture, a micro service architecture, or a cloud architecture. In the embodiments of this application, an Android system with a layered architecture is used as an example to describe a software structure of the electronic device 300.

Figure 4B:
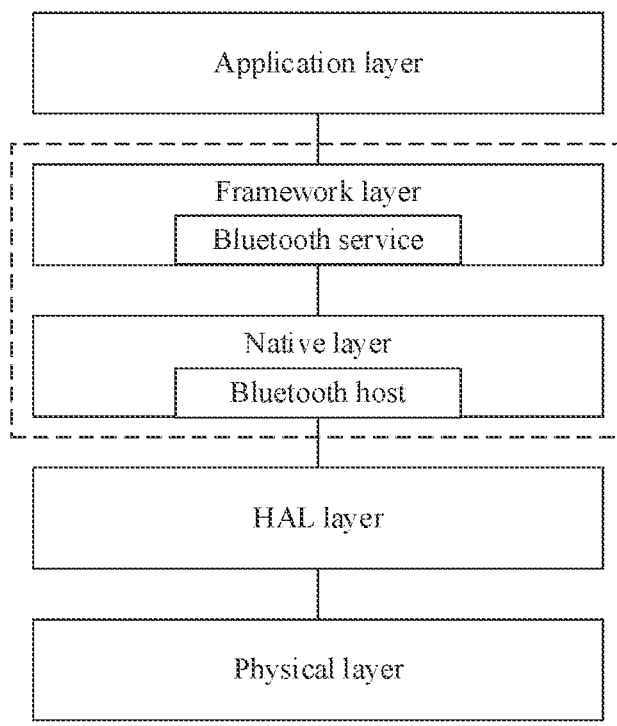
FIG. 4B is a block diagram of a software structure according to an embodiment of this application.

FIG. 4B is a block diagram of the software structure of the electronic device 300 according to an embodiment of this application. In a layered architecture, software is divided into several layers, and each layer has a clear role and task. The layers communicate with each other through a software interface. In some embodiments, the Android system is divided into four layers, which are respectively an application layer, an application framework layer and a native layer, a hardware abstract layer (hardware abstract layer, HAL), and a physical layer from top to bottom.

The application layer may include a series of application packages. The application package may include applications such as "Camera", "Gallery", "Calendar", "Phone", "Maps", "Navigation", "WLAN", "Bluetooth", "Music", "Videos", and "Messages".

The framework layer provides an application programming interface (application programming interface, API) and a programming framework for an application at the application layer. The application framework layer includes some predefined functions. The framework layer may include a Bluetooth service. In some embodiments, the Bluetooth service may be adaptively modified at the framework layer, to implement the connection method provided in the embodiments of this application.

The native layer can improve some local services and linkbases. The native layer may include a Bluetooth host. In some other embodiments, the Bluetooth host may be adaptively modified at the native layer, to implement the connection method provided in this embodiment of this application.

The HAL layer is an interface layer located between an operating system kernel and a hardware circuit, and may abstract hardware. The physical layer provides an underlying hardware driver interface.

It may be understood that the electronic device 300 may alternatively be another operating system. This is not limited in this embodiment of this application. In some other operating systems, the framework layer and the native layer may be set as one layer. Therefore, in some other embodiments, an existing Bluetooth protocol may be adaptively modified at the layer, to implement the connection method provided in the embodiments of this application.

An example of modifying the Bluetooth service at the framework layer is used for description. In the Bluetooth protocol on which the embodiments of this application are based, when determining that the electronic device is paired with the Bluetooth headset and receiving a first BLE broadcast message sent by the Bluetooth headset, the Bluetooth service at the framework layer of the electronic device reports, to an upper-layer Bluetooth application (for example, a Bluetooth setting (setting) application), that the electronic device is connected to the Bluetooth headset. For example, the Bluetooth service at the framework layer may specifically notify, to the Bluetooth setting application by using an Android broadcast message mechanism, that the electronic device is connected to the Bluetooth headset. The upper-layer Bluetooth application displays, on a related interface (for example, in a status bar on a display interface, a notification bar, a Bluetooth management interface, or the leftmost screen), related information of the connected Bluetooth headset, such as a battery level, a wearing status, a service status, a connection status, a device name, a device model, a device icon, a connection identifier, and other connection information. The first BLE broadcast message may include one of a device name, a device type, a device model, a battery level, a wearing status, a connection status, a service status, or other working status information of the Bluetooth headset. The connection status information may indicate whether a physical connection has been established to the electronic device. The service status information may indicate whether the Bluetooth headset is currently in an idle state, or may indicate an audio service that is being processed by the Bluetooth headset. In addition, the first BLE broadcast message is periodically sent, and the Bluetooth application may update, in real time, related information of the connected Bluetooth headset displayed on the related interface in a virtual connection process based on the status information of the Bluetooth headset in the first BLE broadcast message that is obtained in real time.

In some embodiments, if the framework layer of the electronic device receives a first BLE broadcast message sent by the paired Bluetooth headset, it may indicate that the electronic device is near the paired Bluetooth headset and falls within a Bluetooth communication distance range of the Bluetooth headset. Therefore, it may be determined that a virtual connection to the Bluetooth headset is established.

In some other embodiments, after the electronic device performs response interaction (or handshake) with the Bluetooth headset by using a second BLE broadcast message or based on the SDP protocol, it may indicate that the electronic device has enabled a Bluetooth function and is near the Bluetooth headset, and may perform Bluetooth communication with the Bluetooth headset. Therefore, if the framework layer of the electronic device receives a first BLE broadcast message sent by the paired Bluetooth headset, it may be determined that a virtual connection to the Bluetooth headset is established.

In some other embodiments, after a physical connection is established to the Bluetooth headset, if the Bluetooth service at the framework layer of the electronic device receives physical connection release indication information that is sent by the Bluetooth headset, the framework layer does not immediately report the connection release information to the upper layer. If the electronic device receives the first BLE broadcast message within preset duration 1 (for example, 2 s), the electronic device establishes a virtual connection to the Bluetooth headset, so as to report a working status in the BLE broadcast message to the upper-layer Bluetooth application. The upper-layer Bluetooth application displays status information of the connected Bluetooth headset on a related interface based on the content. The physical connection may include an ACL connection or a low energy asynchronous connection link (low energy asynchronous connection link/ logical transport, LE ACL) connection. If the electronic device does not receive the first BLE broadcast message within the preset duration 1, a Bluetooth signal may be blocked or the electronic device may be taken away from the vicinity of the Bluetooth headset, and the framework layer determines to disconnect from the Bluetooth headset, and reports connection release information to the upper-layer Bluetooth application. The upper-layer Bluetooth application stops displaying the status information of the Bluetooth headset or displays information about disconnection from the Bluetooth headset based on the information reported by the framework layer.

It should be noted that, compared with an existing Bluetooth protocol, the Bluetooth protocol on which the embodiments of this application are based mainly modifies the Bluetooth service at an upper-layer framework layer, but basically does not change a lower-layer related protocol. Therefore, the Bluetooth protocol is easily compatible with an existing Bluetooth device.

Alternatively, the Bluetooth headset may have a Bluetooth protocol architecture similar to that shown in FIG. 4A and a software system architecture similar to that shown in FIG. 4B. A framework layer of the Bluetooth headset supports a service preemption function. For example, when the Bluetooth headset establishes a physical connection to an electronic device 1 and is processing an audio service 1 (for example, playing music) of the electronic device 1, if the Bluetooth headset receives connection request information of an electronic device 2, the framework layer may switch to establishing a physical connection to the electronic device 2, and process an audio service 2 (for example, receiving/ making a call) of the electronic device 2 based on the physical connection established after switching, to implement a service preemption function. In addition, the Bluetooth headset releases the physical connection between the Bluetooth headset and the electronic device 1, and switches from the physical connection to a virtual connection.

The existing Bluetooth service is adaptively modified at the framework layer, to implement the connection method provided in the embodiments of this application. In the Bluetooth protocol on which the embodiments of this application are based, the framework layer of the Bluetooth headset may indicate a bottom layer of the Bluetooth headset to send the first BLE broadcast message. In some embodiments, if the framework layer of the Bluetooth headset determines that the Bluetooth headset has been paired with an electronic device, the electronic device is a legal device, and the framework layer of the Bluetooth headset may determine that a virtual connection to the electronic device is established, and record the electronic device to which the virtual connection is established. In some other embodiments, after the Bluetooth headset is restarted or after the Bluetooth headset is put into the headset box and the headset box is reopened, if the Bluetooth headset has previously established a physical connection to an electronic device, the Bluetooth headset may initiate a reconnection to the electronic device based on historical connection information stored by the Bluetooth headset. After each reconnection, the framework layer of the Bluetooth headset may re-determine that an electronic device to be virtually connected is an electronic device that performs response interaction with the Bluetooth headset after this reconnection, or an electronic device that establishes a physical connection to the Bluetooth headset and then disconnects from the Bluetooth headset after this reconnection.

Similar to the adaptive modification at the framework layer, when adaptive modification is performed on the Bluetooth protocol at the native layer to implement the connection method provided in the embodiments of this application, after receiving physical connection release indication information that is sent by the Bluetooth headset, a host at the native layer of the electronic device may not immediately report the connection release information to the upper layer. If the electronic device receives a first BLE broadcast message within preset duration 1, the electronic device establishes a virtual connection to the Bluetooth headset, so as to report a working status in the BLE broadcast message to the upper-layer Bluetooth application. The upper-layer Bluetooth application displays status information of the connected Bluetooth headset on a related interface based on the content.

The following uses an example in which the wireless headset is a Bluetooth headset, electronic devices used by a user include a mobile phone 1, a tablet computer, and a mobile phone 2, and audio services of the mobile phone 1, the tablet computer, and the mobile phone 2 are processed by using the Bluetooth headset for description.

When the Bluetooth headset is being used, the Bluetooth headset may be paired with the mobile phone 1, the tablet computer, and the mobile phone 2. After pairing, the Bluetooth headset may establish virtual connections or physical connections to the mobile phone 1, the tablet computer, and the mobile phone 2.

During pairing, a shared link key (link key) may be created between two Bluetooth devices. The link key may be used to perform mutual authentication on the Bluetooth devices and encrypt exchanged data. For example, a pairing manner of the Bluetooth devices may include PIN code pairing (PIN code pairing) and secure simple pairing (secure simple pairing, SSP). The shared key may be used to subsequently perform re-authentication on the two Bluetooth devices. During reconnecting, the Bluetooth devices exchange characters derived from the link key to quickly verify whether there are matched link keys. If the link keys match, a session key may continue to be created to perform Bluetooth communication.

The connection method provided in the embodiments of this application may include a plurality of different implementations, which are separately described below.

Single-Physical-Connection Solution:

In some embodiments, the Bluetooth headset maintains a physical connection to one of the paired electronic devices, maintains virtual connections to the other paired electronic devices, and processes an audio service of the electronic device based on the physical connection. In addition, the Bluetooth headset may further switch the physical connection between the different electronic devices, and process an audio service of an electronic device currently physically connected to the Bluetooth headset. This solution may be referred to as a single-physical-connection solution.

For example, the Bluetooth headset may first be paired with the mobile phone 1 and establish a physical connection to the mobile phone 1. Then, the Bluetooth headset releases the physical connection between the Bluetooth headset and the mobile phone 1, and is paired with the tablet computer and establishes a physical connection to the tablet computer. Then, the Bluetooth headset releases the physical connection between the Bluetooth headset and the tablet computer, and is paired with the mobile phone 2 and establishes a physical connection to the mobile phone 2. At this moment, the Bluetooth headset establishes the physical connection to the mobile phone 2 that is finally paired.

Figure 5A:
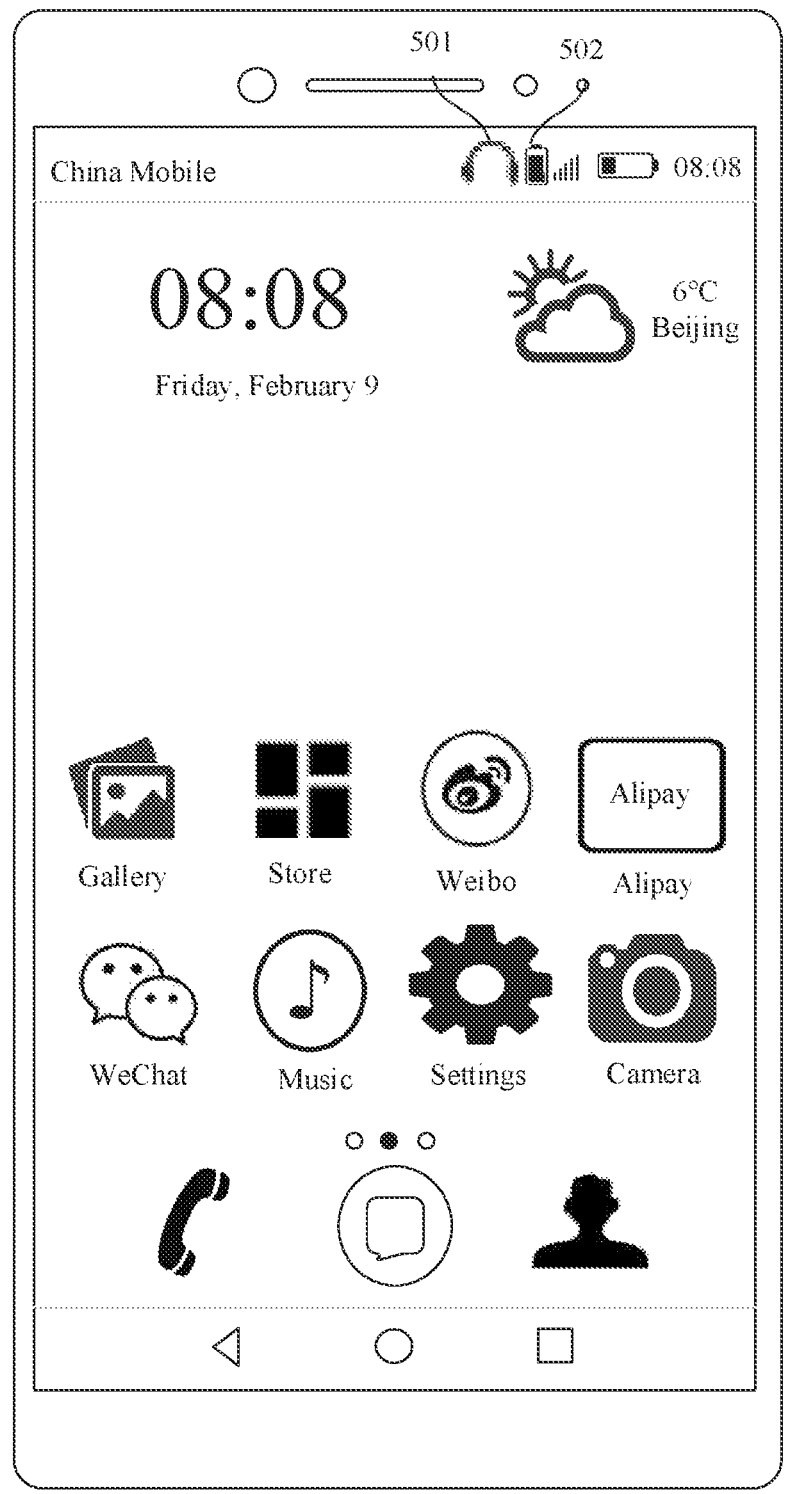
FIG. 5A to FIG. 5F are schematic diagrams of a group of interfaces according to an embodiment of this application.
Figure 5B:
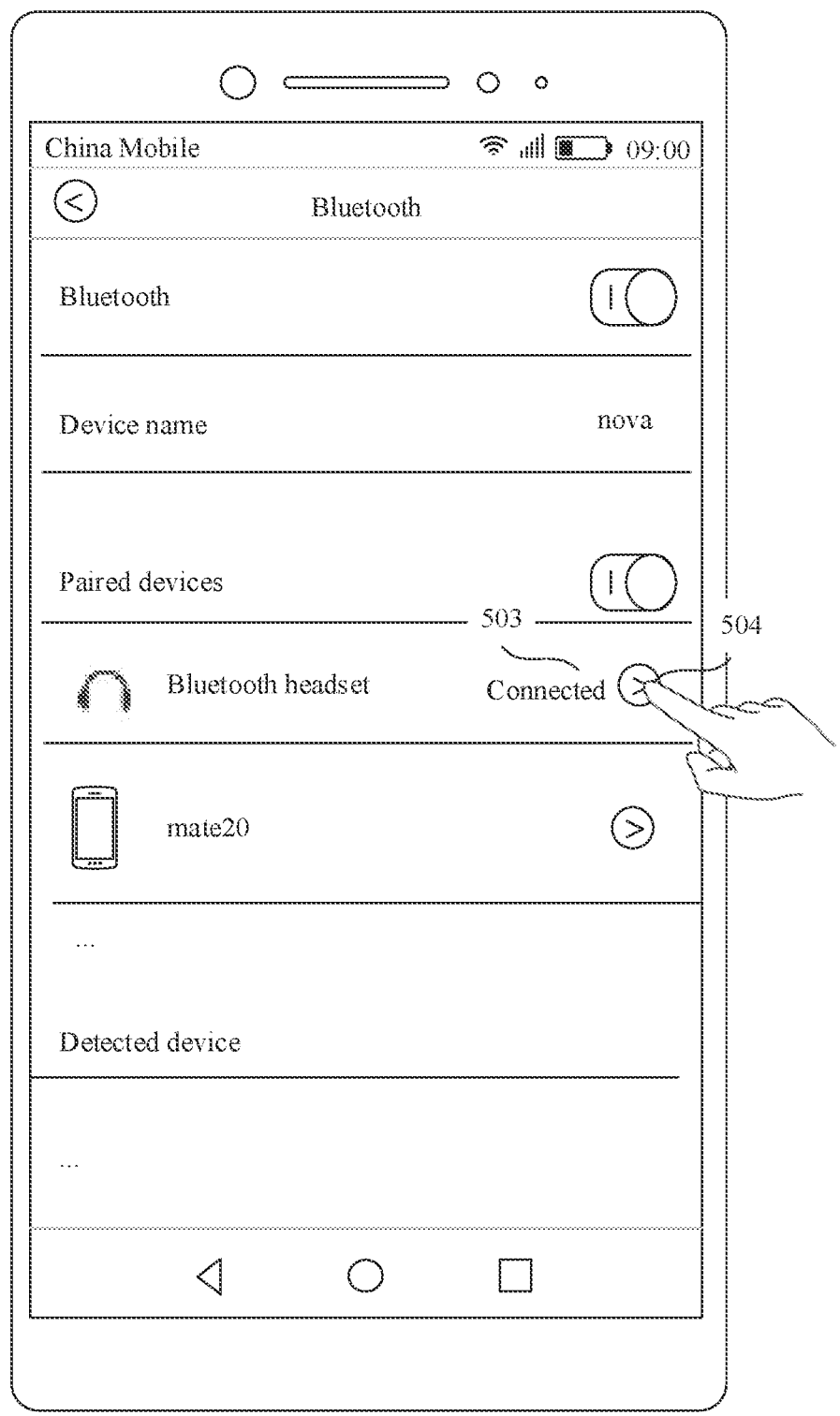
Figure 5C:
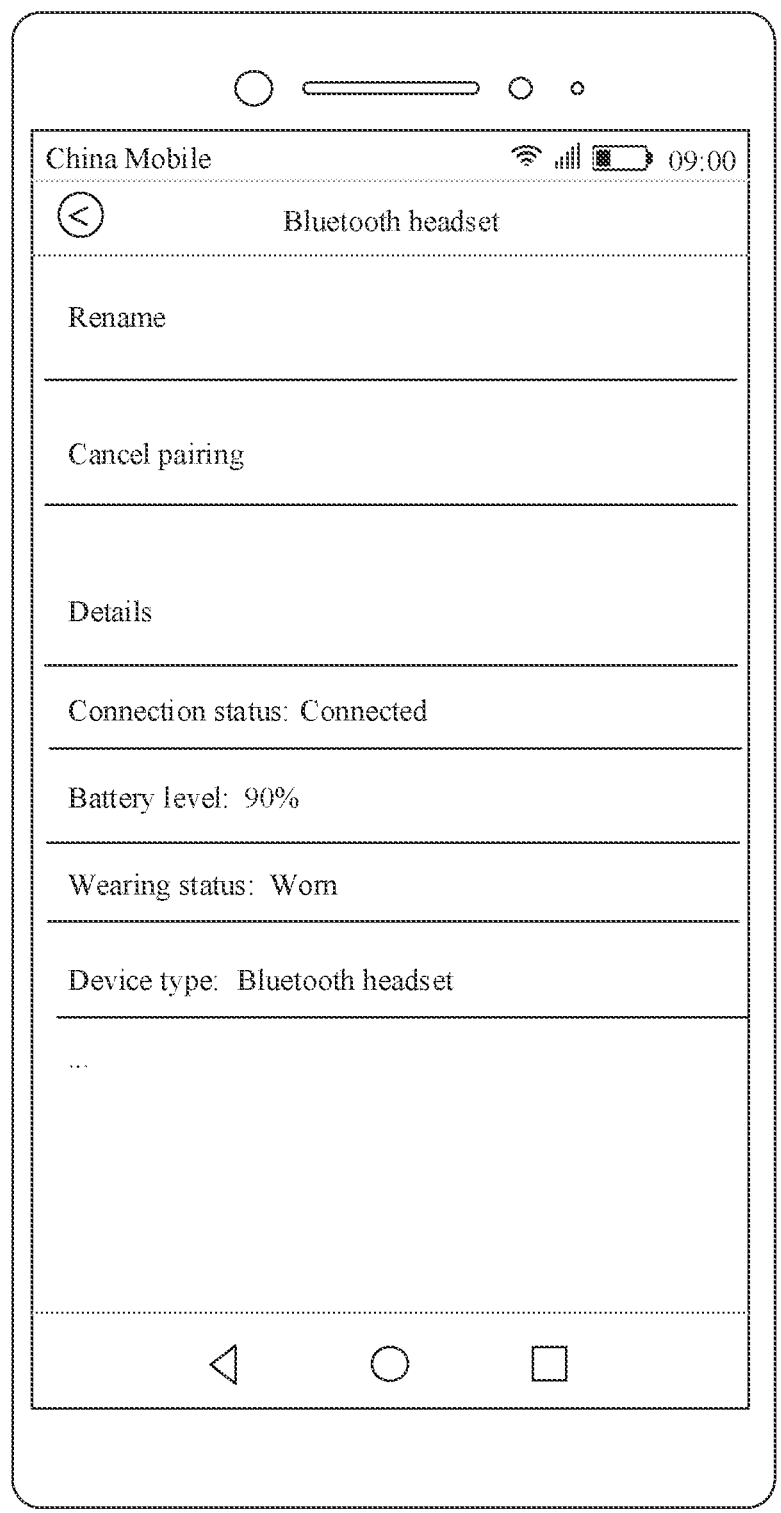

After establishing a physical connection to the Bluetooth headset, the electronic device may display status information of the connected Bluetooth headset. For example, the status information is the connection icon 501 and the battery level identifier 502 in the status bar shown in FIG. 5A, or the connection information 503 on the Bluetooth management interface shown in FIG. 5B. The Bluetooth application may display, on an interface of the mobile phone 2 (for example, nova), status information of the connected Bluetooth headset. In some embodiments, after the mobile phone 2 detects that the user taps the control 504, as shown in FIG. 5C, the Bluetooth application may further display, on an interface of the mobile phone 2, detailed information of the Bluetooth headset such as a battery level, a wearing status, a device type (for example, a Bluetooth headset or a Bluetooth sound box), and a device model.

It should be noted that if the Bluetooth headset is a TWS headset, a format of the first BLE broadcast message also supports the TWS headset. For example, the first BLE broadcast message may include a battery level, a wearing status, a connection status, a service status, or the like of the left earbud, and a battery level, a wearing status, a connection status, a service status, or the like of the right earbud.

Figure 5D:
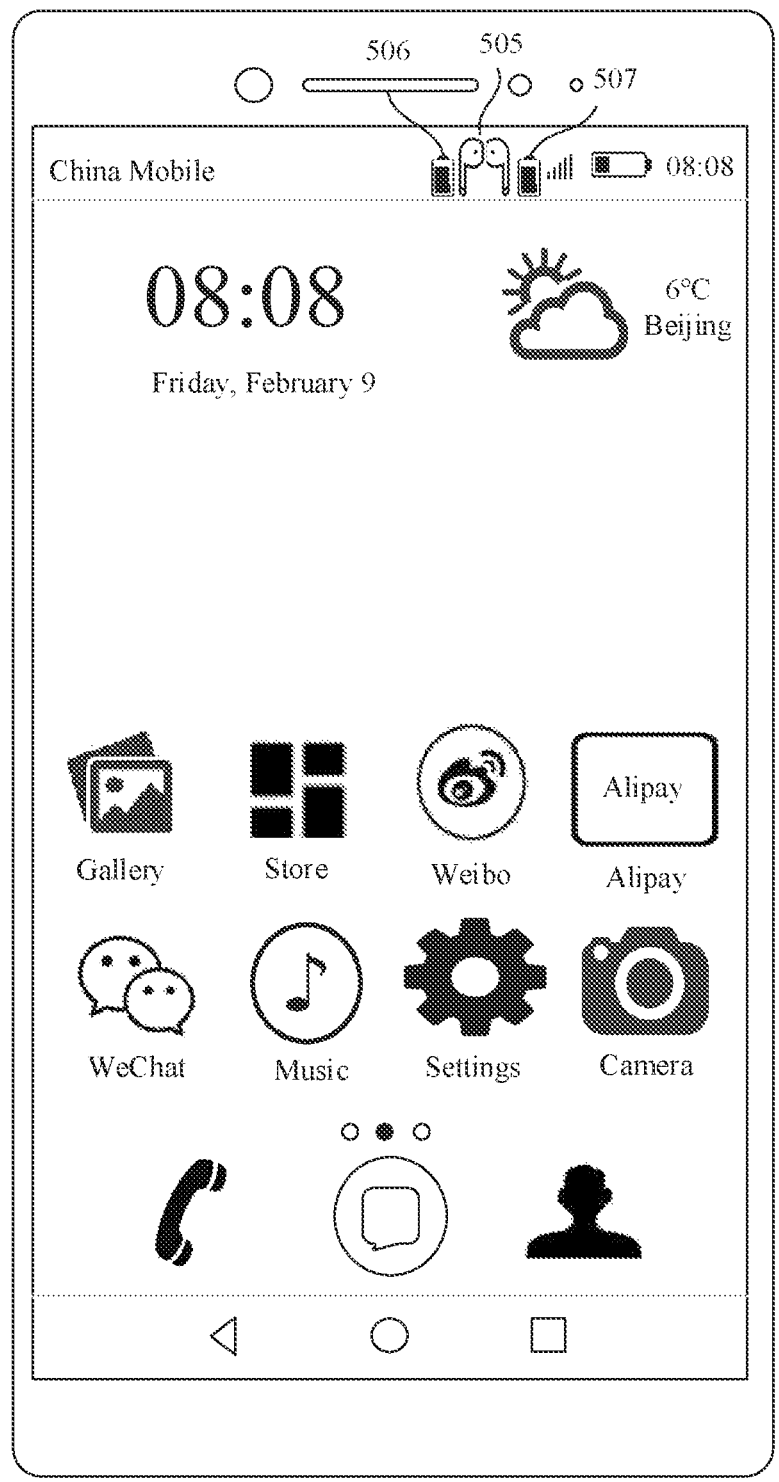
Figure 5E:
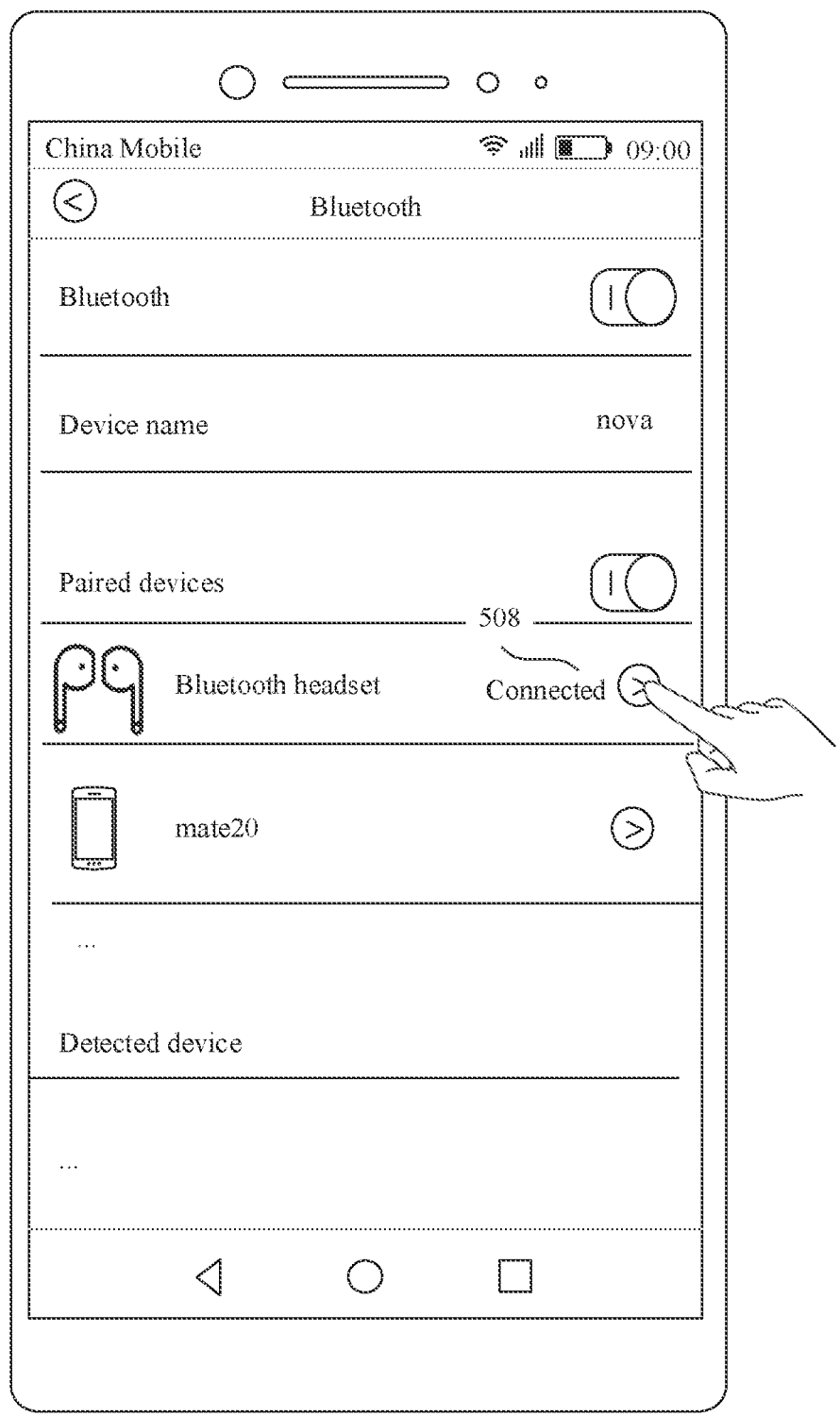
Figure 5F:
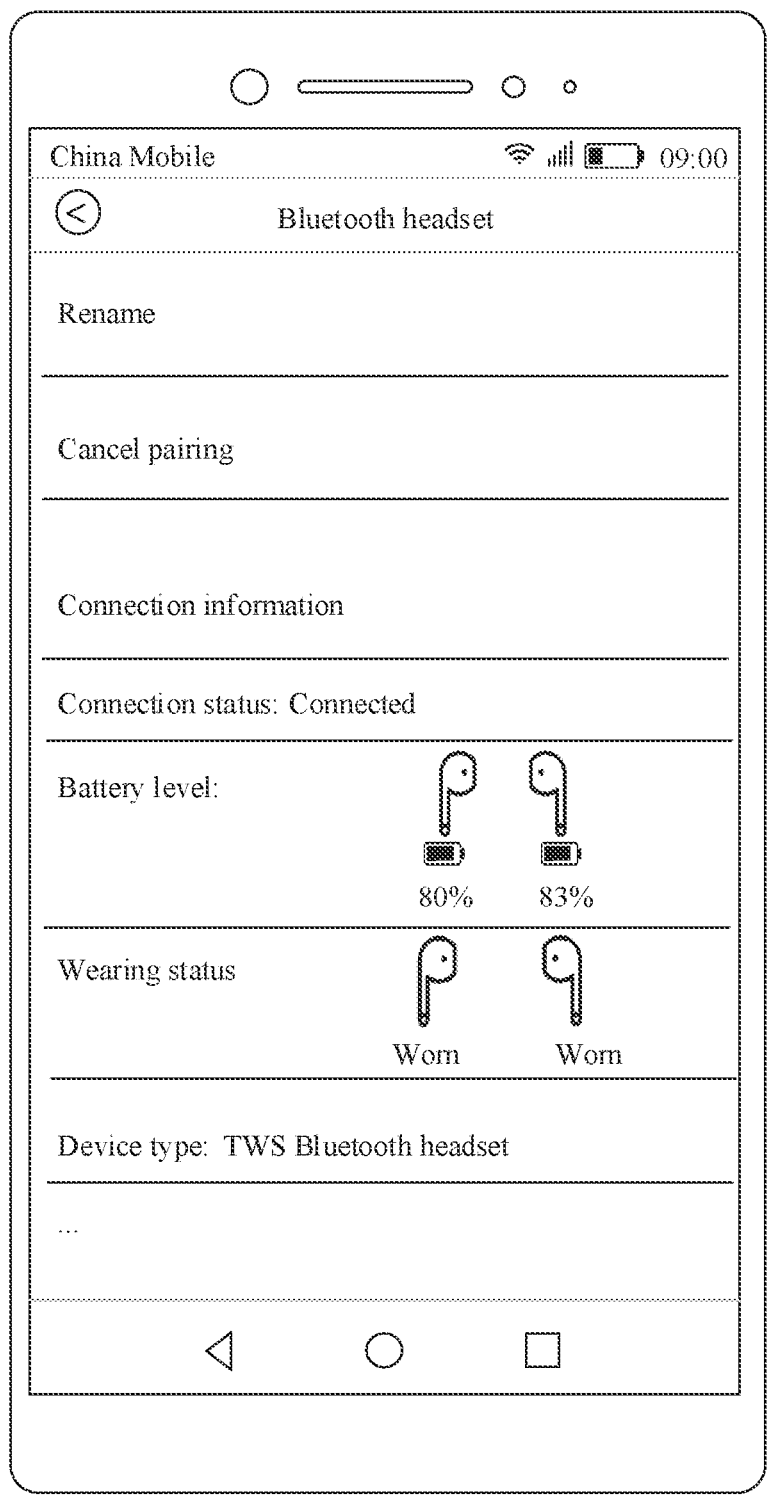

For example, when the Bluetooth headset is a TWS headset, the status information is the connection icon 505, the battery level identifier 506 of a left earbud, and the battery level identifier 507 of a right earbud in the status bar shown in FIG. 5D, or the connection information 508 on the Bluetooth management interface shown in FIG. 5E. The Bluetooth application may display, on an interface of the mobile phone 2 (for example, nova), status information of the connected Bluetooth headset. After the mobile phone 2 detects that the user taps the control 509, as shown in FIG. 5F, the Bluetooth application may further display detailed information of the Bluetooth headset on an interface of the mobile phone 2. In some embodiments, when the TWS headset is placed in the headset box, the Bluetooth application may further control the mobile phone 2 to display a battery level of the headset box on the interface.

In some embodiments, after the Bluetooth headset is powered on/the headset box is opened, the Bluetooth headset may periodically send a first BLE broadcast message according to a Bluetooth protocol, so that an electronic device that has been paired with the Bluetooth headset but currently has no physical connection to the Bluetooth headset may establish and maintain a virtual connection to the Bluetooth headset based on the BLE broadcast message. The Bluetooth protocol is the Bluetooth Low Energy (BLE) protocol, such as Bluetooth 4.0 or Bluetooth 5.0.

In some other embodiments, after the Bluetooth headset is powered on/the headset box is opened, if the Bluetooth headset has established physical connections to a plurality of electronic devices, in the single-physical-connection solution, only a physical connection between the Bluetooth headset and one electronic device is retained, and the other electronic devices need to maintain virtual connections to the Bluetooth headset. Therefore, the Bluetooth headset may periodically send the first BLE broadcast message according to the Bluetooth protocol, so that the other electronic devices can establish and maintain virtual connections to the Bluetooth headset based on the BLE broadcast message. For example, after being paired with the tablet computer and establishing a physical connection to the tablet computer, the Bluetooth headset determines that the Bluetooth headset established physical connections to the mobile phone 1 and the tablet computer before, and therefore may periodically send the first BLE broadcast message.

Figure 6A:
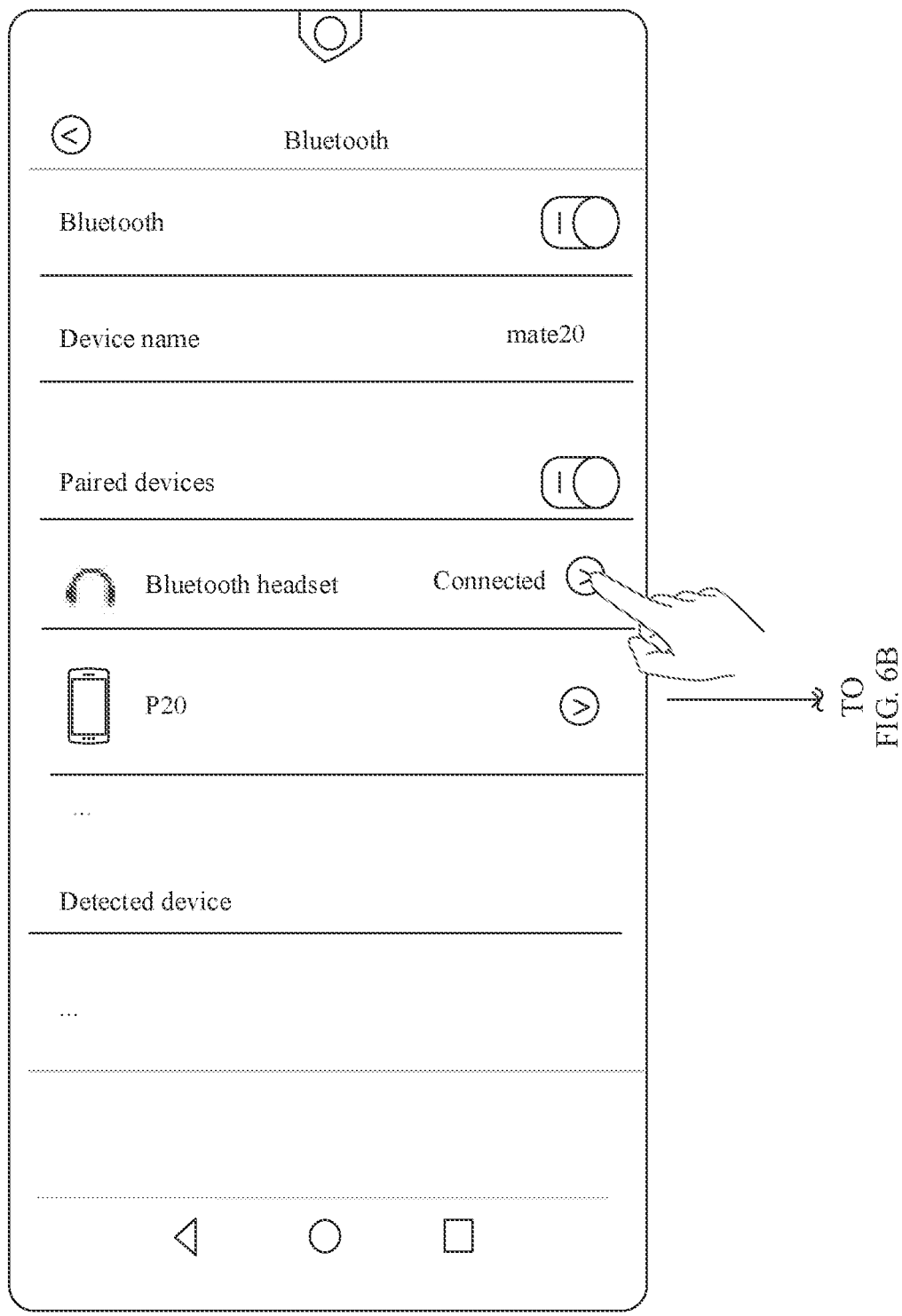
FIG. 6A to FIG. 6C are schematic diagrams of another group of interfaces according to an embodiment of this application.
Figure 6B:
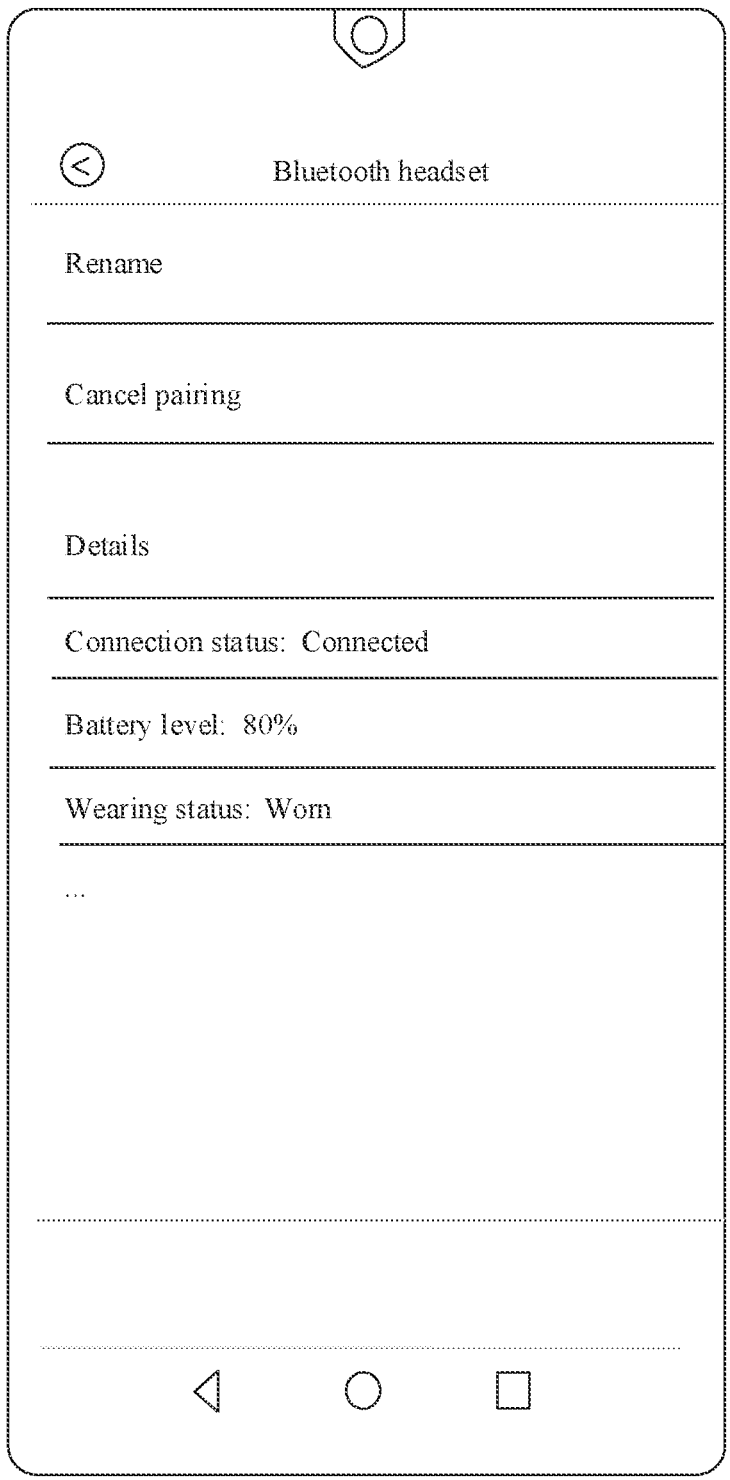
Figure 6C:
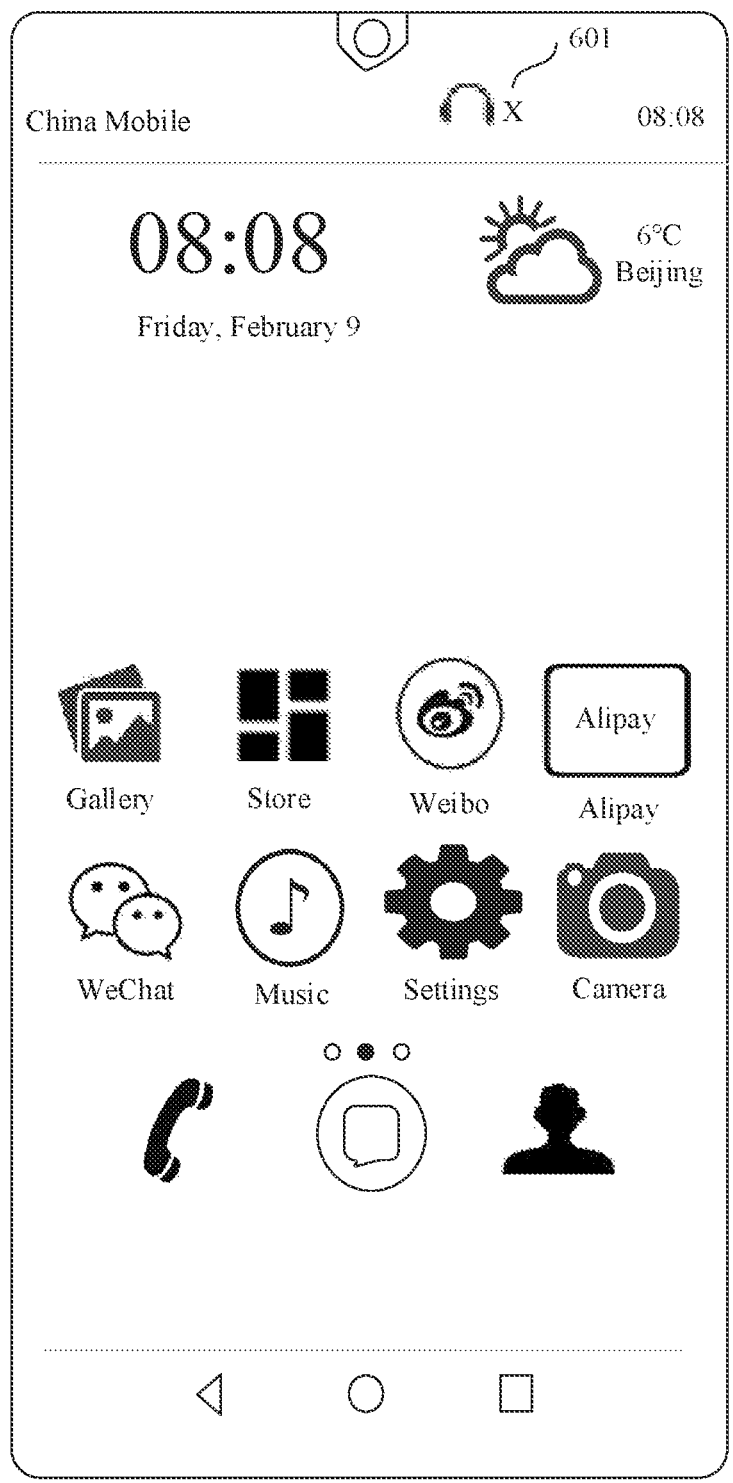

After releasing the physical connection between the Bluetooth headset and the mobile phone 1 and the physical connection between the Bluetooth headset and the tablet computer, the Bluetooth headset determines that virtual connections are established to the mobile phone 1 and the tablet computer. After receiving the first BLE broadcast message sent by the Bluetooth headset, the mobile phone 1 and the tablet computer that are physically disconnected from the Bluetooth headset determine to establish virtual connections to the Bluetooth headset. For example, as shown in FIG. 6A, the mobile phone 1 (for example, mate20) may display status information of the connected Bluetooth headset on an interface. As shown in FIG. 6B, the mobile phone 1 may display, on an interface, detailed information such as a battery level and a wearing status of the Bluetooth headset. In some embodiments, the mobile phone 1 may display identification information 1 on an interface, to indicate that a current wireless connection to the Bluetooth headset is a virtual connection. For example, the identification information 1 is an identifier 601 of a letter "X" on the interface shown in FIG. 6C.

In addition, the electronic device may update, in real time, related information of the connected Bluetooth headset on a related interface such as a Bluetooth management interface based on the status information of the Bluetooth headset in the periodically received first BLE broadcast message.

Figure 7A:
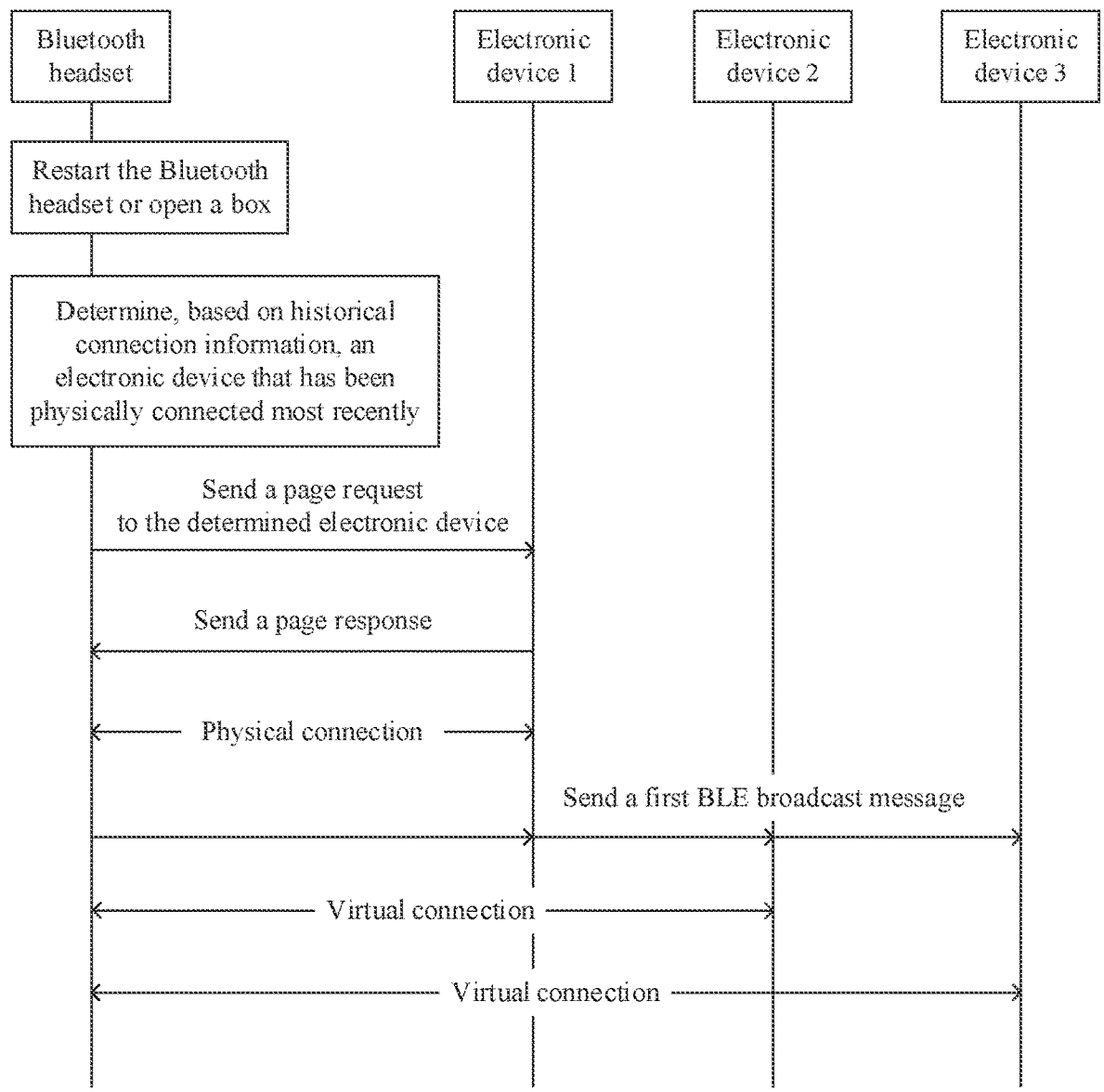
FIG. 7A to FIG. 7C are flowcharts of a group of connection methods according to an embodiment of this application.

When a reconnection triggering condition is met, for example, when the Bluetooth headset is restarted, or the Bluetooth headset is placed in the headset box and the box cover is closed and then opened again, or it is detected that the user taps a button on the Bluetooth headset or the headset box, in a solution, as shown in FIG. 7A, the Bluetooth headset may preferentially attempt to establish, based on stored historical connection information of electronic devices that have established physical connections to the Bluetooth headset before the current reconnection, a physical connection to an electronic device that has most recently established a physical connection to the Bluetooth headset, so as to establish a physical connection to one of the electronic devices. For example, before this reconnection, the Bluetooth headset successively established physical connections to the mobile phone 1, the tablet computer, and the mobile phone 2. In this reconnection process, the Bluetooth headset first attempts to establish a physical connection to the mobile phone 2. For example, the Bluetooth headset may send connection request information (for example, a page request message specified in the Bluetooth protocol) to the mobile phone 2. If the mobile phone 2 has enabled a Bluetooth function and is within a Bluetooth communication distance range, the mobile phone 2 may receive the connection request information, and may send connection response information (for example, a page response Page response message specified in the Bluetooth protocol) to the Bluetooth headset automatically or after detecting an operation of indicating a connection by the user. The Bluetooth headset can successfully establish a Bluetooth connection to the mobile phone 2. If a distance between the mobile phone 2 and the Bluetooth headset at this time is not within the Bluetooth communication distance range, or the Bluetooth function of the mobile phone 2 is not enabled, the Bluetooth headset cannot successfully establish the physical connection to the mobile phone 2. Then, the Bluetooth headset attempts to establish a physical connection to the tablet computer. If the physical connection fails, the Bluetooth headset attempts to establish a physical connection to the mobile phone 1.

In addition, the Bluetooth headset may send a first BLE broadcast message, and after receiving the first BLE broadcast message sent by the paired Bluetooth headset, another electronic device determines to establish a virtual connection to the Bluetooth headset.

Figure 7B:
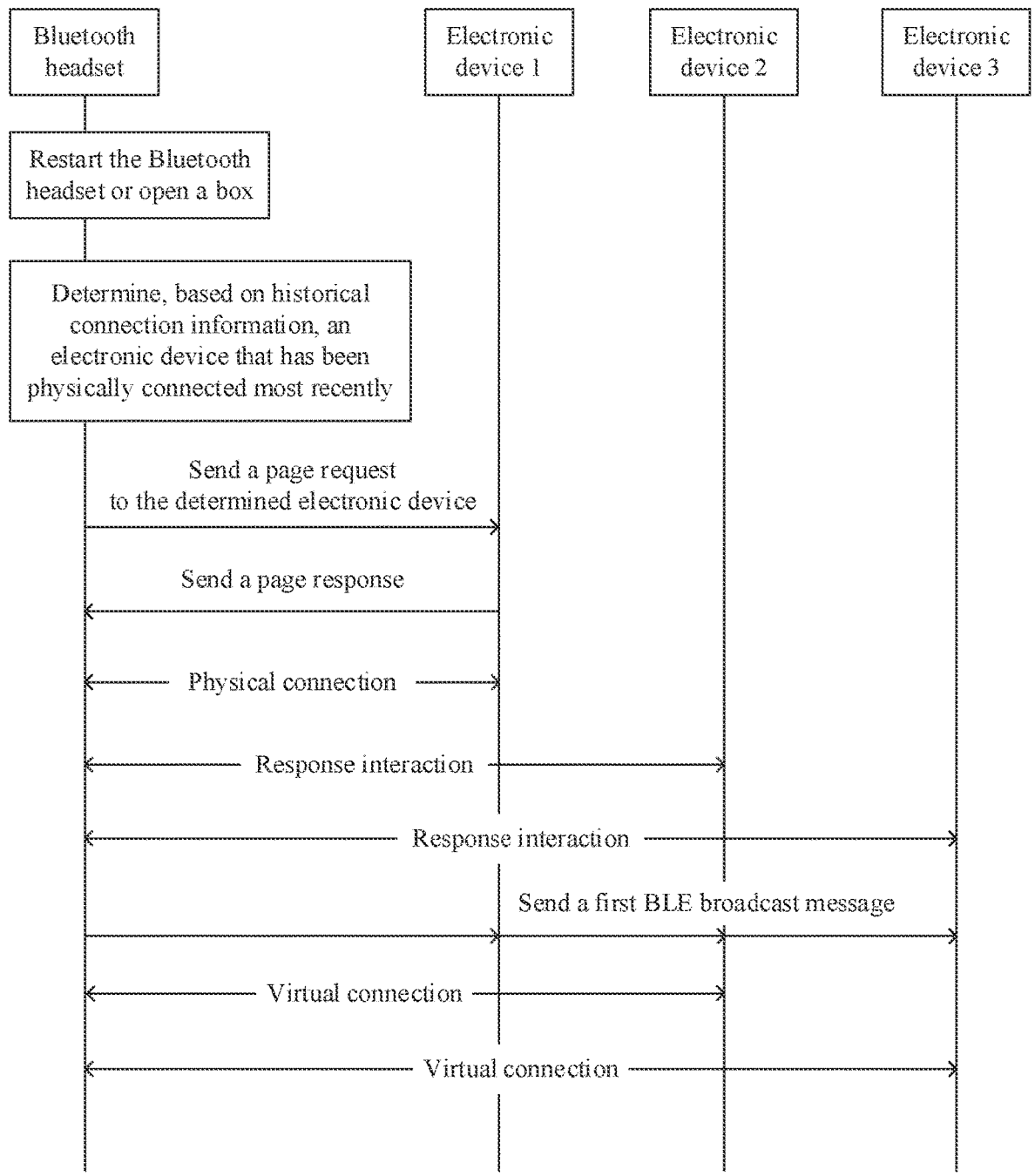

In another solution, as shown in FIG. 7B, the Bluetooth headset may preferentially attempt to establish, based on stored historical connection information of electronic devices that have established physical connections to the Bluetooth headset before the current reconnection, a physical connection to an electronic device that has most recently established a physical connection to the Bluetooth headset, so as to establish a physical connection to one of the electronic devices. After performing response interaction with another electronic device by using a second BLE broadcast message or based on the SDP protocol, the Bluetooth headset determines that a virtual connection is established to the another electronic device. For example, the Bluetooth headset sends information 1. After receiving the information 1, an electronic device returns response information to the Bluetooth headset. After receiving the second information, the Bluetooth headset completes response interaction. The electronic device performs response interaction with the Bluetooth headset by using the second BLE broadcast message or based on the SDP protocol, and after receiving the first BLE broadcast message sent by the Bluetooth headset, the electronic device determines that the virtual connection is established to the Bluetooth headset.

In still another solution, the Bluetooth headset may initiate a reconnection to an electronic device that has been physically connected before, to attempt to establish a physical connection again. For example, the Bluetooth headset may preferentially attempt to establish, based on stored historical connection information of electronic devices that have established physical connections to the Bluetooth headset before the current reconnection, a physical connection to an electronic device that has most recently established a physical connection to the Bluetooth headset. This solution is mainly used as an example for description in the following embodiments of this application.

For example, before this reconnection, the Bluetooth headset successively established physical connections to the mobile phone 1, the tablet computer, and the mobile phone 2. In this reconnection process, the Bluetooth headset first attempts to establish a physical connection to the mobile phone 2. If the mobile phone 2 is taken away from the vicinity of the Bluetooth headset, and a distance between the mobile phone 2 and the Bluetooth headset is not within the Bluetooth communication distance range, a Bluetooth signal is blocked, a Bluetooth function of the mobile phone 2 is not enabled, or the like, the Bluetooth headset cannot successfully establish a physical connection to the mobile phone 2. If the Bluetooth function of the mobile phone 2 is enabled, and the mobile phone 2 is within the Bluetooth communication distance range, the Bluetooth headset usually can successfully establish a Bluetooth connection to the mobile phone 2. Then, in the current reconnection process, the Bluetooth headset may attempt to establish a physical connection to the tablet computer. Then, the Bluetooth headset may attempt to establish a physical connection to the mobile phone 1.

In the current reconnection process, if the Bluetooth headset fails to establish a physical connection to an electronic device because a Bluetooth function of the electronic device is disabled, after the electronic device subsequently enables the Bluetooth function and receives a first BLE broadcast message sent by the paired Bluetooth headset, the electronic device may establish a virtual connection to the Bluetooth headset based on the first BLE broadcast message.

Then, for electronic devices that successfully establish physical connections in the current reconnection process, the Bluetooth headset may maintain a physical connection to one of the electronic devices according to a preset policy, and send physical connection release indication information (for example, a disconnect message specified in the Bluetooth protocol) to the other electronic device, so as to release the physical connection between the Bluetooth headset and the other electronic device, record related information of the other electronic device, and determine to establish a virtual connection to the other electronic device. The Bluetooth headset may further send a first BLE broadcast message. After receiving the first BLE broadcast message, the other electronic device that is physically disconnected from the Bluetooth headset determines that a virtual connection is established to the Bluetooth headset.

It should be noted that the electronic device that establishes a virtual connection to the Bluetooth headset is an electronic device that first successfully established a physical connection to the Bluetooth headset and then disconnected from the Bluetooth headset before this reconnection. The Bluetooth headset successfully established the physical connection, which may indicate that the electronic device has enabled a Bluetooth function, is within a Bluetooth communication range of the Bluetooth headset, and has a capability of performing Bluetooth communication with the Bluetooth headset. Therefore, the electronic device may establish a virtual connection to the Bluetooth headset, so that when there is a service processing requirement subsequently, the Bluetooth headset can switch, at any time, from the virtual connection to the physical connection to process the audio service.

That is, in the reconnection process, the Bluetooth headset attempts to establish a physical connection to the electronic device to determine whether the electronic device is near the Bluetooth headset and has a capability of performing Bluetooth communication with the Bluetooth headset, so as to determine whether the Bluetooth headset can establish a virtual connection to the electronic device. In this way, when there is a service processing requirement subsequently, the Bluetooth headset can switch from the virtual connection to the physical connection to perform service processing.

In some embodiments, the Bluetooth headset may record electronic devices that establish virtual connections to the Bluetooth headset after the reconnection is enabled this time. Subsequently, after receiving connection request information sent by the electronic devices, the Bluetooth headset may re-establish physical connections to the electronic devices.

For example, in a preset policy, the Bluetooth headset retains a physical connection to an electronic device that has most recently established a physical connection to the Bluetooth headset before the current reconnection, and releases physical connections between the Bluetooth headset and the other electronic devices.

Figure 7C:
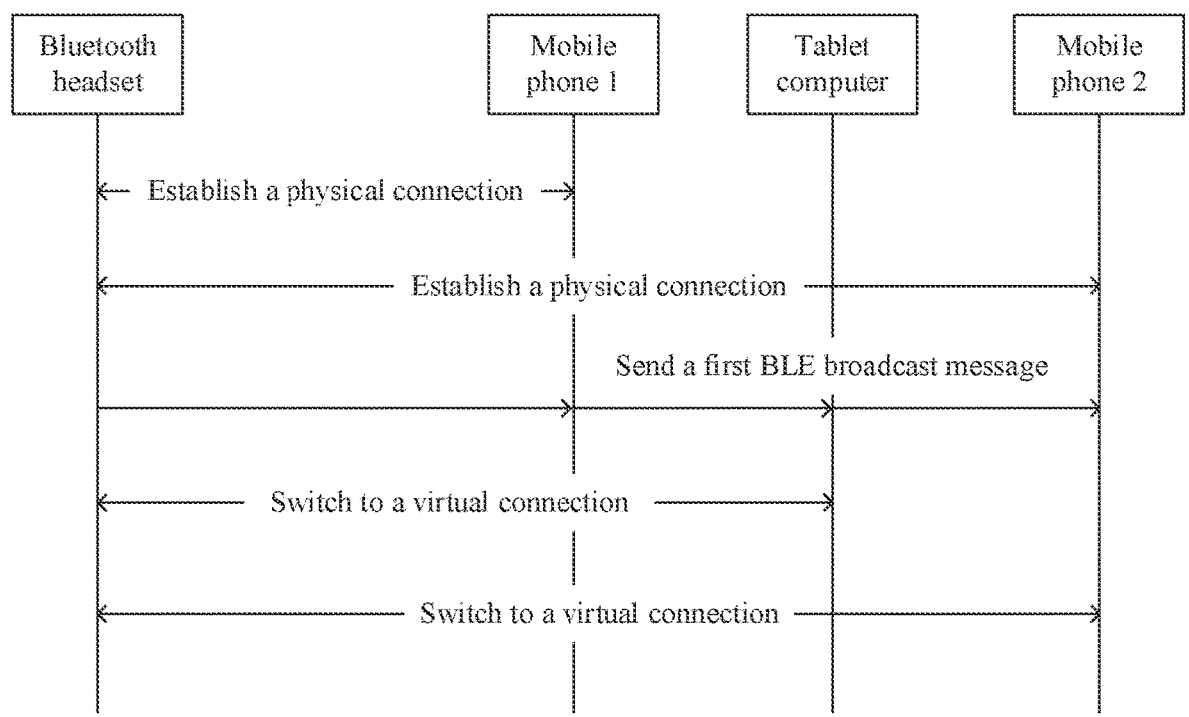
Figure 7D:
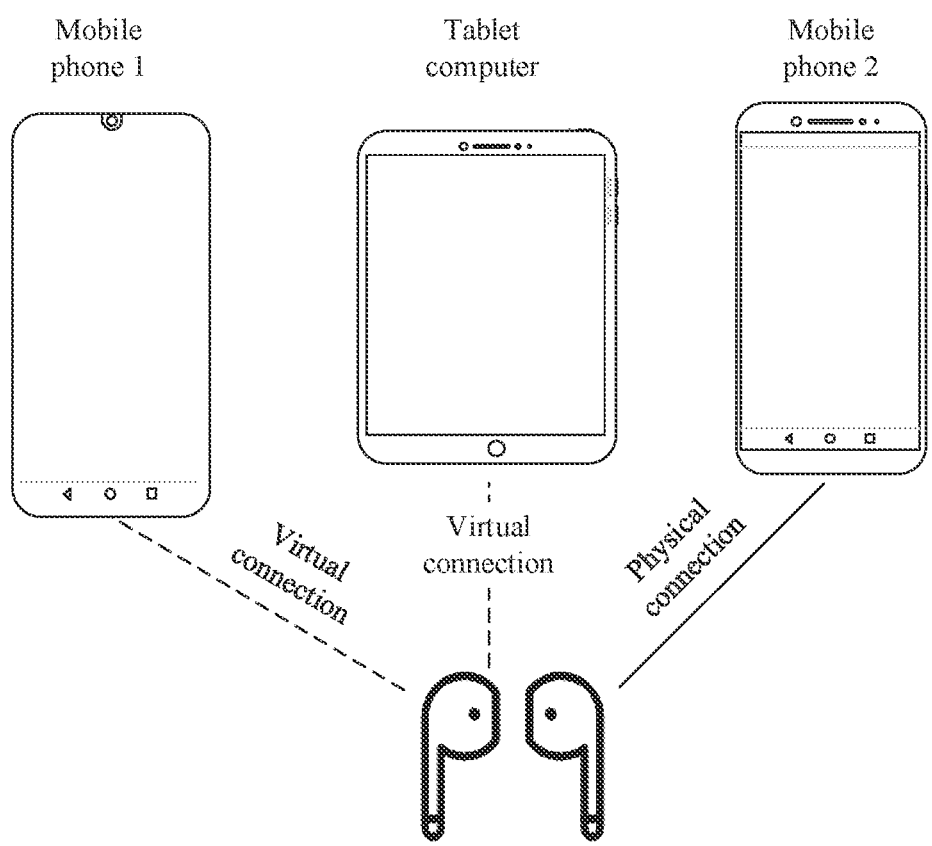
FIG. 7D is a schematic diagram of a wireless connection according to an embodiment of this application.

For example, before this reconnection, the Bluetooth headset last established a physical connection to the mobile phone 2. As shown in FIG. 7C and FIG. 7D, after the Bluetooth headset attempts to establish physical connections to the mobile phone 1, the tablet computer, and the mobile phone 2 in this reconnection process, the Bluetooth headset retains the physical connection between the Bluetooth headset and mobile phone 2. The mobile phone 1 and the tablet computer establish virtual connections to the Bluetooth headset based on the first BLE broadcast message sent by the Bluetooth headset. For example, in the case shown in FIG. 7D, for a wireless connection list on the Bluetooth headset side, refer to Table 1.

TABLE 1

| Electronic device | Wireless connection |
|---|---|
| Mobile phone 1 | Virtual connection |
| Tablet computer | Virtual connection |
| Mobile phone 2 | Physical connection |

In some embodiments, each time reconnection is enabled, the Bluetooth headset generates a sequence number corresponding to the current reconnection, and the first BLE broadcast message sent by the Bluetooth headset may carry the sequence number. The electronic device may determine, based on the sequence number, whether the Bluetooth headset initiates reconnection again. For example, the Bluetooth headset establishes a physical connection to the mobile phone 1 in a reconnection process, and the mobile phone 1 records a sequence number 1 that is sent by the Bluetooth headset and that is corresponding to the current reconnection. After the Bluetooth headset is physically disconnected from the mobile phone 1, the Bluetooth headset sends a first BLE broadcast message. In this case, the first BLE broadcast message carries the sequence number 1. Based on the sequence number 1, the mobile phone 1 may determine that the mobile phone 1 and the Bluetooth headset correspond to the current reconnection process, and no other reconnection occurs, and the mobile phone 1 may establish a virtual connection to the Bluetooth headset.

In the cases shown in FIG. 7C and FIG. 7D, if the mobile phone 1 (or the tablet computer) cannot receive the first BLE broadcast message sent by the Bluetooth headset due to reasons such as being taken away from the vicinity of the Bluetooth headset, when duration in which the mobile phone 1 does not receive the first BLE broadcast message is greater than or equal to a preset value 1, the mobile phone 1 releases the virtual connection between the mobile phone 1 and the Bluetooth headset, and stops displaying related information about being connected to the Bluetooth headset. After the mobile phone 1 is brought back to the vicinity of the Bluetooth headset or other reasons are eliminated, if the mobile phone 1 receives again the first BLE broadcast message sent by the Bluetooth headset, the mobile phone 1 may determine whether a sequence number in the first BLE broadcast message matches a sequence number in a previously received first BLE broadcast message, to determine whether the Bluetooth headset initiates reconnection again. If the serial numbers match, reconnection does not occur again, and the mobile phone 1 may establish a virtual connection to the Bluetooth headset, and display related information about being connected to the Bluetooth headset.

If the mobile phone 2 is physically disconnected from the Bluetooth headset due to a reason such as being taken away from the vicinity of the Bluetooth headset, the mobile phone 2 stops displaying related information about being connected to the Bluetooth headset. After the mobile phone 2 is brought back to the vicinity of the Bluetooth headset or other reasons are eliminated, after receiving the first BLE broadcast message sent by the Bluetooth headset, the mobile phone 2 establishes a virtual connection to the Bluetooth headset if it is determined, based on a sequence number, that no other reconnection occurs, and displays related information about being connected to the Bluetooth headset. If a device priority of the mobile phone 2 is higher than that of the mobile phone 1 and that of the tablet computer, and the Bluetooth headset currently does not process an audio service, the Bluetooth headset may establish a physical connection to the mobile phone 2, and maintain virtual connections between the Bluetooth headset and the mobile phone 1 and the tablet computer.

In the first BLE broadcast message sent by the Bluetooth headset, service status information may be used to indicate whether the Bluetooth headset is currently in an idle state (that is, whether the Bluetooth headset is currently idle) and indicate a type of an audio service currently being processed by the Bluetooth headset in a non-idle state. The idle state means that the Bluetooth headset currently does not process an audio service. The electronic device may determine a current service status of the Bluetooth headset based on the first BLE broadcast message.

Figure 8:
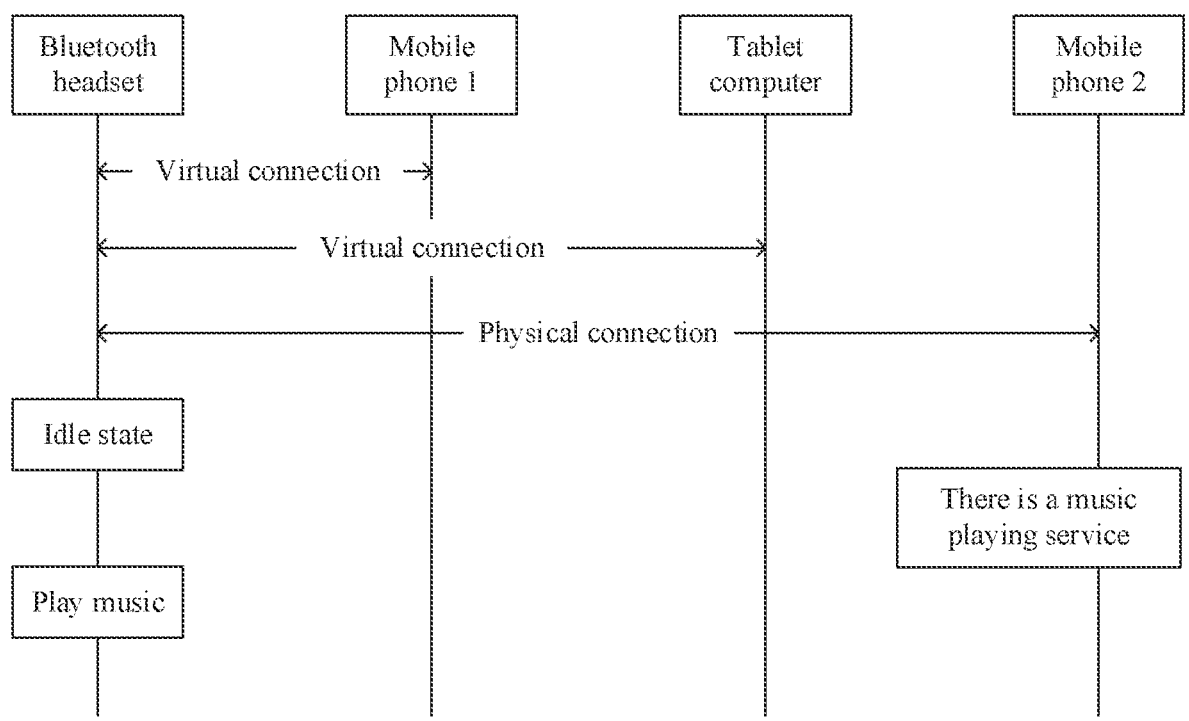
FIG. 8 is a flowchart of a service processing method according to an embodiment of this application.

In the case shown in FIG. 7D, the Bluetooth headset remains physically connected to the mobile phone 2. When the Bluetooth headset is in an idle state, if the mobile phone 2 has an audio service, the Bluetooth headset may process the audio service of the mobile phone 2 based on the physical connection. For example, in the case shown in FIG. 7D, if the Bluetooth headset is in an idle state, when the mobile phone 2 has a music playing service, refer to FIG. 8 for a corresponding processing procedure.

In the case shown in FIG. 7D, the Bluetooth headset remains physically connected to the mobile phone 2. If the mobile phone 1/tablet computer has an audio service, the Bluetooth headset may release the physical connection between the Bluetooth headset and the mobile phone 2, and establish a physical connection to the mobile phone 1/tablet computer, so as to process the audio service of the mobile phone 1/tablet computer based on the established physical connection. In some embodiments, if the Bluetooth headset fails to establish a physical connection to the mobile phone 1/tablet computer due to some reasons, the Bluetooth headset may re-establish a physical connection to the mobile phone 2.

Figure 9A:
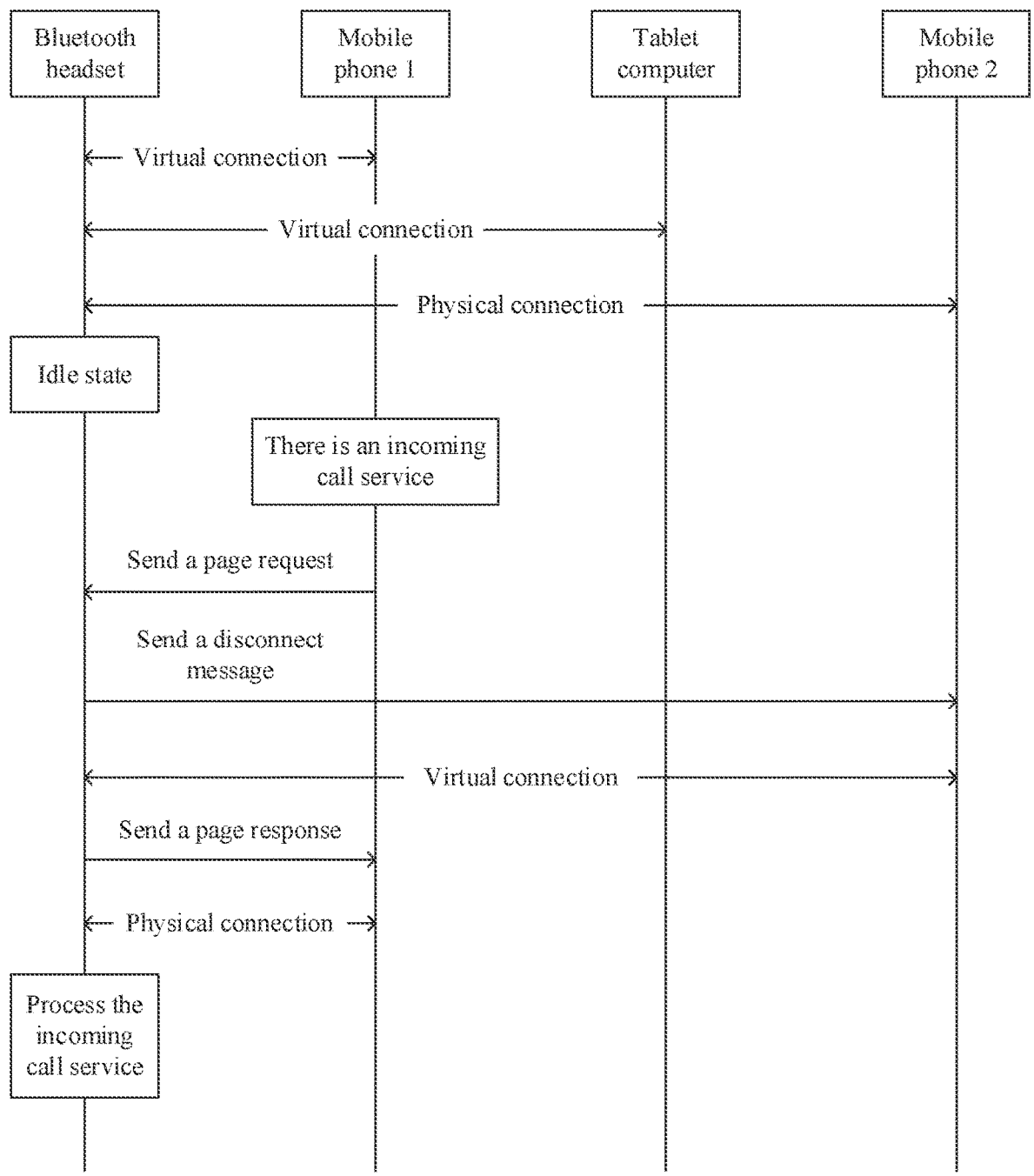
FIG. 9A and FIG. 9B are flowcharts of a group of service processing methods according to an embodiment of this application.

Refer to FIG. 9A. For example, if the mobile phone 1 has an audio service 1, and the mobile phone 1 determines, based on the first BLE broadcast message, that the Bluetooth headset is currently in an idle state, the mobile phone 1 may send connection request information to the Bluetooth headset, to request to establish a physical connection. For example, the connection request information may be a page request message specified in the Bluetooth protocol. After receiving the connection request information sent by the mobile phone 1, the Bluetooth headset determines that a physical connection was established to the mobile phone 1 after the current reconnection was enabled. The mobile phone 1 is in a virtual connection list, and the Bluetooth headset may establish a physical connection to the mobile phone 1, so as to process the audio service of the mobile phone 1 based on the physical connection. The Bluetooth headset releases the physical connection between the Bluetooth headset and the mobile phone 2. For example, after the physical connection between the mobile phone 1 and the Bluetooth headset is established, the mobile phone 1 may send an audio service processing request to the Bluetooth headset, and after receiving the audio service processing request, the Bluetooth headset processes the audio service.

When switching between physical connections to different electronic devices, the Bluetooth headset may first release the physical connection between the Bluetooth headset and the electronic device 1, and then establish the physical connection to the electronic device 2. Alternatively, the Bluetooth headset may first establish the physical connection to the electronic device 2, to process the audio service of the electronic device 2 as soon as possible, thereby reducing a processing delay, and then the Bluetooth headset releases the physical connection between the Bluetooth headset and the electronic device 1.

Figure 9B:
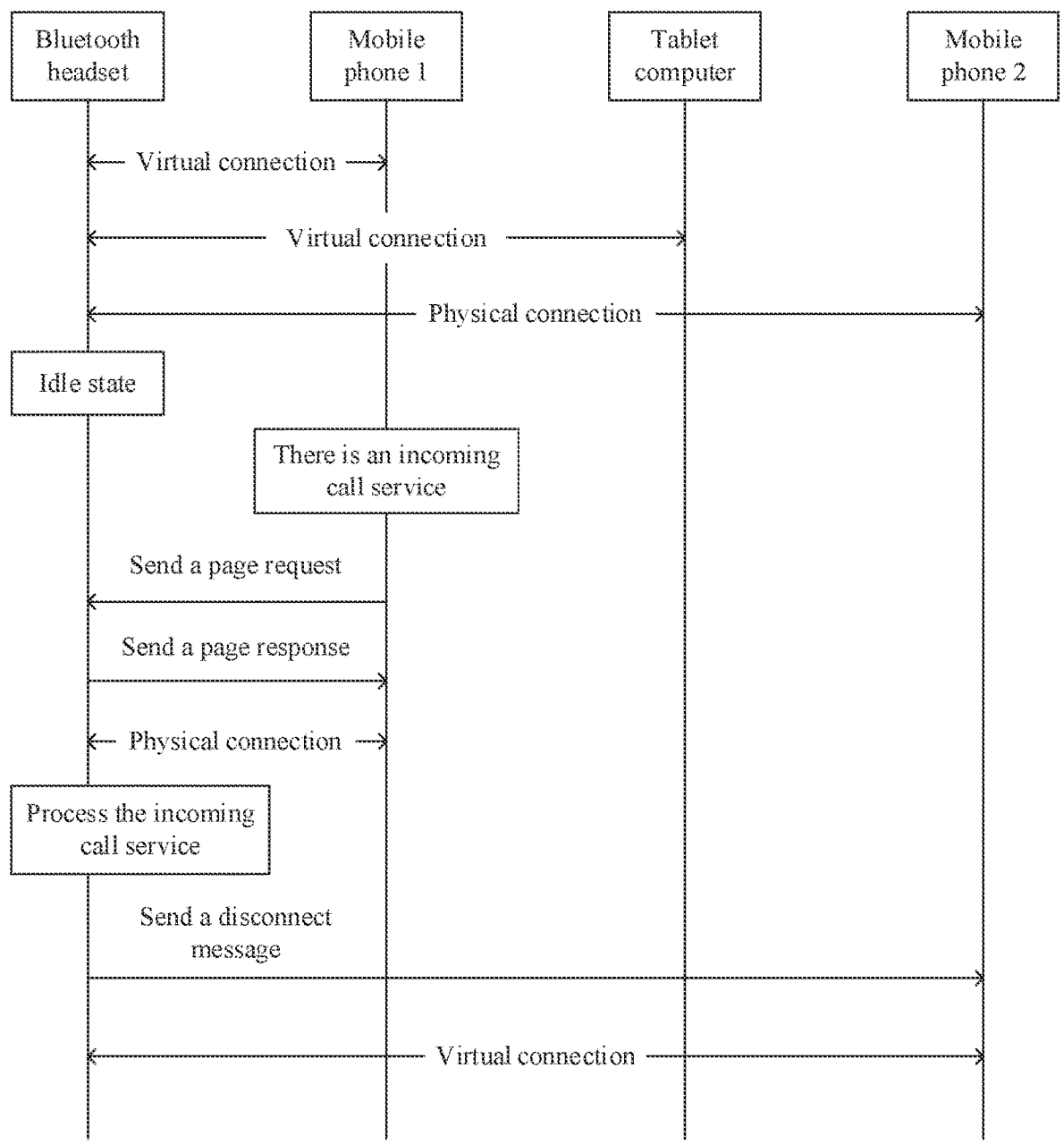

For example, in the case shown in FIG. 9A, after the Bluetooth headset receives the connection request information sent by the mobile phone 1, in some embodiments, as shown in FIG. 9A, the Bluetooth headset may first establish the physical connection to the mobile phone 1, and then release the physical connection between the Bluetooth headset and the mobile phone 2. In some other embodiments, as shown in FIG. 9B, the Bluetooth headset may first release the physical connection between the Bluetooth headset and the mobile phone 2, and then establish the physical connection to the mobile phone 1. For example, after receiving the connection request information sent by the mobile phone 1, the Bluetooth headset may send connection response information (for example, a page response message specified in the Bluetooth protocol) to the mobile phone 1, to establish the physical connection to the mobile phone 1. The Bluetooth headset may send physical connection release indication information (for example, a disconnect message specified in the Bluetooth protocol) to the mobile phone 2, to release the physical connection between the Bluetooth headset and the mobile phone 2.

After the Bluetooth headset establishes the physical connection to the mobile phone 1, if the audio service of the mobile phone 1 is a call service, a synchronous connection-oriented (synchronous connection-oriented, SCO) may be further established between the Bluetooth headset and the mobile phone 1, so that the call service of mobile phone 1 is processed based on the previously established ACL connection and the SCO connection.

Service Priority Solution:

In some embodiments, different audio services of an electronic device may correspond to different priorities, and an audio service with a higher priority may be preferentially processed by the Bluetooth headset. This solution may be referred to as a service priority solution. For example, a priority of a call service may be higher than a priority of a media service.

In some technical solutions, priority arbitration of an audio service is performed on an electronic device side. When an electronic device has an audio service, the electronic device may determine, based on a service status in a first BLE broadcast message sent by the Bluetooth headset, a priority relationship between an audio service 1 currently being processed by the Bluetooth headset and the current audio service 2 of the electronic device, so as to determine whether to request the Bluetooth headset to preferentially process the current audio service 2 of the electronic device.

Figure 10A:
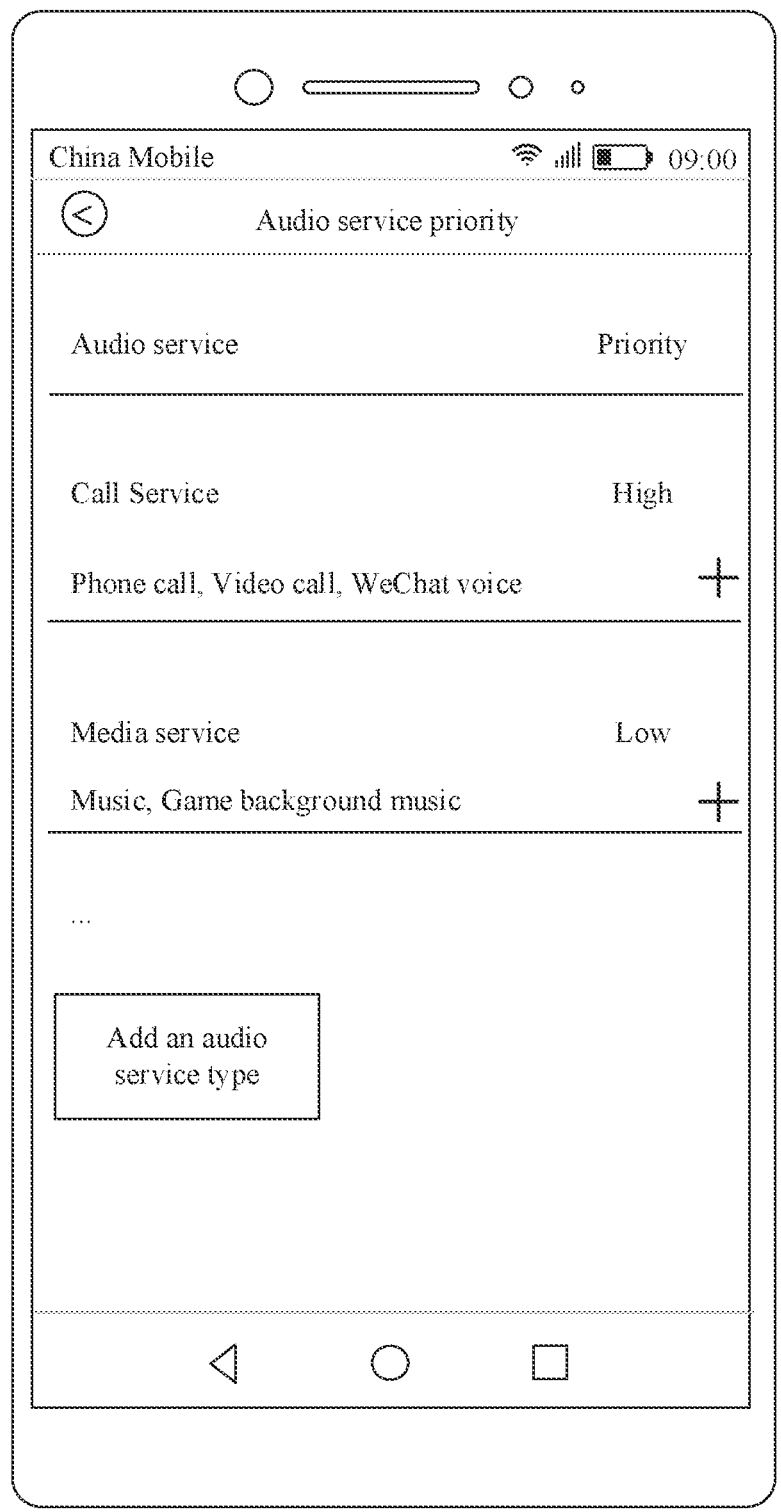
FIG. 10A and FIG. 10B are schematic diagrams of another group of interfaces according to an embodiment of this application.
Figure 10B:
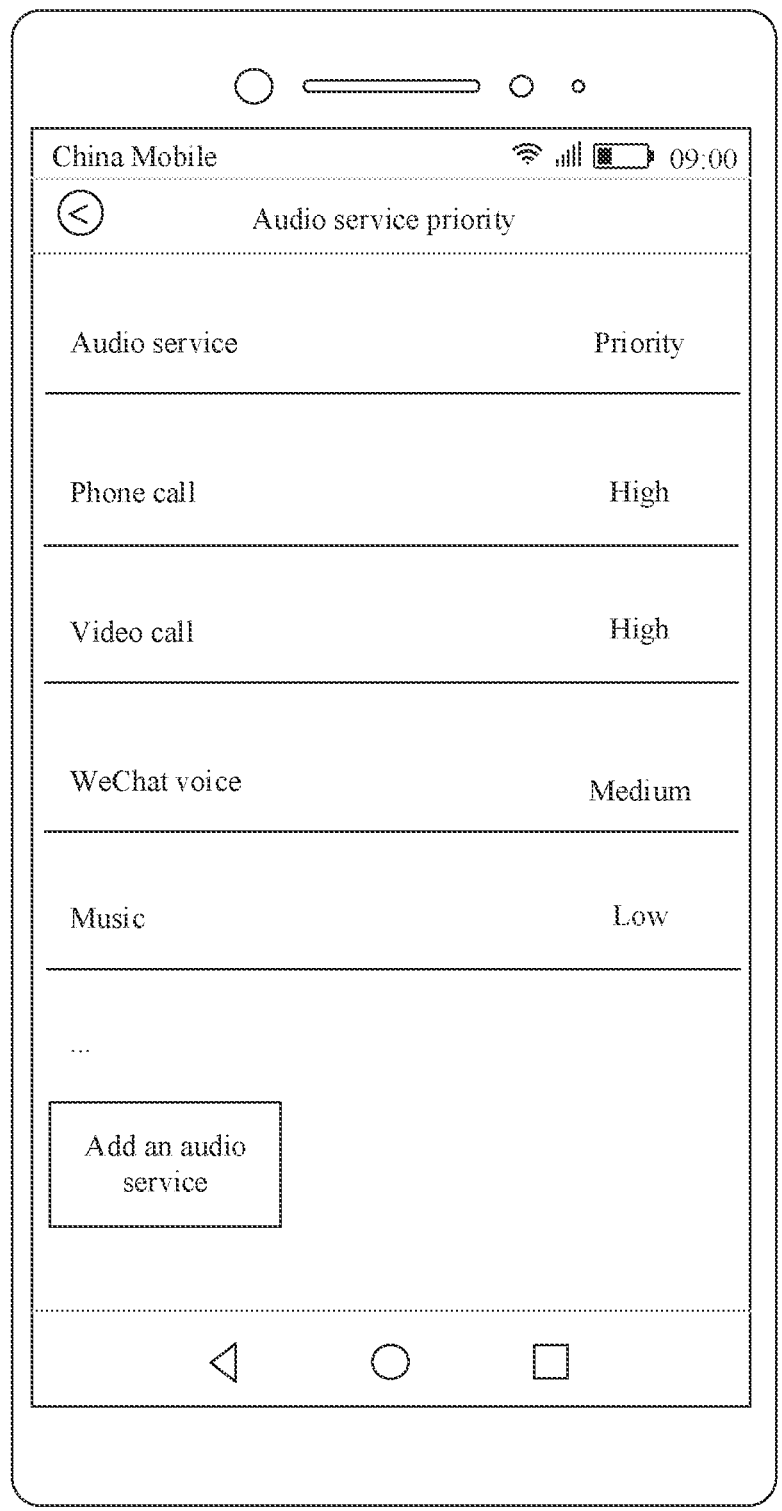

A priority of an audio service may be preset, or may be actively set by the user. For example, as shown in FIG. 10A or FIG. 10B, the electronic device may display a service priority setting interface, and the user may set service priorities corresponding to different audio services. For example, a priority of a call service such as a phone call or a video call is higher than a priority of a media service such as music playing. For another example, a priority of a phone call is higher than that of a video call, and the priority of a video call is higher than that of music playing. For another example, a microphone of the electronic device may receive a voice indication of a user, and the user may set a priority of an audio service through a voice.

Figure 11:
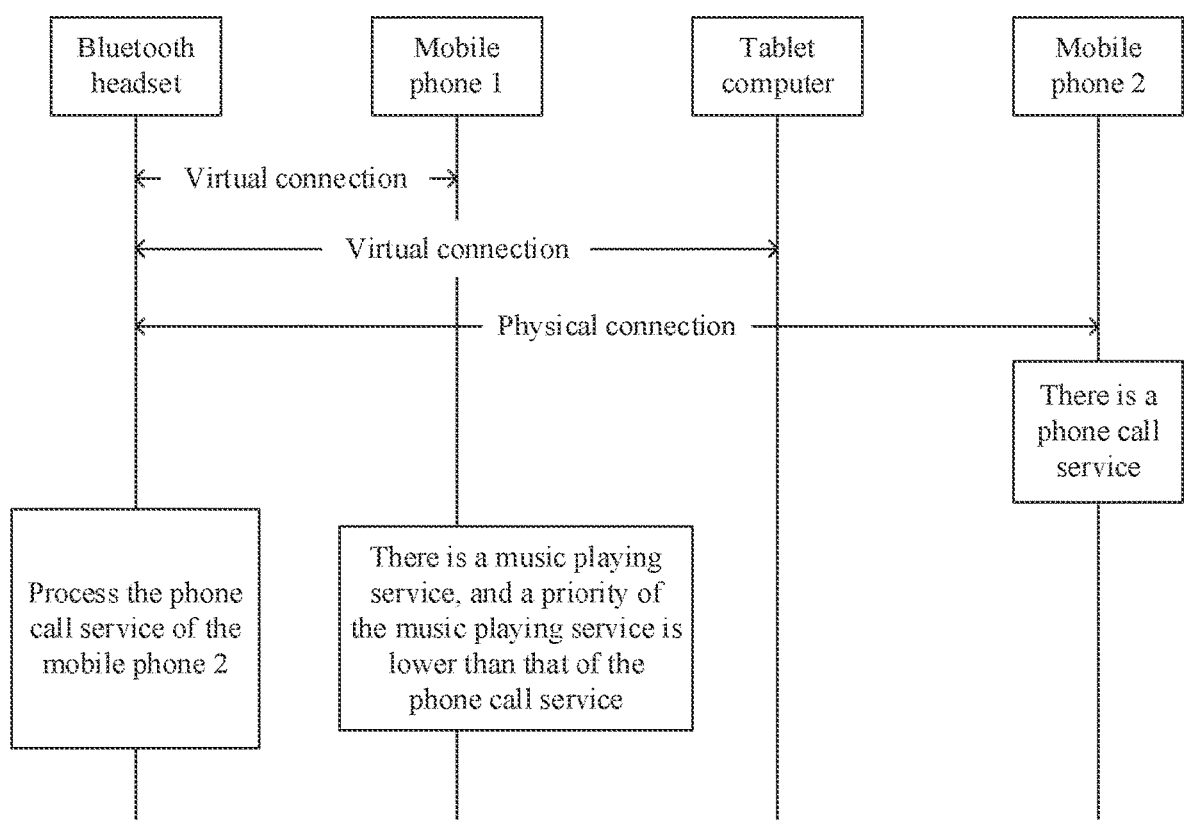
FIG. 11 is a flowchart of another service processing method according to an embodiment of this application.

In the case shown in FIG. 7D, the mobile phone 1 has an audio service 1, and the mobile phone 1 determines, based on a first BLE broadcast message, that the Bluetooth headset is currently processing an audio service 2 of the mobile phone 2. If the mobile phone 1 determines that a priority of the audio service 1 is lower than a priority of the audio service 2, the Bluetooth headset continues to process the audio service 2 of the mobile phone 2. For example, if the audio service 1 is a music playing service, and the audio service 2 is a phone call service, refer to FIG. 11 for a corresponding processing procedure.

Figure 12:
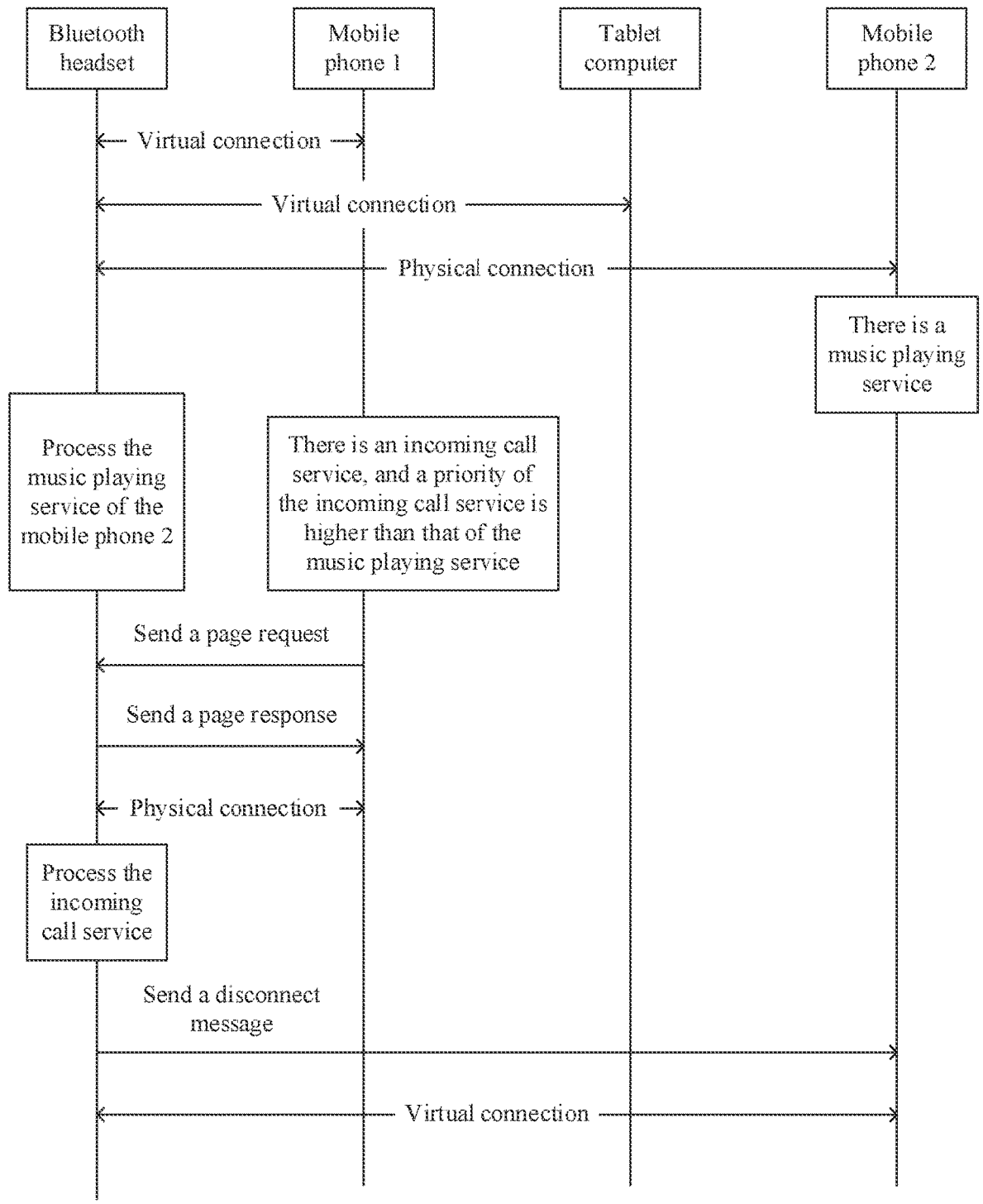
FIG. 12 is a flowchart of another service processing method according to an embodiment of this application.

Alternatively, if the mobile phone 1 determines that the priority of the audio service 1 is higher than the priority of the audio service 2, the mobile phone 1 sends connection request information to the Bluetooth headset, to request to establish a physical connection. After establishing the physical connection to the mobile phone 1, the Bluetooth headset processes the audio service 1 of the mobile phone 1 based on the physical connection. For example, if the audio service 1 is a phone call service, and the audio service 2 is a music playing service, refer to FIG. 12 for a corresponding processing procedure.

In some embodiments, in the case shown in FIG. 7D, if the Bluetooth headset is processing an audio service 1 of an electronic device and the electronic device has an audio service 2, in one case, the Bluetooth headset continues to process the audio service 1 but does not process the audio service 2. In another case, if a priority of the audio service 2 is higher than that of the audio service 1, the Bluetooth headset stops processing the audio service 1, and starts processing the audio service 2. After completing processing of the audio service 2, the Bluetooth headset may continue to process the audio service 1.

In other technical solutions, priority arbitration of an audio service is performed on the Bluetooth headset side. A priority of an audio service may be preset, or may be actively set by the user. For example, a microphone of the Bluetooth headset may receive a priority of an audio service that is indicated by the user through a voice. For another example, the user may set a service priority by using the electronic device, and then send the service priority to the Bluetooth headset by using the electronic device for storage.

For example, in the case shown in FIG. 7D, if the mobile phone 1 has an audio service 1, the mobile phone 1 may send connection request information and identification information of the audio service 1 to the Bluetooth headset. If the Bluetooth headset is currently processing an audio service 2 of the mobile phone 2, the Bluetooth headset may determine priorities of the audio service 1 and the audio service 2 based on the identification information of the audio service 1.

If the priority of the audio service 2 is higher, the Bluetooth headset continues to process the audio service 2. If the priority of the audio service 1 is higher, the Bluetooth headset establishes a physical connection to the mobile phone 1, processes the audio service 1 of the mobile phone 1, and releases the physical connection between the Bluetooth headset and the mobile phone 2. That is, an electronic device having an audio service with a higher priority may preempt the physical connection and a right to use the Bluetooth headset.

It should be noted that, similar to the previous manner of switching between physical connections, the Bluetooth headset may first release the physical connection between the Bluetooth headset and the mobile phone 2, and then establish the physical connection to the mobile phone 1. Alternatively, the Bluetooth headset may first establish the physical connection to the mobile phone 1, and then release the physical connection between the Bluetooth headset and the mobile phone 2.

In some embodiments, when the Bluetooth headset is processing the audio service 1, data of the audio service 2 is temporarily blocked, and the audio service 2 is suspended. After completing the processing of the audio service 1 of the mobile phone 1, the Bluetooth headset may release the physical connection between the Bluetooth headset and the mobile phone 1, establish a physical connection to the mobile phone 2, and continue to process the audio service 2 of the mobile phone 2.

In some other embodiments, when processing the audio service 1, the Bluetooth headset ends processing of the audio service 2. After completing the processing of the audio service 1, the Bluetooth headset maintains the physical connection to the mobile phone 1.

Figure 13A:
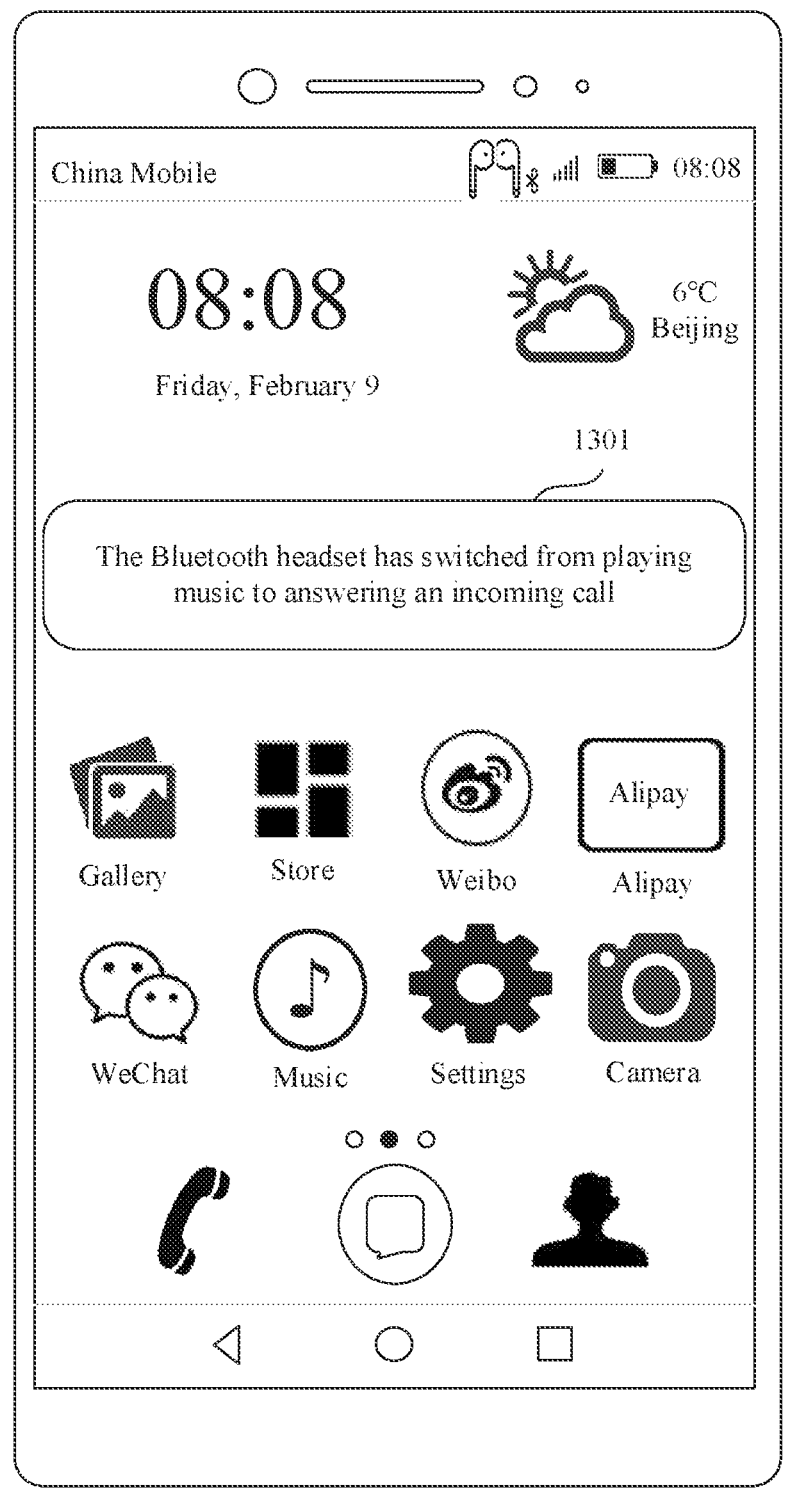
FIG. 13A and FIG. 13B are schematic diagrams of another group of interfaces according to an embodiment of this application.

In some other embodiments, when the Bluetooth headset processes an audio service, if the Bluetooth headset switches to processing another audio service, the Bluetooth headset or the electronic device may prompt the user in a manner such as making a sound, displaying prompt information on the electronic device, vibration, or using an indicator light. For example, as shown in FIG. 13A, the electronic device may prompt, by displaying information 1301, the user that an audio service being processed by the Bluetooth headset is switched.

Figure 13B:
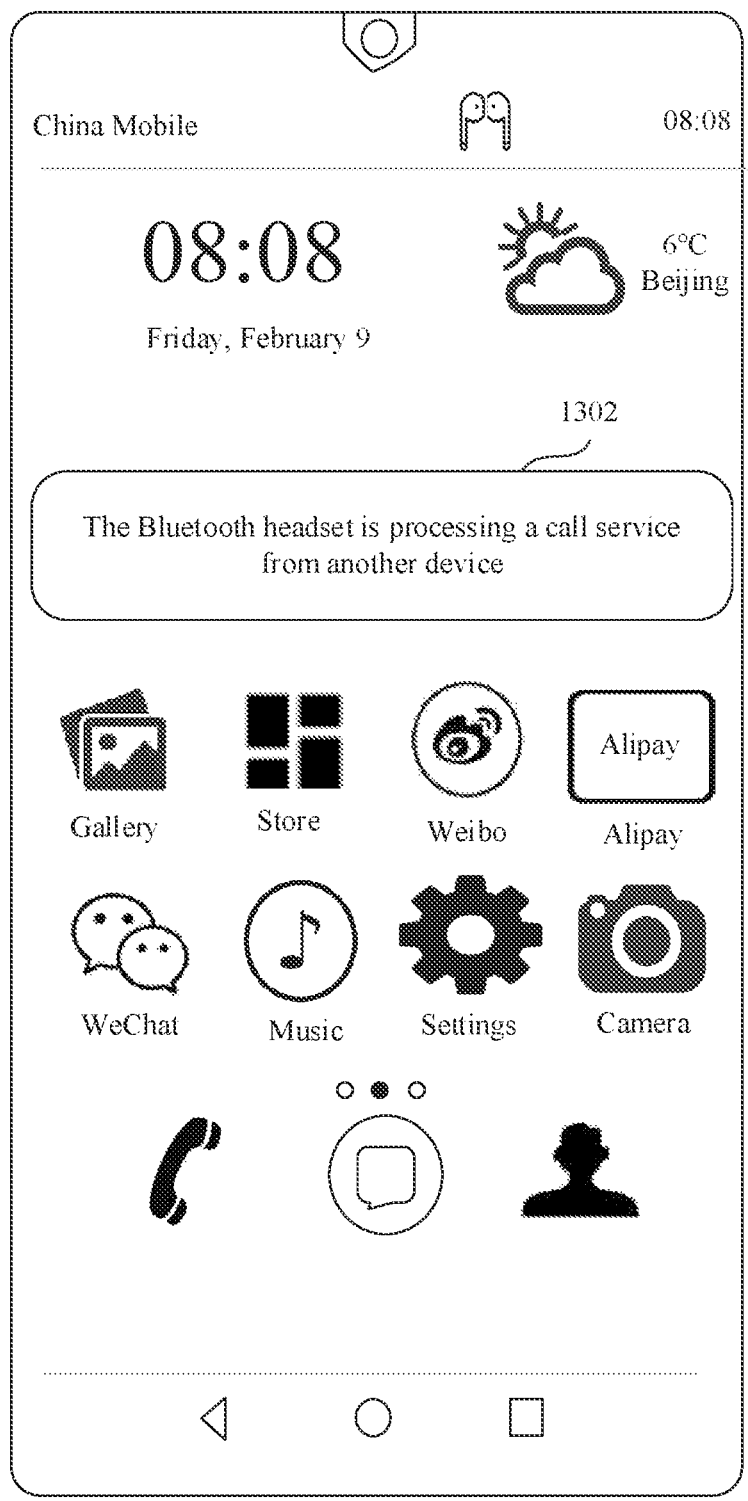

In some other embodiments, when the Bluetooth headset is processing an audio service 1 of the electronic device 1, if the electronic device 2 has an audio service 2, and the Bluetooth headset continues to process the audio service 1, the electronic device 2 or the Bluetooth headset may prompt the user that the Bluetooth headset is currently being used/occupied, or prompt the user that the Bluetooth headset is processing the audio service 1. For example, in the scenario shown in FIG. 11, as shown in FIG. 13B, the mobile phone 1 may prompt, by displaying information 1302, the user that the Bluetooth headset is currently processing a telephone service of another device. The electronic device 1 or the Bluetooth headset may further prompt the user that a service processing request of another device is rejected.

In the case shown in FIG. 7D, if the tablet computer has an audio service 3, and the tablet computer determines, based on a first BLE broadcast message, that the Bluetooth headset is currently processing the audio service 2 of the mobile phone 2, processing may be performed in a manner similar to the manner used when the mobile phone 1 has the audio service 1. Details are not described herein.

In other words, the Bluetooth headset may determine, based on a time sequence in which audio services occur and a priority relationship between audio service types, an electronic device to which a physical connection needs to be established and an audio service to be processed.

In addition, when priority arbitration of an audio service is performed on the Bluetooth headset side, if a time difference between a first moment at which the Bluetooth headset receives connection request information and a type of the audio service 1 that are sent by the mobile phone 1 and a second moment at which the Bluetooth headset receives connection request information and a type of the audio service 3 that are sent by the tablet computer is less than or equal to a preset threshold (for example, 0.1 s), it may indicate that the audio service 1 and the audio service 3 occur substantially simultaneously. If the Bluetooth headset is currently in an idle state, the Bluetooth headset may determine priorities of the audio service 1 and the audio service 3, so as to preferentially process an audio service with a higher priority. For example, if the priority of the audio service 1 is higher than the priority of the audio service 3, the Bluetooth headset establishes a physical connection to the mobile phone 1, processes the audio service 1, and releases the physical connection between the Bluetooth headset and the mobile phone 2.

In some embodiments, if the priorities of the audio service 1 and the audio service 3 are the same, the Bluetooth headset may randomly select an electronic device from the mobile phone 1 and the tablet computer and establish a physical connection to the electronic device, process a corresponding audio service based on the physical connection, and release the physical connection between the Bluetooth headset and the mobile phone 2. In some other embodiments, different electronic devices may correspond to different priorities. If the priorities of the audio service 1 and the audio service 3 are the same, the Bluetooth headset may determine an electronic device with a higher priority in the mobile phone 1 and the tablet computer, establish a physical connection to the electronic device with the higher priority, process an audio service of the electronic device with the higher priority, and release the physical connection between the Bluetooth headset and the mobile phone 2.

If the time difference between the first moment and the second moment is less than or equal to the preset threshold, and the Bluetooth headset is currently processing the audio service 2 of the mobile phone 2, the Bluetooth headset may determine a priority relationship of the audio service 1, the audio service 2, and the audio service 3. Then, the Bluetooth headset establishes/maintains a physical connection to an electronic device corresponding to an audio service with the highest priority, and processes the audio service with the highest priority.

In some embodiments, if the priorities of the audio service 1, the audio service 2, and the audio service 3 are the same, the Bluetooth headset selects an electronic device from the mobile phone 1 and the tablet computer and establishes a physical connection to the electronic device, processes a corresponding audio service based on the physical connection, and releases the physical connection between the Bluetooth headset and the mobile phone 2. In some other embodiments, different electronic devices may correspond to different priorities. If the priorities of the audio service 1, the audio service 2, and the audio service 3 are the same, the Bluetooth headset determines an electronic device with the highest priority in the mobile phone 1, the mobile phone 2, and the tablet computer, establishes/maintains a physical connection to the electronic device with the highest priority, and preferentially processes an audio service of the electronic device with the highest priority.

It can be learned that, in the connection solution provided in the foregoing embodiments of this application, a plurality of electronic devices may share one Bluetooth headset, and automatically obtain the right to use the Bluetooth headset through triggering by an audio service such as music playing or a phone call.

In the service priority solution, switching between establishment of physical connections between the Bluetooth headset and different electronic devices may be automatically triggered by using audio services on the electronic devices, so that an audio service is processed by using a physical connection established after switching. In this way, operations of manually establishing/releasing physical connections by the user are saved, and user experience is improved.

In addition, a service with a relatively high priority is usually an important and critical service. In the foregoing service priority solution, an important service can be preferentially and quickly processed in a timely manner, so that the critical service can be prevented from being delayed or neglected, and a processing delay of the important service can be reduced.

In addition, a virtual connection between the Bluetooth headset and an electronic device may be maintained by receiving the first BLE broadcast message. Compared with power consumption of a physical connection, power consumption for receiving/sending the first BLE broadcast message is much smaller. Therefore, the virtual connection can help reduce more power consumption than the physical connection. In this embodiment of this application, the Bluetooth headset maintains a physical connection to only one electronic device, and maintains virtual connections to other electronic devices. Therefore, power consumption of the Bluetooth headset and the electronic devices can be reduced, and standby time of the Bluetooth headset and the electronic devices can be prolonged.

For example, for magnitudes of currents required by the ACL connection and the BLE broadcast, refer to Table 2. When one physical connection is established, a current of a Bluetooth chip in a standby state is about 350 µA; when two physical connections are established, the current of the Bluetooth chip in the standby state is about 550 µA; in a case of virtual connection, the current of the Bluetooth chip in the standby state is less than 200 µA.

TABLE 2

| | |
|---|---|
| Base current of a Bluetooth chip | 150 µA |
| Current per ACL connection | 200 µA |
| Base current of a Bluetooth chip | 150 µA |
| Current for receiving/transmitting a BLE broadcast | <50 µA |

Device Priority Solution:

In some other embodiments, different electronic devices may correspond to different priorities, and the Bluetooth headset may preferentially establish a physical connection to an electronic device with a high priority, so as to preferentially process an audio service of the electronic device with a high priority. This solution may be referred to as a device priority solution. For example, a priority of the mobile phone 1 is higher than a priority of the mobile phone 2 and a priority of the tablet computer. For another example, the priority of the mobile phone 1 is higher than the priority of the mobile phone 2, and the priority of the mobile phone 2 is higher than the priority of the tablet computer.

Figure 14A:
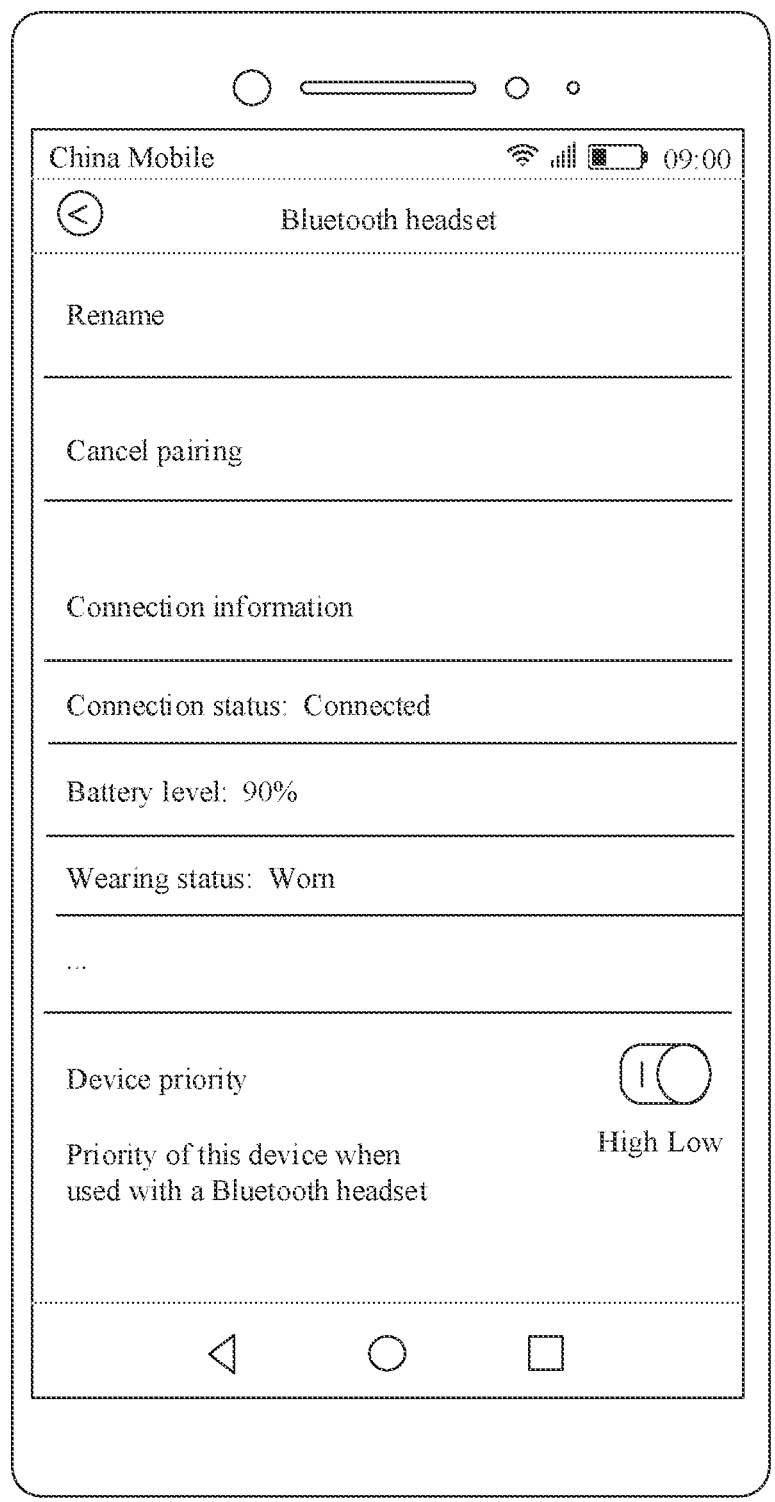
FIG. 14A and FIG. 14B are schematic diagrams of another group of interfaces according to an embodiment of this application.
Figure 14B:
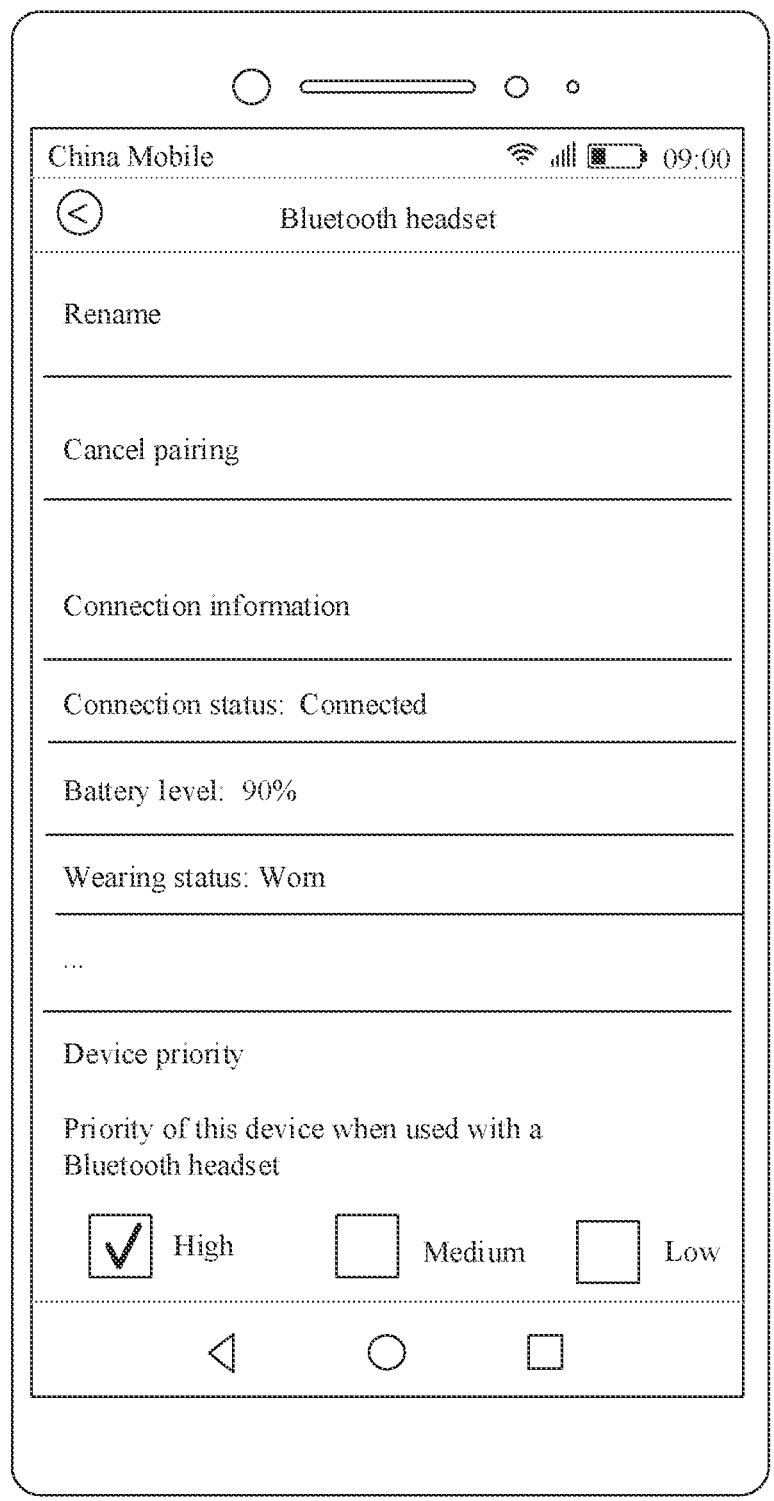

In some embodiments, a priority of an electronic device that is first paired with the Bluetooth headset is relatively high, and a priority of an electronic device that is later paired with the Bluetooth headset is relatively low. In some other embodiments, the user may set a priority of an electronic device. For example, as shown in FIG. 14A or FIG. 14B, the user may set a device priority on a setting interface of the electronic device. Device priorities may have two or more levels. For example, if a priority of an electronic device 1 is set to high, and a priority of another electronic device is not set, the priority of the electronic device 1 is higher than that of the another electronic device. If the priority of the electronic device 1 is set to low, and a priority of another electronic device is not set, the priority of the electronic device 1 is lower than that of the another electronic device. For another example, the user may set a priority to high on an electronic device 1, a priority to medium on an electronic device 2, and a priority to low on an electronic device 3. In this case, the priority of the electronic device 1 is higher than that of the electronic device 2, and the priority of the electronic device 2 is higher than that of the electronic device 3.

For another example, a microphone of an electronic device may receive device priority information indicated by a user voice.

After detecting an operation of setting a device priority by the user, the electronic device may send the device priority information to the Bluetooth headset. When the electronic device detects the operation of setting the device priority by the user, in some embodiments, if no physical connection is currently established between the electronic device and the Bluetooth headset, the electronic device temporarily does not send the device priority information to the Bluetooth headset. After subsequently establishing a physical connection to the Bluetooth headset, the electronic device sends the device priority information to the Bluetooth headset.

In some embodiments, if the priority of the electronic device 1 is higher than the priority of the electronic device 2, a virtual connection is currently established between the electronic device 1 and the Bluetooth headset, and a physical connection has been established between the Bluetooth headset and the electronic device 2, the electronic device 1 may temporarily preempt the physical connection, and send device priority information based on the physical connection.

For example, in a technical solution, the electronic device 1 may send connection request information to the Bluetooth headset. After receiving the connection request information, the Bluetooth headset establishes a physical connection to the electronic device 1, receives the device priority information sent by the electronic device 1, and releases the physical connection between the Bluetooth headset and the electronic device 2. In another technical solution, the electronic device 1 may send connection request information and identification information 2 to the Bluetooth headset, where the identification information 2 is used to indicate that the electronic device 1 requests to send the device priority information to the Bluetooth headset. After receiving the identification information 2, the Bluetooth headset determines that the electronic device 1 expects to temporarily request a physical connection to transmit the device priority information. Therefore, the Bluetooth headset may establish a physical connection to the electronic device 1, receive the device priority information sent by the electronic device 1, and release the physical connection between the Bluetooth headset and the electronic device 2. After sending of the device priority information is completed, the Bluetooth headset re-establishes a physical connection to the electronic device 2, and releases the physical connection between the Bluetooth headset and the electronic device 1.

In some other embodiments, if an electronic device currently has established a virtual connection to the Bluetooth headset, and the Bluetooth headset currently has established a physical connection to another electronic device, the electronic device temporarily establishes another physical connection to the Bluetooth headset, and sends device priority information to the Bluetooth headset. That is, the Bluetooth headset temporarily maintains short-term physical connections to the two electronic devices. The electronic device releases the physical connection between the electronic device and the Bluetooth headset after completing sending of the priority information. That is, the Bluetooth headset may temporarily establish an additional physical connection, to receive the device priority information that is set by the user.

For another example, the microphone of the Bluetooth headset may receive device priority information indicated by the user through a voice.

In another embodiment, an electronic device may have different priorities in different time periods. For example, the mobile phone 2 has a highest priority in a working time period, and the mobile phone 1 has a highest priority in a time period other than the working time period. The user may set priorities of electronic devices in different time periods.

In some embodiments, the Bluetooth headset in an idle state may maintain a physical connection to an electronic device with a highest priority, and preferentially process an audio service of the electronic device with a high priority.

For example, in another preset policy, the Bluetooth headset retains a physical connection to an electronic device with a highest priority, so that the Bluetooth headset can preferentially process an audio service of the electronic device with the highest priority; and the Bluetooth headset sends a first BLE broadcast message, so that another electronic device maintains a virtual connection to the Bluetooth headset based on the first BLE broadcast message.

When there are a plurality of electronic devices with the highest priority, the Bluetooth headset retains a physical connection to one electronic device with the highest priority according to a preset rule. For example, the Bluetooth headset may retain a physical connection to an electronic device that was most recently physically connected to the Bluetooth headset before current reconnection. Alternatively, the Bluetooth headset may retain, based on signal strength, a physical connection with a strongest signal. Alternatively, the Bluetooth headset may randomly select an electronic device with the highest priority, and retain a physical connection to the electronic device.

An example in which the priority of the mobile phone 1 is higher than the priority of the mobile phone 2, and the priority of the mobile phone 2 is higher than the priority of the tablet computer is used for description. For example, as shown in FIG. 15, after the current connection, the Bluetooth headset establishes a physical connection to the mobile phone 1 with the highest priority.

Figure 15:
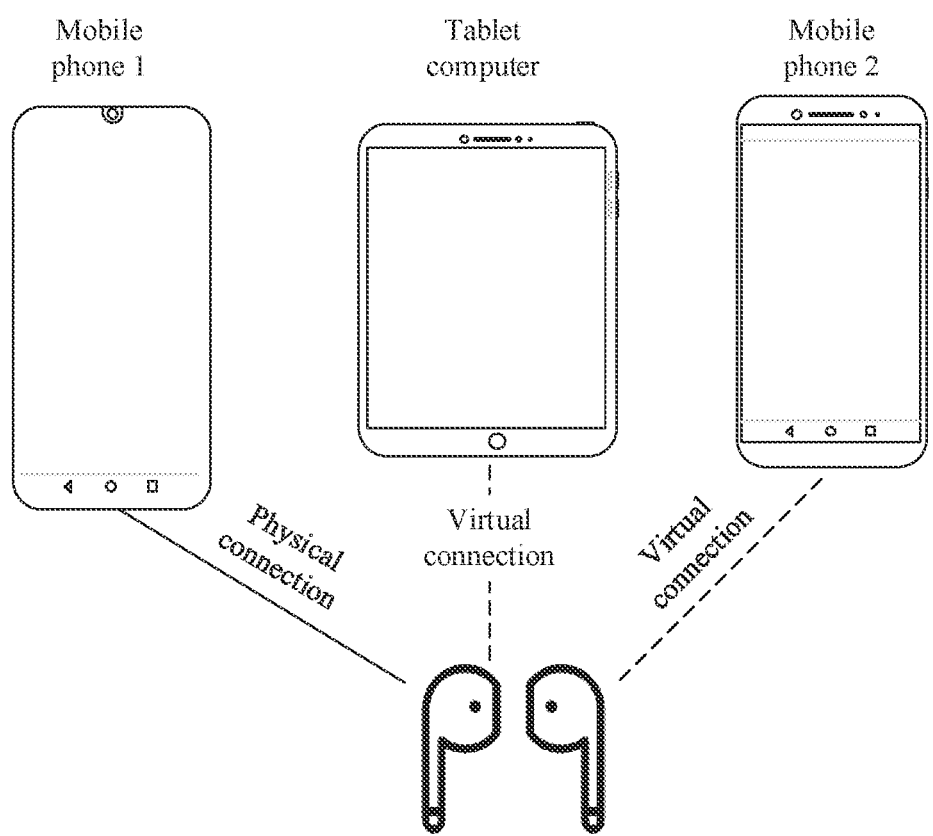
FIG. 15 is a schematic diagram of another wireless connection according to an embodiment of this application.
Figure 16:
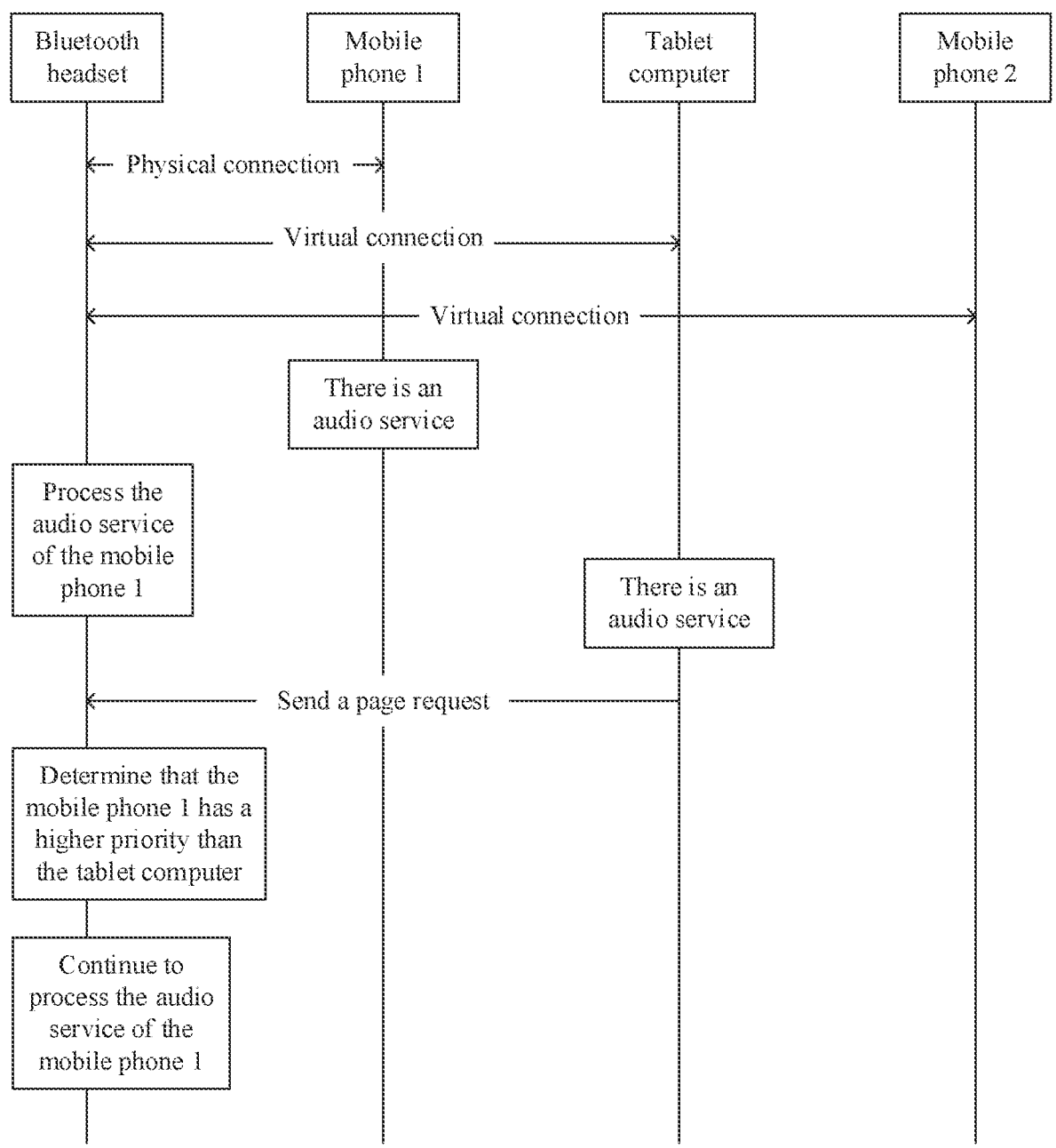
FIG. 16 is a flowchart of another service processing method according to an embodiment of this application.

In the case shown in FIG. 15, if the mobile phone 1 has an audio service, the Bluetooth headset preferentially processes the audio service of the mobile phone 1. For example, as shown in FIG. 16, when the Bluetooth headset is processing the audio service of the mobile phone 1, if the Bluetooth headset receives connection request information sent by another electronic device (for example, the tablet computer), the Bluetooth headset does not establish a physical connection to the another electronic device, and continues to process the audio service of the mobile phone 1.

Figure 17:
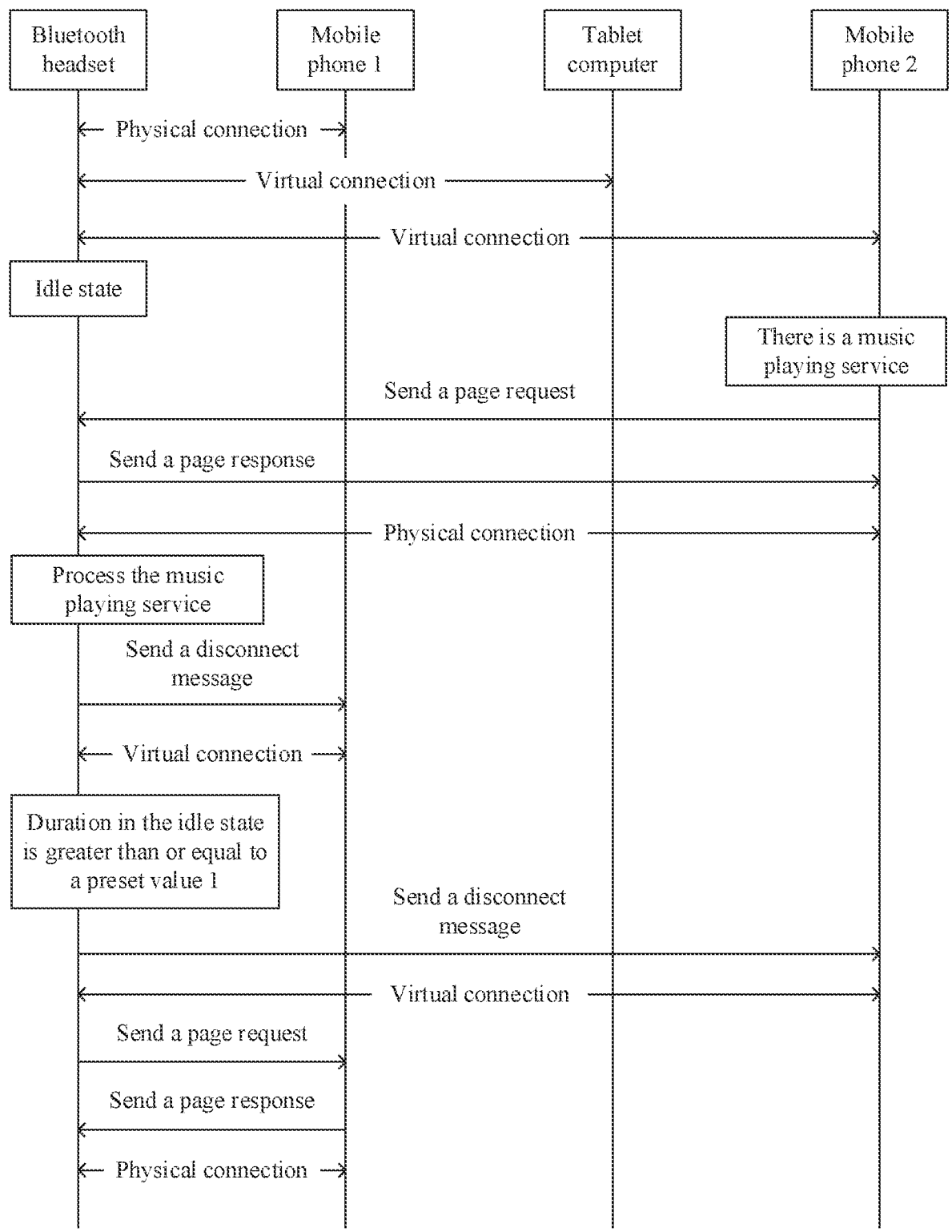
FIG. 17 is a flowchart of another service processing method according to an embodiment of this application.

In the case shown in FIG. 15, the Bluetooth headset in an idle state remains physically connected to the mobile phone 1. In the idle state, the Bluetooth headset receives connection request information sent by another electronic device (for example, the mobile phone 2). Refer to FIG. 17. The Bluetooth headset establishes a physical connection to the mobile phone 2, processes an audio service (for example, music playing) of the mobile phone 2, and releases the physical connection between the Bluetooth headset and the mobile phone 1. In addition, when there is no audio service in a long period of time, the Bluetooth headset may switch back to the physical connection between the Bluetooth headset and the electronic device with the highest priority. For example, after completing the processing of the audio service of the mobile phone 2, if duration in the idle state is greater than or equal to a preset value 2, the Bluetooth headset releases the physical connection between the Bluetooth headset and the mobile phone 2, and resumes establishing the physical connection between the Bluetooth headset and the mobile phone 1 with the highest priority. That is, the Bluetooth headset may automatically allocate the physical connection to the electronic device with the highest priority. In this way, in most cases, when initiating an audio service, an electronic device with a high priority does not need to undergo switching from a virtual connection to a physical connection, and can directly transmit service data to process the audio service. Therefore, a processing delay is short.

After the Bluetooth headset completes processing of the audio service of the electronic device 1 based on the physical connection between the Bluetooth headset and the electronic device 1, and enters the idle state, if the priority of the electronic device 1 is the highest, the physical connection is not switched. If the electronic device 1 has the highest priority but is not the electronic device 2 to which the Bluetooth headset was most recently physically connected before the current reconnection, the Bluetooth headset switches to the physical connection between the Bluetooth headset and the electronic device 2. If the electronic device 1 is not the electronic device with the highest priority, the Bluetooth headset switches back to the physical connection between the Bluetooth headset and the electronic device with the highest priority. If there are a plurality of electronic devices with the highest priority, the Bluetooth headset may switch to a physical connection between the Bluetooth headset and an electronic device with the highest priority according to a preset rule. For example, the Bluetooth headset may switch to a physical connection between the Bluetooth headset and an electronic device that was most recently physically connected to the Bluetooth headset before the current reconnection. Alternatively, the Bluetooth headset may switch to, based on signal strength, a physical connection with a strongest signal. Alternatively, the Bluetooth headset may randomly select an electronic device with the highest priority, and switch to a physical connection between the Bluetooth headset and the electronic device.

Figure 18:
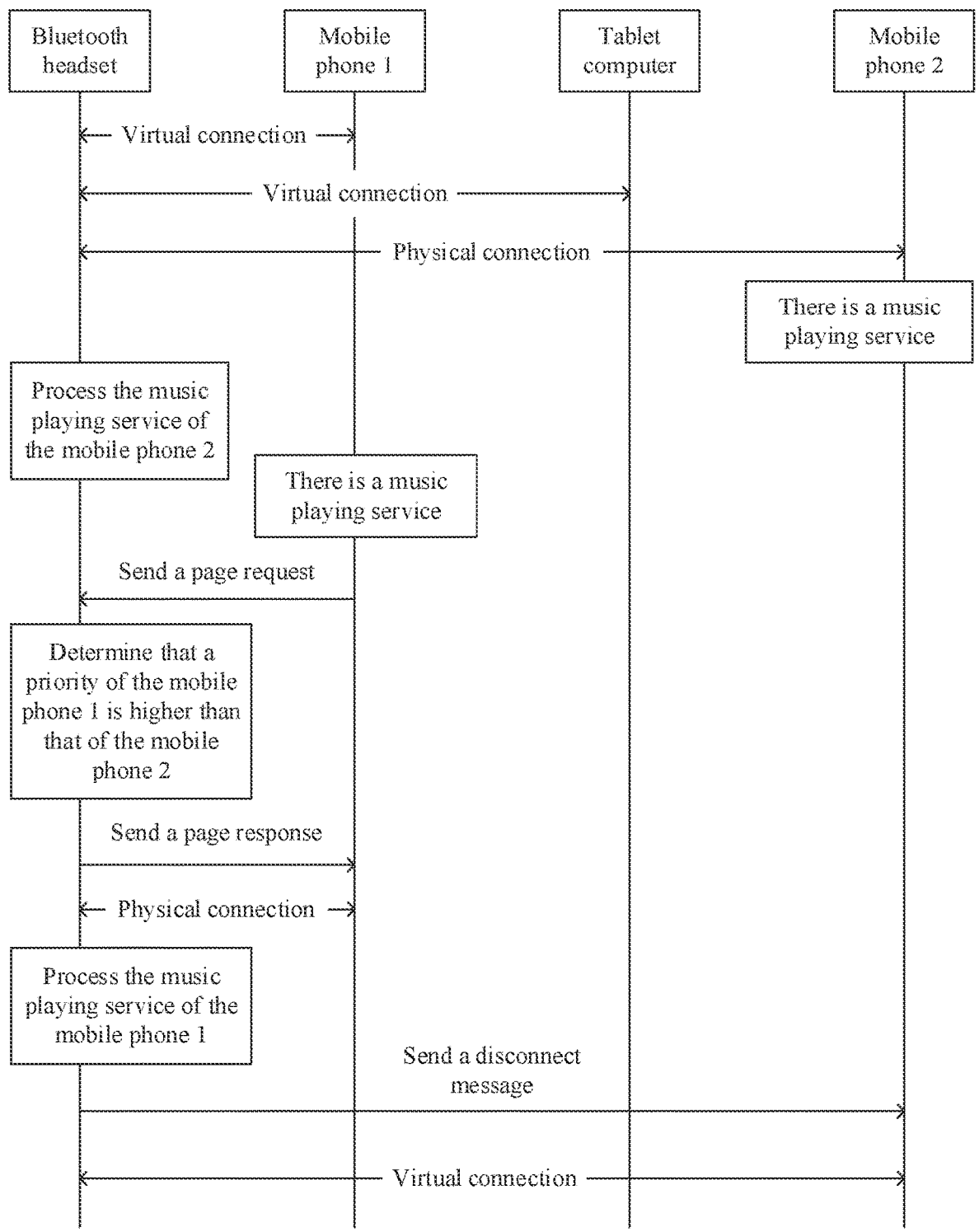
FIG. 18 is a flowchart of another service processing method according to an embodiment of this application.

After being physically disconnected from the Bluetooth headset and establishing a virtual connection, the mobile phone 1 sends connection request information to the Bluetooth headset when there is an audio service. Refer to FIG. 18. When processing an audio service of another electronic device (for example, the mobile phone 2), if the Bluetooth headset receives the connection request information sent by the mobile phone 1 with a higher priority, the Bluetooth headset releases the physical connection between the Bluetooth headset and the mobile phone 2, and establishes a physical connection to the mobile phone 1, so that the audio service of the mobile phone 1 is preferentially processed. That is, an electronic device with a higher priority may preempt the physical connection and the right to use the Bluetooth headset.

In some other embodiments, when processing an audio service 1 of the electronic device 1, if the Bluetooth headset receives connection request information sent by the electronic device 2, the Bluetooth headset continues to process the audio service 1 of the electronic device 1, regardless of device priorities of the electronic device 2 and the electronic device 1.

In some other embodiments, when the Bluetooth headset is processing the audio service 1 of the electronic device 1, if the electronic device 2 has an audio service 2, and a priority of the audio service 2 is higher than that of the audio service 1, the electronic device 2 sends connection request information to the Bluetooth headset. After receiving the connection request information sent by the electronic device 2, the Bluetooth headset establishes a physical connection to the electronic device 2, so as to process the audio service with a higher priority; and the Bluetooth headset releases the physical connection between the Bluetooth headset and the electronic device 1, regardless of device priorities of the electronic device 2 and the electronic device 1.

In some embodiments, when receiving connection request information sent by the mobile phone 1 with a higher priority, the Bluetooth headset may prompt, by making a sound, the user that the Bluetooth headset is switching to processing a service for the device with a higher priority.

An example in which the priority of the mobile phone 1 is higher than the priority of the mobile phone 2 and the priority of the tablet computer, and the priorities of the mobile phone 2 and the tablet computer are the same is used for description.

In the case shown in FIG. 15, the Bluetooth headset in an idle state remains physically connected to the mobile phone 1. In some embodiments, in the idle state, if the Bluetooth headset receives connection request information sent by the mobile phone 2/tablet computer, the Bluetooth headset establishes a physical connection to the mobile phone 2/tablet computer, processes an audio service (for example, music playing) of the mobile phone 2/tablet computer, and releases the physical connection between the Bluetooth headset and the mobile phone 1.

In some other embodiments, in the idle state, if the Bluetooth headset receives, at a third moment, connection request information sent by the mobile phone 2, and receives, at a fourth moment, connection request information sent by the tablet computer, and a time difference between the third moment and the fourth moment is less than or equal to a preset threshold, it may indicate that audio services basically occur on the mobile phone 2 and the tablet computer at the same time.

In a technical solution, the mobile phone 2 and the tablet computer may send audio service types to the Bluetooth headset, and the Bluetooth headset establishes a physical connection to an electronic device whose audio service has a higher priority, so as to preferentially process the audio service having a higher priority. In another technical solution, the Bluetooth headset randomly selects an electronic device from the mobile phone 2 and the tablet computer, and establishes a connection to the electronic device, so as to process an audio service of the electronic device.

When the Bluetooth headset is processing the audio service of the mobile phone 2, if the Bluetooth headset receives connection request information sent by the tablet computer, because the priority of the tablet computer is the same as the priority of the mobile phone 2, the Bluetooth headset may not establish a physical connection to the tablet computer, and continue to process the audio service of the mobile phone 2. When the Bluetooth headset is processing the audio service of the mobile phone 2, if the Bluetooth headset receives connection request information sent by the mobile phone 1, because the priority of the mobile phone 1 is higher than the priority of the mobile phone 2, the Bluetooth headset establishes a physical connection to the mobile phone 1, processes the audio service of the mobile phone 1, and releases the physical connection between the Bluetooth headset and the mobile phone 2.

In the foregoing device priority solution, a physical connection and a virtual connection between the Bluetooth headset and an electronic device may be automatically switched, and a physical connection may be preferentially established between the Bluetooth headset and an electronic device with a high priority, so that an audio service of the electronic device with a high priority is preferentially processed. In this way, operations of manually establishing/releasing physical connections by the user are saved, and user experience is improved.

In addition, in most cases, when initiating an audio service, an electronic device with a high priority does not need to undergo switching from a virtual connection to a physical connection, and can directly transmit service data to process the audio service. Therefore, a processing delay is short. An electronic device with a high priority is usually an electronic device that is frequently used by a user, that is mainly used by the user, or that frequently has important services. In the foregoing device priority solution, an audio service of an important electronic device can be preferentially and quickly processed in a timely manner, so that an important service is not delayed or neglected, and a processing delay of the important service is reduced.

In addition, the virtual connection is established and maintained in a manner of receiving the first BLE broadcast message. Compared with power consumption for establishing a physical connection, power consumption for receiving/sending the first BLE broadcast message is much smaller. Therefore, the virtual connection can help reduce more power consumption than the physical connection. In this embodiment of this application, the Bluetooth headset establishes a physical connection to only one electronic device, and maintains virtual connections to other electronic devices. Therefore, battery power of the Bluetooth headset and the electronic devices can be saved, and standby time of the Bluetooth headset and the electronic devices can be prolonged.

Multi-Physical-Connection Solution:

The foregoing embodiment is mainly described by using an example in which the Bluetooth headset maintains a physical connection to one electronic device and maintains virtual connections to other electronic devices. In some other embodiments, the Bluetooth headset may alternatively maintain physical connections to a preset quantity m (for example, 2) of electronic devices in the communications system, so that the Bluetooth headset can directly and quickly process audio services of these electronic devices with a low delay. The Bluetooth headset maintains a virtual connection to another electronic device in the communications system. When an electronic device having a virtual connection to the Bluetooth headset has an audio service, the Bluetooth headset may switch from the virtual connection between the electronic device and the Bluetooth headset to a physical connection, so as to process the audio service of the electronic device based on the physical connection; and the Bluetooth headset releases a physical connection between the Bluetooth headset and one of the m electronic devices. This solution may be referred to as a multi-physical-connection solution. For example, the communications system includes one Bluetooth headset and ten electronic devices. The Bluetooth headset maintains physical connections to two electronic devices, and maintains virtual connections to the other eight electronic devices.

Compared with the conventional technology in which a Bluetooth headset maintains physical connections to all electronic devices, the multi-physical-connection solution does not require the Bluetooth headset to maintain physical connections to all electronic devices, but can reduce power consumption by combining physical connections and virtual connections, and automatically process the audio services on the electronic devices.

All-Virtual-Connection Solution:

In some other embodiments, the Bluetooth headset in an idle state maintains a virtual connection to each electronic device, which may be referred to as an all-virtual-connection solution. When an electronic device has an audio service, the Bluetooth headset establishes a physical connection to the electronic device, so as to process the audio service of the electronic device.

For example, in a current reconnection process, the Bluetooth headset establishes a physical connection to the mobile phone 2, and then releases the physical connection and switches to a virtual connection. The Bluetooth headset establishes a physical connection to the tablet computer, and then releases the physical connection and switches to a virtual connection. The Bluetooth headset establishes a physical connection to the mobile phone 1, and then releases the physical connection and switches to a virtual connection. In addition, the Bluetooth headset sends a first BLE broadcast message, and the mobile phone 1, the tablet computer, and the mobile phone 2 maintain the virtual connections to the Bluetooth headset based on the first BLE broadcast message. That is, as shown in FIG. 19, virtual connections are maintained between the Bluetooth headset and the mobile phone 1, the tablet computer, and the mobile phone 2.

Figure 19:
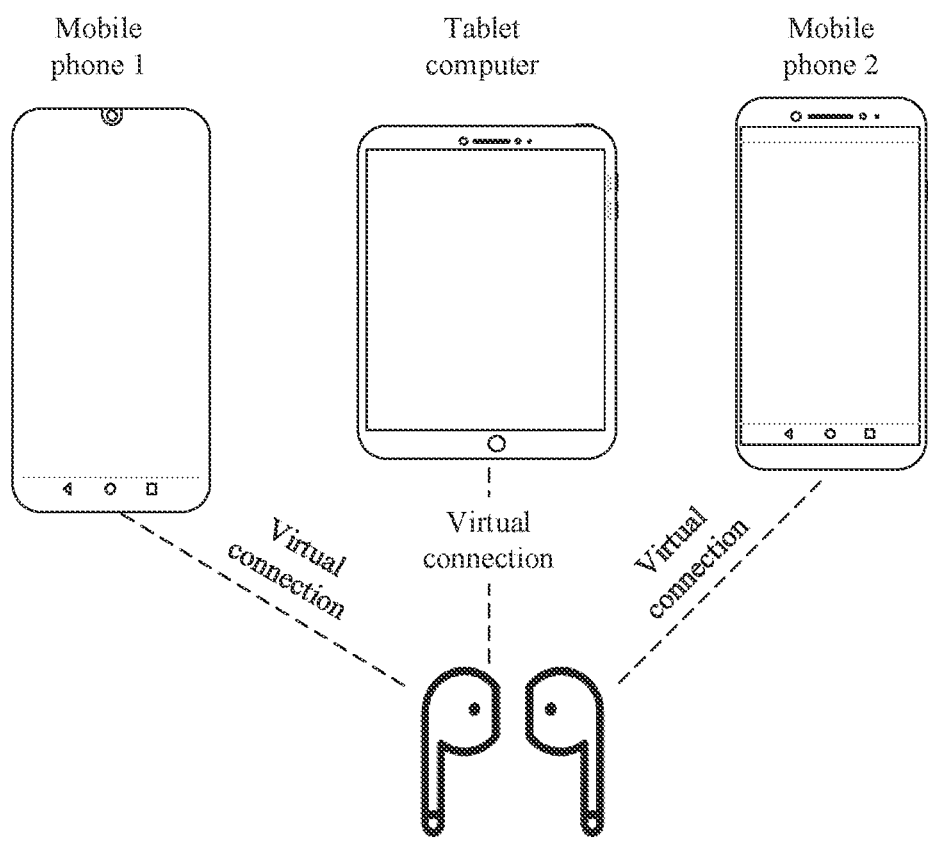
FIG. 19 is a schematic diagram of another wireless connection according to an embodiment of this application.

In the scenario shown in FIG. 19, when the mobile phone 1, the tablet computer, or the mobile phone 2 has an audio service, the mobile phone 1, the tablet computer, or the mobile phone 2 sends connection request information to the Bluetooth headset, to request to establish a physical connection. After receiving, in the idle state, connection request information sent by an electronic device, the Bluetooth headset establishes a physical connection to the electronic device, so as to process an audio service of the electronic device.

Figure 20:
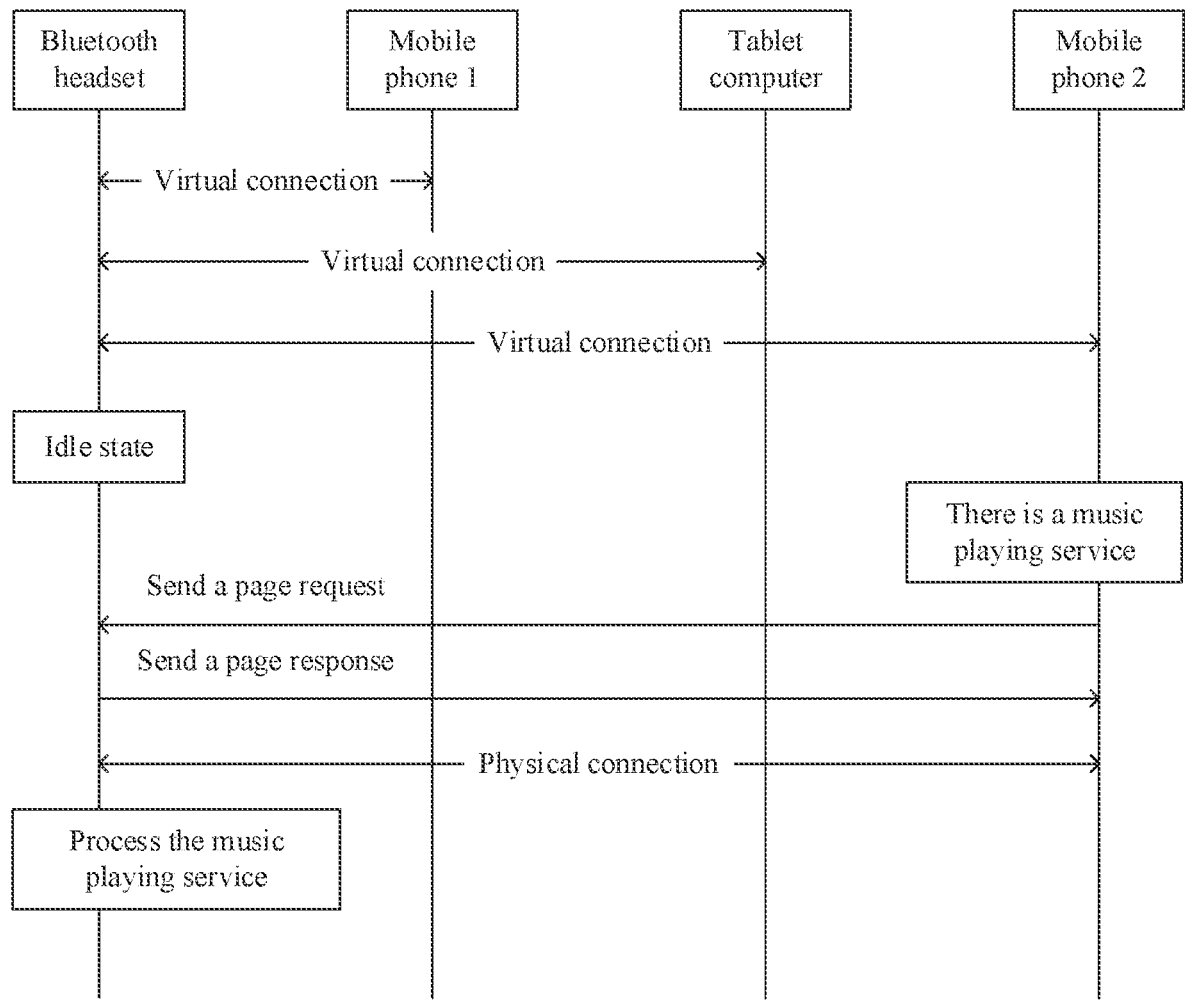
FIG. 20 is a flowchart of another service processing method according to an embodiment of this application.

For example, in the scenario shown in FIG. 19, in the idle state, if the mobile phone 2 has a music playing service, refer to FIG. 20 for a corresponding processing procedure. In the scenario shown in FIG. 19, in the idle state, if the mobile phone 1 has an incoming call service, refer to FIG. 21 for a corresponding processing procedure.

In the scenario shown in FIG. 19, in some embodiments, the Bluetooth headset establishes a physical connection to the electronic device 1, and is processing an audio service of the electronic device 1. If the Bluetooth headset receives connection request information sent by the electronic device 2, the Bluetooth headset does not establish a physical connection to the electronic device 2, and continues to process the audio service of the electronic device 1.

In the scenario shown in FIG. 19, in some other embodiments, the Bluetooth headset may further preferentially establish a physical connection to an electronic device having an audio service with a high priority with reference to the foregoing service priority solution, so as to preferentially process the audio service with a high priority.

For example, the Bluetooth headset establishes a physical connection to the electronic device 1, and is processing an audio service of the electronic device 1. When determining that a priority of an audio service of the electronic device 2 is higher than a priority of the audio service of the electronic device 1, the electronic device 2 may send connection request information to the Bluetooth headset. After receiving the connection request information sent by the electronic device 2, the Bluetooth headset establishes a physical connection to the electronic device 2, processes the audio service of the electronic device 2, and releases the physical connection between the Bluetooth headset and the electronic device 1.

For another example, if the Bluetooth headset establishes a physical connection to the electronic device 1, is processing an audio service of the electronic device 1, and receives connection request information sent by the electronic device 2, and a priority of the electronic device 2 is higher than a priority of the electronic device 1, the Bluetooth headset establishes a physical connection to the electronic device 2, processes an audio service of the electronic device 2, and releases the physical connection between the Bluetooth headset and the electronic device 1.

In the scenario shown in FIG. 19, in some other embodiments, the Bluetooth headset may further preferentially establish a physical connection to an electronic device with a high priority with reference to the foregoing device priority solution, so as to preferentially process an audio service of the electronic device with a high priority.

For example, if the Bluetooth headset establishes a physical connection to the electronic device 1, is processing an audio service of the electronic device 1, and receives connection request information sent by the electronic device 2, and a priority of an audio service of the electronic device 2 is higher than a priority of the audio service of the electronic device 1, the Bluetooth headset establishes a physical connection to the electronic device 2, processes the audio service of the electronic device 2, and releases the physical connection between the Bluetooth headset and the electronic device 1.

Figure 21:
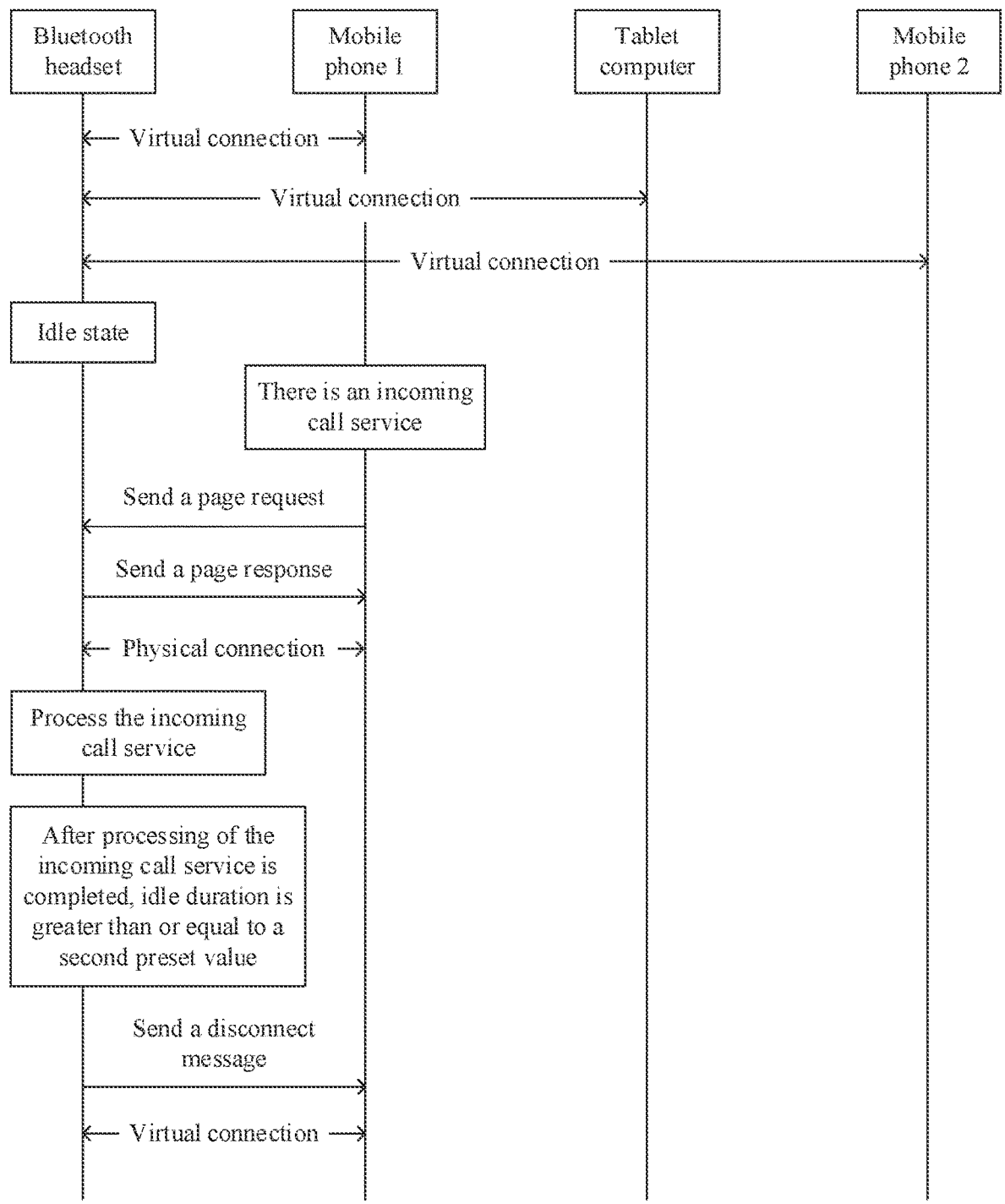
FIG. 21 is a flowchart of another service processing method according to an embodiment of this application.

After the Bluetooth headset establishes a physical connection to an electronic device and processes an audio service of the electronic device, if duration in which the Bluetooth headset is in an idle state is greater than or equal to preset duration 4, that is, the Bluetooth headset has no service for a long time, the Bluetooth headset may release the physical connection between the Bluetooth headset and the electronic device, so as to maintain virtual connections to all electronic devices, and reduce power consumption of the Bluetooth headset. For example, as shown in FIG. 21, after the Bluetooth headset establishes a physical connection to the mobile phone 2 and completes processing of an incoming call service, if duration in which the Bluetooth headset is in an idle state is greater than or equal to the preset duration 4, the Bluetooth headset releases the physical connection between the Bluetooth headset and the mobile phone 2, so as to enter the all-virtual-connection solution, and save the battery power of the Bluetooth headset.

That is, in the all-virtual-connection solution, the Bluetooth headset in the idle state maintains virtual connections to all electronic devices, so as to reduce power consumption. When an electronic device has an audio service, a physical connection to the electronic device is temporarily established to process the audio service. After processing of the audio service is completed and the idle state is restored, the virtual connection to each electronic device is restored, so as to save battery power.

In the foregoing all-virtual-connection solution, establishment of a physical connection between an electronic device and the Bluetooth headset may be automatically triggered by using an audio service of the electronic device, so that the audio service is processed based on the established physical connection. This can save operations of manually establishing/releasing physical connections by the user, and improve user experience.

In addition, because power consumption for receiving/sending the first BLE broadcast message is much smaller than power consumption for establishing a physical connection, that all the connections between the Bluetooth headset in the idle state and the electronic devices are virtual connections can reduce more power consumption for the Bluetooth headset and the electronic devices. Especially in a long-time idle and standby scenario, power consumption reduction is more obvious, and the headset and the electronic devices can last for a longer standby time.

In some other embodiments, when the Bluetooth headset establishes a first physical connection to the electronic device 1, if duration required by an audio service of the electronic device 2 is relatively short, that is, the audio service of the electronic device 2 is a short-term service, the Bluetooth headset may temporarily establish a second physical connection to the electronic device 2, so as to process the audio service of the electronic device 2 in a short time based on the second physical connection, and maintain the first physical connection between the Bluetooth headset and the electronic device 1 at the same time. After processing of the audio service of the electronic device 2 is completed, the second physical connection is released, and only the first physical connection is maintained.

For example, the short-term service may include a phone call service, a WeChat voice service, and the like, and duration required by the short-term service is usually relatively short. Types of the short-term service may be preset on the Bluetooth headset or the electronic device, or may be actively set by the user. This is not limited in this embodiment of this application.

For example, when the Bluetooth headset establishes a first physical connection to the electronic device 1, and the Bluetooth headset is processing an audio service 1 of the electronic device 1, if the electronic device 2 has an audio service 2, and the audio service 2 is a short-term service, the Bluetooth headset may temporarily establish a second physical connection to the electronic device 2, so as to process the audio service 2 in a short time by using the second physical connection; and at the same time, the Bluetooth headset suspends processing of the audio service 1, and maintains the first physical connection between the Bluetooth headset and the electronic device 1. After processing of the audio service 2 is completed, the second physical connection is released, only the first physical connection is maintained, and the audio service 1 continues to be processed.

Figure 22:
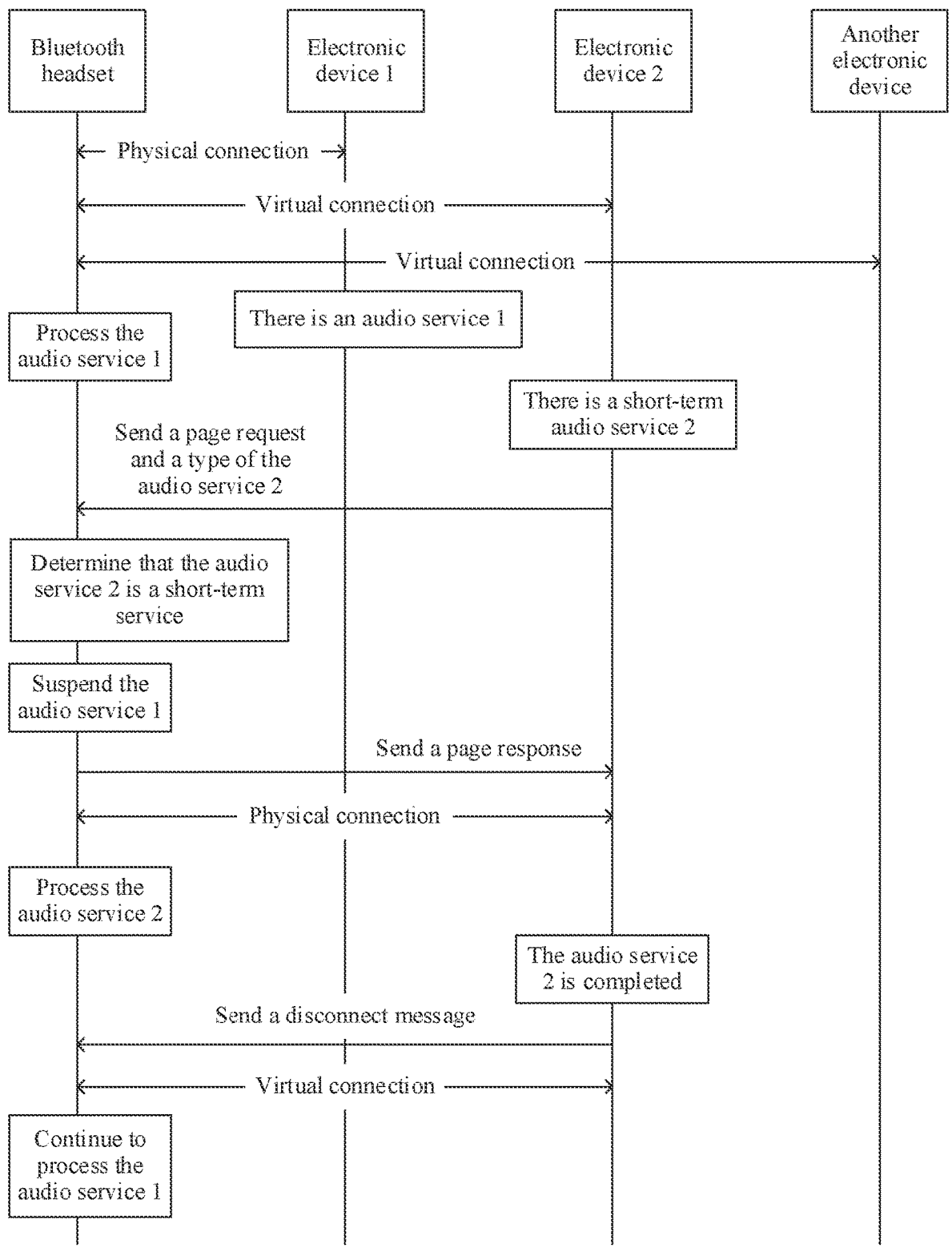
FIG. 22 is a flowchart of another service processing method according to an embodiment of this application.

Refer to FIG. 22. For example, in a technical solution, the electronic device 2 may send connection request information and a type of the audio service 2 to the Bluetooth headset. After receiving the connection request information and the type of the audio service 2 that are sent by the electronic device 2, the Bluetooth headset determines that the audio service of this type is a short-term service. Therefore, the Bluetooth headset may establish the second physical connection to the electronic device 2 on the basis of maintaining the first physical connection to the electronic device 1.

As shown in FIG. 22, after the audio service 2 is completed, the electronic device 2 may request to release the physical connection between the Bluetooth headset and the electronic device 2. Alternatively, after the audio service 2 is completed, the electronic device 2 may notify the Bluetooth headset that the audio service 2 is completed, and the Bluetooth headset requests to release the physical connection between the Bluetooth headset and the electronic device 2.

In another technical solution, the electronic device 2 may send connection request information and identification information 3 to the Bluetooth headset, where the identification information 3 is used to indicate that the audio service of the electronic device 2 is a short-term service. After receiving the connection request information and the identification information 3 that are sent by the electronic device 2, the Bluetooth headset determines that duration required by the audio service type is relatively short. Therefore, the Bluetooth headset may establish the second physical connection to the electronic device 2 on the basis of maintaining the first physical connection to the electronic device 1.

When the Bluetooth headset is a TWS headset, the primary earbud may exchange control information with an electronic device, so as to automatically switch a physical connection between the Bluetooth headset and the electronic device. For example, the primary earbud may receive connection request information sent by the electronic device, and send physical connection release indication information to the electronic device. The primary earbud may further synchronize a connection status to the secondary earbud, for example, synchronize a physical connection state, a virtual connection state, or an unconnected state to the secondary earbud. In addition, the primary earbud may further synchronize related information such as historical pairing information, historical connection information, device priority information, and service priority information to the secondary earbud, so that after the secondary ear and the primary ear are switched, the secondary earbud can also establish/release a physical connection and a virtual connection between the Bluetooth headset and the electronic device based on the related information.

In some embodiments, in the single-physical-connection solution or the multi-physical-connection solution, when the Bluetooth headset establishes a physical connection or physical connections to one or some electronic devices and establishes a virtual connection to another electronic device, if duration in which the Bluetooth headset is in the idle state is greater than or equal to preset duration 2, the Bluetooth headset may release the physical connection between the Bluetooth headset and the electronic device. As a result, the Bluetooth headset switches to the full-virtual-connection solution, and maintains virtual connections to all the electronic devices, so as to reduce power consumption of the Bluetooth headset and the electronic devices.

Figure 23:
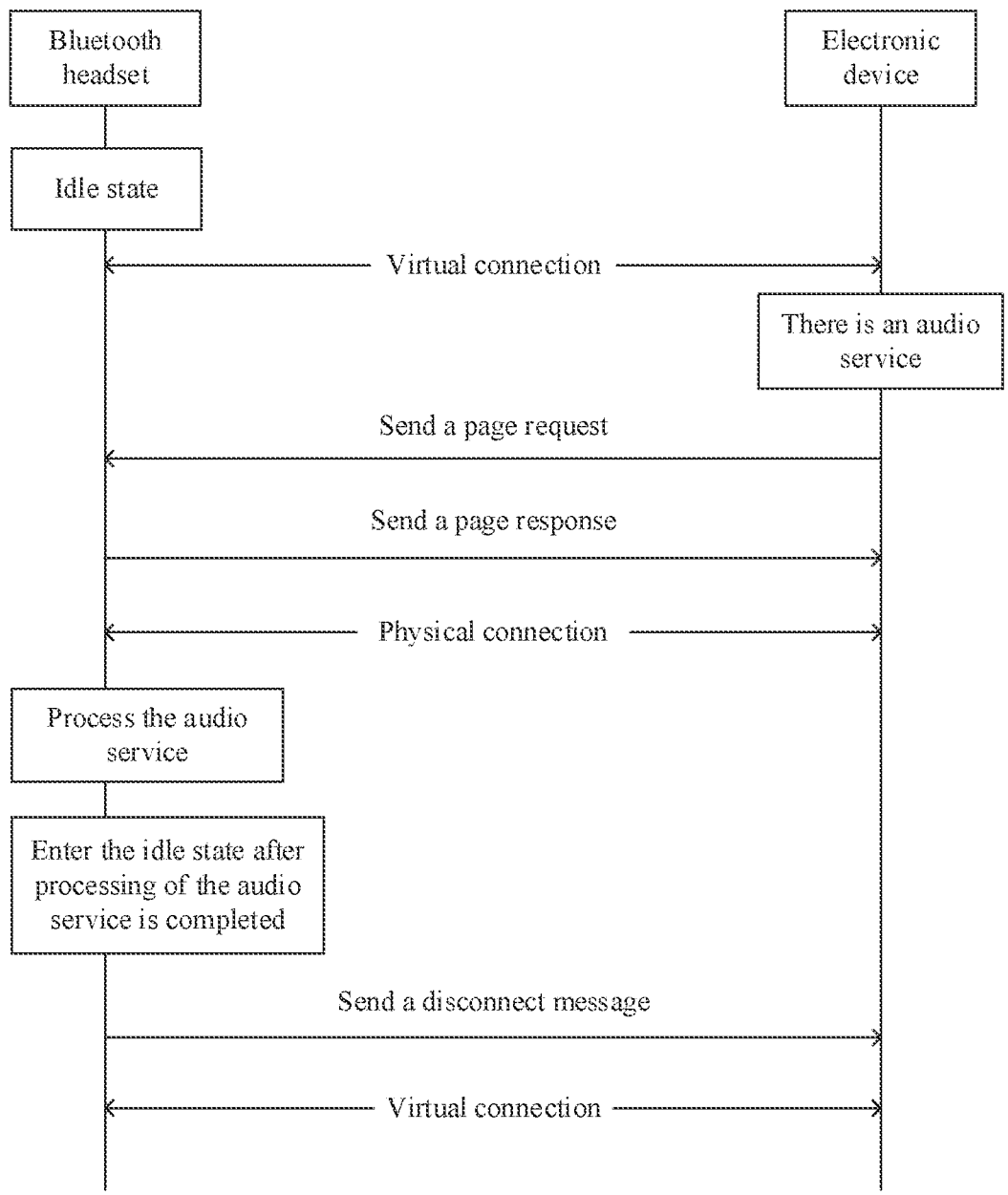
FIG. 23 is a flowchart of a connection method according to an embodiment of this application.

In some other embodiments, the virtual connection is also applicable to a scenario in which the Bluetooth headset is used in cooperation with one electronic device. When the communications system shown in FIG. 1 includes one electronic device and one Bluetooth headset, the Bluetooth headset is paired with only the electronic device. The Bluetooth headset may periodically send a first BLE broadcast message. After receiving the first BLE broadcast message, the electronic device may establish a virtual connection to the Bluetooth headset, and display, on a related interface, related information of the connected Bluetooth headset based on content of the first BLE broadcast message. When the Bluetooth headset is in an idle state, a virtual connection may be maintained between the Bluetooth headset and the electronic device, to save battery power. When the electronic device has an audio service, the electronic device may send connection request information to the Bluetooth headset, to establish a physical connection to the Bluetooth headset. The Bluetooth headset processes the audio service of the electronic device based on the established physical connection. After processing of the audio service is completed, the Bluetooth headset may release the physical connection between the Bluetooth headset and the electronic device, to switch to a virtual connection, so as to reduce power consumption of the Bluetooth headset and the electronic device. For example, for a corresponding connection switching procedure in this scenario, refer to FIG. 23.

In some other embodiments, when the Bluetooth headset establishes the first physical connection to the electronic device 1, if the Bluetooth headset receives connection request information sent by the electronic device 2, the Bluetooth headset may prompt, in a manner such as making a sound, vibration, using the indicator light, or displaying information, the user whether to switch to the second physical connection between the Bluetooth headset and the electronic device 2. If the Bluetooth headset detects a switching instruction indicated by the user by using a voice or by touching a button or the like, the Bluetooth headset establishes the second physical connection to the electronic device 2, and releases the first physical connection between the Bluetooth headset and the electronic device 1. If the user instructs not to perform switching, the Bluetooth headset maintains the first physical connection to the electronic device 1. Compared with the conventional technology, a user operation required by this solution is relatively simple, and a plurality of electronic devices may share one Bluetooth headset.

In some other embodiments, when the Bluetooth headset establishes the first physical connection to the electronic device 1, if the electronic device 2 has an audio service, the electronic device 2 may prompt, in a manner such as making a sound, vibration, using an indicator light, or displaying information, the user whether to preferentially use the Bluetooth headset to process the audio service. If the electronic device 2 detects an instruction that is indicated by the user and that instructs to process the audio service by using the Bluetooth headset, the electronic device 2 sends identification information 4 to the Bluetooth headset. The Bluetooth headset determines, based on the identification information 4, to preferentially process the current audio service of the electronic device 2, and therefore establishes the second physical connection to the electronic device 2, and releases the first physical connection between the Bluetooth headset and the electronic device 1. Likewise, this solution requires a simple user operation.

Figure 24:
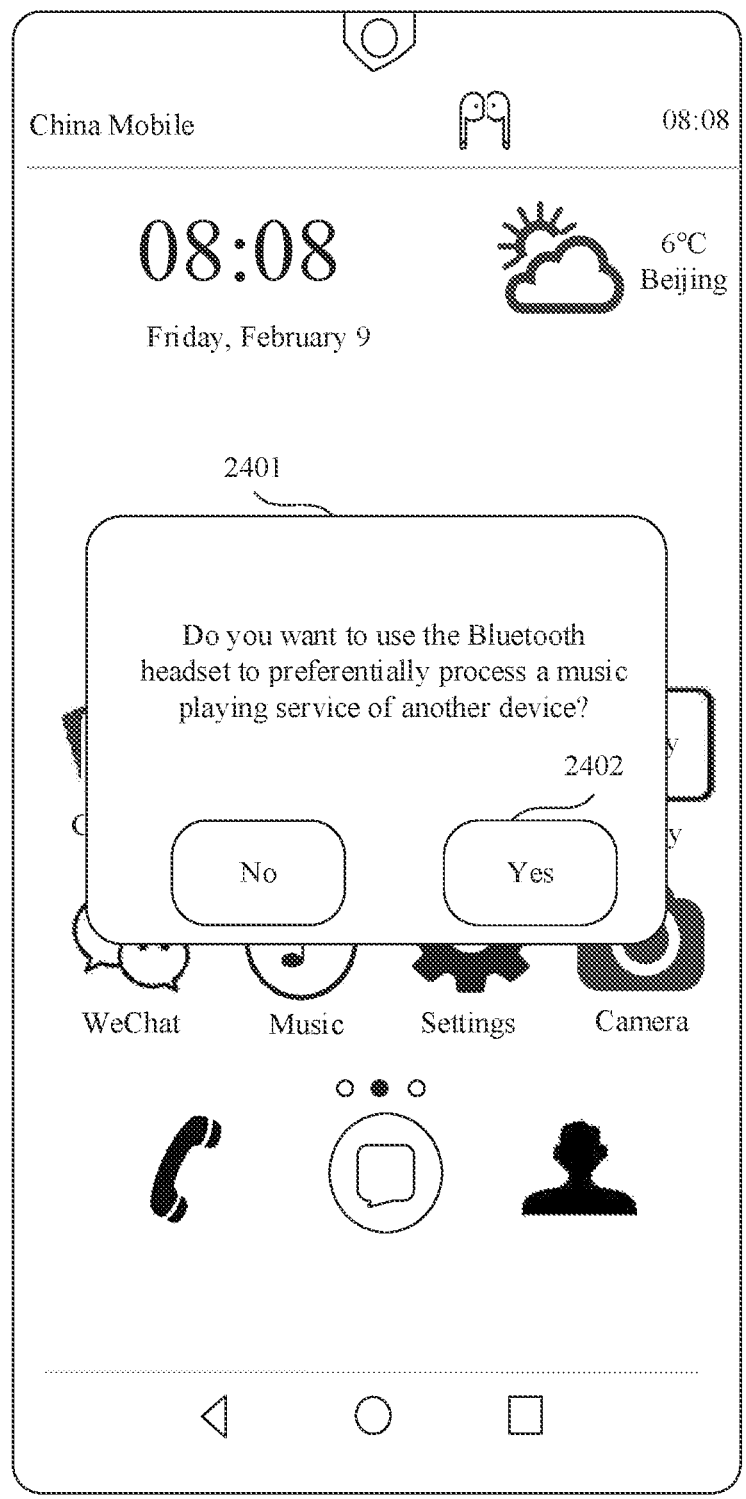
FIG. 24 is a schematic diagram of an interface according to an embodiment of this application.

In some other embodiments, when the Bluetooth headset establishes the first physical connection to the electronic device 1, if the Bluetooth headset receives connection request information sent by the electronic device 2, the Bluetooth headset may notify the electronic device 1. The electronic device 1 may prompt, by making a sound, vibration, indicating or displaying information, or the like, the user whether to preferentially use the Bluetooth headset to process an audio service of another electronic device. Refer to FIG. 24. For example, the electronic device 1 may prompt the user by using the prompt box 2401. If the electronic device 1 detects an instruction that is indicated by the user and that instructs to use the Bluetooth headset to process the audio service of the another electronic device (for example, detects an operation of tapping the control 2402 by the user), the electronic device 1 notifies the Bluetooth headset. The Bluetooth headset establishes the second physical connection to the electronic device 2, and releases the first physical connection between the Bluetooth headset and the electronic device 1. This solution requires a simple user operation.

It should be noted that the foregoing description is provided by using an example in which a plurality of electronic devices use one Bluetooth headset to process audio services by using a virtual connection and a physical connection. Similarly, the plurality of electronic devices may further use one Bluetooth headset to process data services (for example, synchronizing a contact list) by using a virtual connection and a physical connection. Details are not described in this embodiment of this application.

Figure 25:
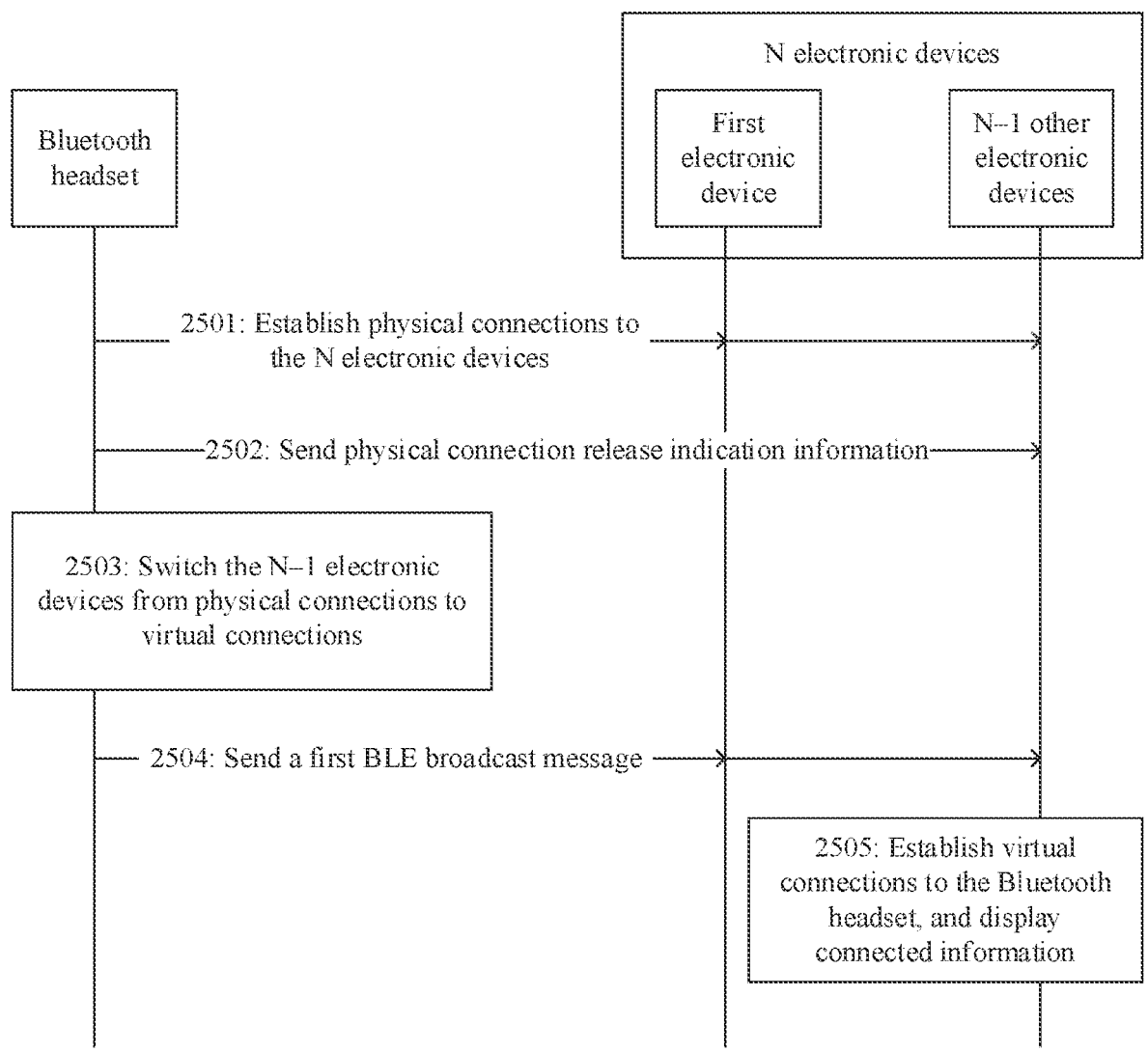
FIG. 25 is a flowchart of a Bluetooth connection method according to an embodiment of this application.

With reference to the foregoing embodiments and the corresponding accompanying drawings, another embodiment of this application provides a Bluetooth connection method. The method may be implemented by a Bluetooth headset having the structure shown in FIG. 2A and an electronic device having the structure shown in FIG. 3. Refer to FIG. 25. The method may include the following steps.

2501: The Bluetooth headset establishes a physical connection to each of N electronic devices, where N is an integer greater than 1, and the physical connection includes an asynchronous connection-oriented link ACL connection.

2502: The Bluetooth headset sends physical connection release indication information to N−1 electronic devices other than a first electronic device.

2503: The Bluetooth headset switches the N−1 electronic devices from physical connections to virtual connections.

2504: The Bluetooth headset sends a first BLE broadcast message, where the first BLE broadcast message includes status information of the Bluetooth headset.

2505: The N-1 electronic devices each establish virtual connection to the Bluetooth headset based on the first BLE broadcast message, and display connection information of the Bluetooth headset.

In the solution described in step 2501 to step 2505, the Bluetooth headset may first establish a physical connection to each of the N electronic devices, then retain only a physical connection to the first electronic device, release the physical connections between the Bluetooth headset and the other N−1 electronic devices, and maintain virtual connections to the other N−1 electronic devices, so as to maintain wireless connections to the N electronic devices. Because the virtual connection consumes less power than the physical connection, in this solution, not only wireless connections between the Bluetooth headset and two or more electronic devices can be maintained simultaneously, power consumption of the Bluetooth headset and the electronic devices can be reduced, and use duration of the Bluetooth headset and the electronic devices can be prolonged.

On the basis that the Bluetooth headset has a physical connection or a virtual connection to each of the N electronic devices, the Bluetooth headset can automatically switch between audio services of different electronic devices for processing.

Figure 26:
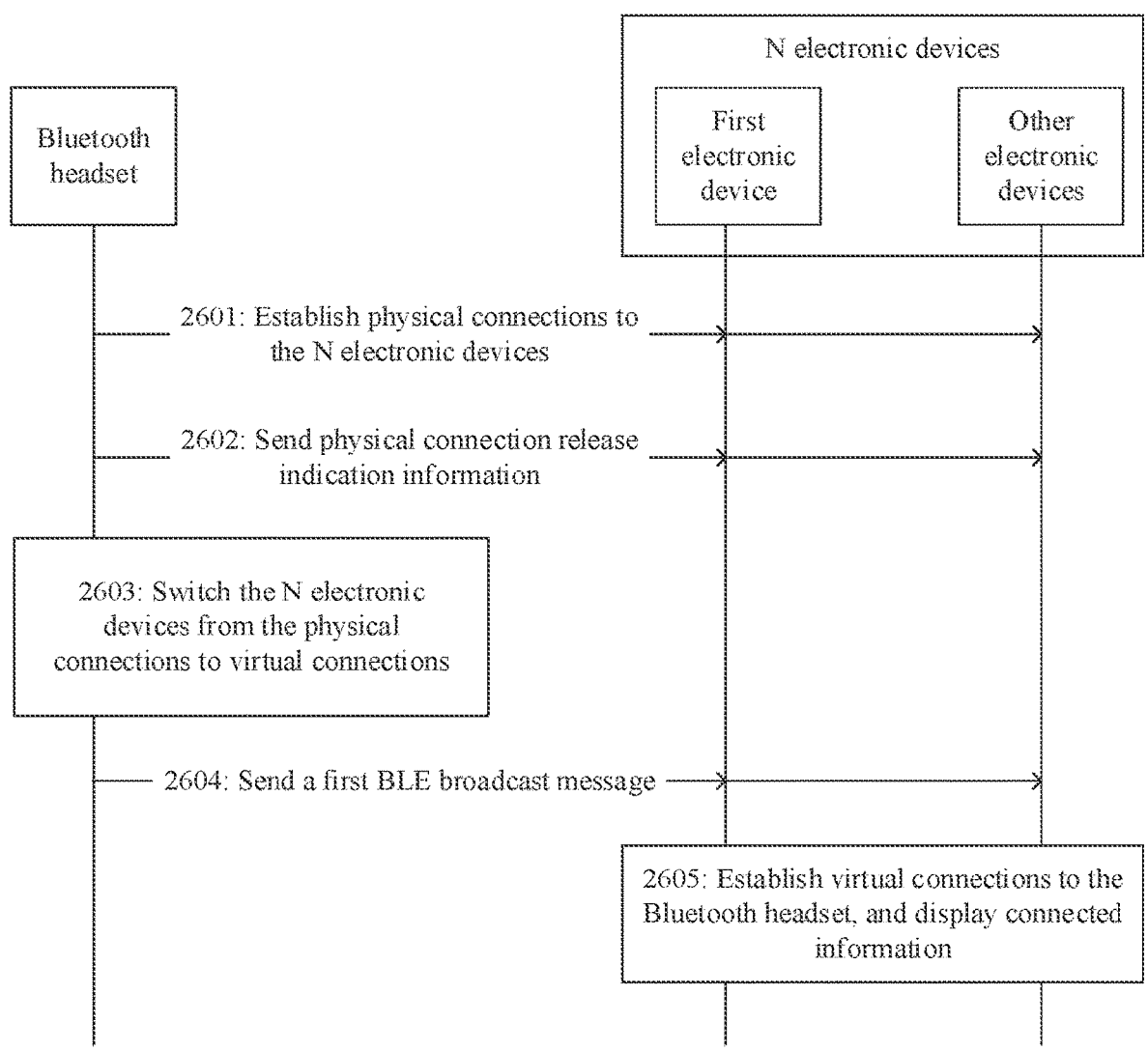
FIG. 26 is a flowchart of another Bluetooth connection method according to an embodiment of this application.

With reference to the foregoing embodiments and the corresponding accompanying drawings, another embodiment of this application provides a Bluetooth connection method. The method may be implemented by a Bluetooth headset having the structure shown in FIG. 2A and an electronic device having the structure shown in FIG. 3. Refer to FIG. 26. The method may include the following steps.

2601: The Bluetooth headset establishes a physical connection to each of N electronic devices, where N is an integer greater than 1, and the physical connection includes an asynchronous connection-oriented link ACL connection.

2602: The Bluetooth headset sends physical connection release indication information to the N electronic devices.

2603: The Bluetooth headset switches the N electronic devices from physical connections to virtual connections.

2604: The Bluetooth headset sends a first Bluetooth Low Energy BLE broadcast message, where the first BLE broadcast message includes status information of the Bluetooth headset.

2605: The N electronic devices each establish a virtual connection to the Bluetooth headset based on the first BLE broadcast message, and display connection information of the Bluetooth headset.

In the solution described in step 2601 to step 2605, the Bluetooth headset may first establish a physical connection to each of the N electronic devices, then release the physical connections between the Bluetooth headset and the N electronic devices, and switch the N electronic devices from the physical connections to virtual connections. Because the virtual connection consumes less power than the physical connection, in this solution, not only wireless connections between the Bluetooth headset and two or more electronic devices can be maintained simultaneously, battery power of the Bluetooth headset and the electronic devices can be saved, and use duration of the Bluetooth headset and the electronic devices can be prolonged. In particular, a standby time of the Bluetooth headset can be prolonged.

On the basis that the Bluetooth headset has a physical connection or a virtual connection to each of the N electronic devices, the Bluetooth headset can automatically switch between audio services of different electronic devices for processing.

Based on the method procedure shown in FIG. 25, when there is a physical connection between the Bluetooth headset and the first electronic device, and when the first electronic device has a first audio service, the Bluetooth headset may process the audio service of the first electronic device based on the physical connection.

Based on the method procedure shown in FIG. 25, the method may further include: When the first electronic device has the first audio service, the first electronic device sends connection request information to the Bluetooth headset. After receiving the connection request information sent by the first electronic device, the Bluetooth headset establishes the physical connection to the first electronic device, where the first electronic device is any electronic device in the N electronic devices. The Bluetooth headset may process the audio service of the first electronic device based on the established physical connection.

On the basis that there is a physical connection between the Bluetooth headset and the first electronic device, when a second electronic device has a second audio service, the second electronic device may send connection request information to the Bluetooth headset. If the Bluetooth headset is in an idle state and the connection request information sent by the second electronic device is received, the Bluetooth headset establishes a physical connection to the second electronic device, and releases the physical connection between the Bluetooth headset and the first electronic device. The Bluetooth headset processes the second audio service of the second electronic device. The idle state is a state in which the Bluetooth headset currently does not process an audio service. The Bluetooth headset processes the second audio service of the second electronic device.

In other words, when the Bluetooth headset is idle, if an electronic device has an audio service, and there is a physical connection between the electronic device and the Bluetooth headset, the Bluetooth headset may process the audio service based on the physical connection. If an electronic device has an audio service, and there is a virtual connection between the electronic device and the Bluetooth headset, the Bluetooth headset may switch from the virtual connection to a physical connection, and process the audio service based on the physical connection.

That the Bluetooth headset establishes a physical connection to the second electronic device, and releases the physical connection between the Bluetooth headset and the first electronic device may include: The Bluetooth headset first establishes the physical connection to the second electronic device, and then releases the physical connection between the Bluetooth headset and the first electronic device; or the Bluetooth headset first releases the physical connection between the Bluetooth headset and the first electronic device, and then establishes the physical connection to the second electronic device. A time sequence of establishing the physical connection and releasing the physical connection is not limited in this embodiment of this application.

In some embodiments, after processing of the second audio service is completed, the Bluetooth headset maintains the physical connection to the second electronic device.

In some other embodiments, after processing of the second audio service is completed, the Bluetooth headset establishes a physical connection to the first electronic device, and releases the physical connection between the Bluetooth headset and the second electronic device, so as to continue to process the first audio service. In this way, when the first audio service is interrupted by the second audio service, if processing of the second audio service is completed, processing of the first audio service may further be automatically continued, so that user experience is improved.

The first BLE broadcast message may further include service status information. The service status information is used to indicate whether the Bluetooth headset is currently in an idle state, or indicate the first audio service that is being processed by the Bluetooth headset. On the basis that there is a physical connection between the Bluetooth headset and the first electronic device, when the second electronic device has a second audio service, and the second electronic device determines, based on the service status information, that the Bluetooth headset is processing the first audio service, in some embodiments, if the second electronic device determines that a priority of the second audio service is higher than a priority of the first audio service, the second electronic device may send connection request information to the Bluetooth headset. After receiving the connection request information sent by the second electronic device, the Bluetooth headset establishes a physical connection to the second electronic device, releases the physical connection between the Bluetooth headset and the first electronic device, and processes the second audio service of the second electronic device.

In other words, when an electronic device determines that a priority of an audio service of the electronic device is higher than a priority of an audio service that is being processed by the Bluetooth headset, the electronic device may preempt the physical connection to the Bluetooth headset, so that the Bluetooth headset preferentially processes an important audio service with a high priority.

On the basis that there is a physical connection between the Bluetooth headset and the first electronic device, when the second electronic device has a second audio service, and the second electronic device determines, based on the service status information, that the Bluetooth headset is processing the first audio service, in some other embodiments, the second electronic device may send connection request information to the Bluetooth headset. After receiving the connection request information sent by the second electronic device, if the Bluetooth headset determines that a priority of the second electronic device is higher than a priority of the first electronic device, the Bluetooth headset establishes a physical connection to the second electronic device, releases the physical connection between the Bluetooth headset and the first electronic device, and processes the second audio service of the second electronic device.

In other words, the Bluetooth headset may preferentially allocate a physical connection to an electronic device with a high priority, so as to preferentially process an audio service of the electronic device with a high priority.

In some embodiments, if the first electronic device is an electronic device with a highest priority in the N electronic devices, after the Bluetooth headset completes processing of the second audio service, if duration in which the Bluetooth headset is in an idle state is greater than or equal to preset duration 3, the Bluetooth headset releases the physical connection between the Bluetooth headset and the second electronic device, and establishes a physical connection to the first electronic device.

In this way, the Bluetooth headset is physically connected to an important electronic device with the highest priority in most of the time, so that an audio service on the important electronic device can be processed in a timely manner, and a processing delay of the audio service on the important electronic device can be reduced.

In some other embodiments, based on the method procedure shown in FIG. 26, after the Bluetooth headset establishes a physical connection to an electronic device (that is, a third electronic device) in the N electronic devices and processes an audio service of the electronic device, if duration in which the Bluetooth headset is in an idle state is greater than or equal to preset duration 5, that is, the Bluetooth headset has no service for a long time, the Bluetooth headset may release the physical connection between the Bluetooth headset and the electronic device, so as to maintain virtual connections to all the electronic devices, so as to save battery power of the Bluetooth headset.

Another embodiment of this application provides a Bluetooth headset, including one or more processors and a memory. The memory stores computer program instructions. When the instructions are executed by one or more processors, the Bluetooth headset is enabled to perform the Bluetooth connection method described in the foregoing embodiment.

For example, when the Bluetooth headset is the device in FIG. 2A, the processor in the electronic device may be the processor 101 in FIG. 2A, the memory in the electronic device may be the memory 102 in FIG. 2A, and the one or more computer programs are stored in the memory 102. The one or more computer programs include instructions, and when the instructions are executed by the processor 101, the Bluetooth headset is enabled to perform the Bluetooth connection method in the foregoing embodiment.

Another embodiment of this application provides an electronic device, including one or more processors, and one or more memories. The one or more memories store computer program instructions. When the instructions are executed by the one or more processors, the electronic device is enabled to perform the Bluetooth connection method described in the foregoing embodiment.

For example, when the electronic device is the mobile phone in FIG. 3, the processor in the electronic device may be the processor 310 in FIG. 3, the memory in the electronic device may be the internal memory 321 in FIG. 3, and the one or more computer programs are stored in the internal memory 321. The one or more computer programs include instructions, and when the instructions are executed by the processor 310, the mobile phone is enabled to perform the Bluetooth connection method in the foregoing embodiment.

An embodiment of this application further provides a computer storage medium. The computer storage medium stores computer instructions. When the computer instructions are run on a Bluetooth headset, the Bluetooth headset is enabled to perform the foregoing related steps, to implement the Bluetooth connection method in the foregoing embodiment.

An embodiment of this application further provides a computer storage medium. The computer storage medium stores computer instructions. When the computer instructions are run on an electronic device, the electronic device is enabled to perform the foregoing related steps, to implement the Bluetooth connection method in the foregoing embodiment.

An embodiment of this application further provides a computer program product. When the computer program product is run on a computer, the computer is enabled to perform the foregoing related steps, to implement the Bluetooth connection method in the foregoing embodiment.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the apparatus to perform the Bluetooth connection method in the foregoing method embodiments.

The device, apparatus, computer storage medium, computer program product, or chip provided in the embodiments of this application is configured to perform the related method provided above. Therefore, for beneficial effects that can be achieved, refer to the beneficial effects of the corresponding method provided above. Details are not described herein again.

An embodiment of this application further provides a communications system. The communications system may include a Bluetooth headset and a plurality of electronic devices. The Bluetooth headset and the plurality of electronic devices may perform the Bluetooth connection method in the foregoing method embodiments. For example, for a schematic diagram of the communications system, refer to FIG. 1.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A BLUETOOTH connection method, comprising:
establishing, by a BLUETOOTH headset, a first connection to a first electronic device;
processing, by the BLUETOOTH headset, a first audio service of the first electronic device when the first electronic device has the first audio service;
sending, by the BLUETOOTH headset, a BLUETOOTH Low Energy (BLE) broadcast message;
receiving, by the BLUETOOTH headset, connection request information, wherein the connection request information is from a second electronic device having a second audio service;
disconnecting, by the BLUETOOTH headset, the first connection;
establishing, by the BLUETOOTH headset, a second connection to the second electronic device when the BLE broadcast message sent by the BLUETOOTH headset is received; and
processing, by the BLUETOOTH headset, the second audio service, wherein both the first connection and the second connection are BLUETOOTH connections.

2. The BLUETOOTH connection method of claim 1, wherein before receiving the connection request information, the BLUETOOTH headset has a third connection established with a third electronic device having a third audio service, wherein the BLUETOOTH headset is configured to process the third audio service of the third electronic device, wherein the third connection is another BLUETOOTH connection, and wherein the BLUETOOTH headset has been paired with the third electronic device.

3. The BLUETOOTH connection method of claim 1, further comprising maintaining the second connection after the second audio service ends.

4. The BLUETOOTH connection method of claim 1, wherein both the first connection and the second connection are asynchronous connection-oriented link (ACL) connections.

5. The BLUETOOTH connection method of claim 1, wherein the second audio service is a phone call.

6. The BLUETOOTH connection method of claim 1, further comprising pairing the BLUETOOTH headset with the first electronic device and the second electronic device.

7. The BLUETOOTH connection method of claim 1, further comprising sending, in response to the connection request information, connection response information to the second electronic device.

8. The BLUETOOTH connection method of claim 1, wherein before processing the second audio service, the BLUETOOTH connection method further comprises:
processing the first audio service;
releasing the first connection; and
suspending the first audio service after releasing the first connection.

9. The BLUETOOTH connection method of claim 8, wherein the first audio service comprises playing music, a recording, a sound in a video file, or background music in a game.

10. The BLUETOOTH connection method of claim 1, wherein the BLE broadcast message comprises status information of the BLUETOOTH headset, and wherein the status information comprises at least one of a device name, a device type, a device model, a battery level, a connection status, a wearing status, or a service status of the BLUETOOTH headset.

11. A BLUETOOTH headset comprising:
one or more processors; and
a memory coupled to the one or more processors and configured to store instructions that, when executed by the one or more processors, cause the BLUETOOTH headset to:
establish a first connection to a first electronic device having a first audio service;
process the first audio service;
send a BLUETOOTH Low Energy (BLE) broadcast message;
receive connection request information, wherein the connection request information is from a second electronic device having a second audio service;
disconnect the first connection;
establish a second connection to the second electronic device; and
process the second audio service when the BLE broadcast message sent by the BLUETOOTH headset is received, wherein both the first connection and the second connection are BLUETOOTH connections.

12. The BLUETOOTH headset of claim 11, wherein when executed by the one or more processors, the instructions further cause the BLUETOOTH headset to maintain the second connection after the second audio service ends.

13. The BLUETOOTH headset of claim 11, wherein both the first connection and the second connection are asynchronous connection-oriented link (ACL) connections.

14. The BLUETOOTH headset of claim 11, wherein the second audio service is a phone call.

15. The BLUETOOTH headset of claim 11, wherein when executed by the one or more processors, the instructions further cause the BLUETOOTH headset to pair with the first electronic device and the second electronic device.

16. The BLUETOOTH headset of claim 11, wherein when executed by the one or more processors, the instructions further cause the BLUETOOTH headset to send, in response to the connection request information, connection response information to the second electronic device.

17. A BLUETOOTH connection method implemented by a second electronic device, wherein the BLUETOOTH connection method comprises:
receiving a BLUETOOTH Low Energy (BLE) broadcast message from a BLUETOOTH headset having a first connection to a first electronic device, wherein the first connection is configured to process a first audio service of the first electronic device when the first electronic device has the first audio service;
sending connection request information when the second electronic device has an audio service, wherein the connection request information is configured to establish a second connection between the second first electronic device and the BLUETOOTH headset; and
establish the second connection between the second electronic device and the BLUETOOTH headset, wherein the second connection is configured to process a second audio service of the second electronic device by the BLUETOOTH headset that is preempted by the second electronic device with a high priority, and wherein both the first connection and the second connection are BLUETOOTH connections.

18. The BLUETOOTH connection method of claim 17, wherein both the first connection and the second connection are asynchronous connection-oriented link (ACL) connections.

19. The BLUETOOTH connection method of claim 17, wherein the audio service is a phone call.

20. The BLUETOOTH connection method of claim 17, further comprising pairing the second first electronic device with the BLUETOOTH headset.

* * * * *

UNITED STATES PATENT AND TRADEMARK OFFICE
CERTIFICATE OF CORRECTION

PATENT NO. : 12,250,335 B2
APPLICATION NO. : 17/604604
DATED : March 11, 2025
INVENTOR(S) : Bin Peng Page 1 of 1

It is certified that error appears in the above-identified patent and that said Letters Patent is hereby corrected as shown below:

In the Claims

Claim 17, Column 64, Lines 30-31: "the second first electronic device" should read "the second electronic device"

Signed and Sealed this
Sixth Day of May, 2025

Coke Morgan Stewart
*Acting Director of the United States Patent and Trademark Office*